US012752430B2

(12) United States Patent
Tadepalli et al.

(10) Patent No.: US 12,752,430 B2
(45) Date of Patent: Oct. 6, 2026

(54) AUTONOMOUS SOLAR INSTALLATION USING ARTIFICIAL INTELLIGENCE

(71) Applicant: The AES Corporation, Arlington, VA (US)

(72) Inventors: Srikanth Tadepalli, Dayton, OH (US); Sean Otto, Indianapolis, IN (US); Diego Botelho, San Paulo (BR); Deise Yumi Asami, Reston, VA (US); Alexander Avery, Victor, NY (US); Jacob Kiggins, Avon, NY (US); John Christopher Shelton, Vienna, VA (US)

(73) Assignee: The AES Corporation, Arlington, VA (US)

( * ) Notice: Subject to any disclaimer, the term of this patent is extended or adjusted under 35 U.S.C. 154(b) by 53 days.

(21) Appl. No.: 18/232,981

(22) Filed: Aug. 11, 2023

(65) Prior Publication Data

US 2024/0051152 A1 Feb. 15, 2024

Related U.S. Application Data

(60) Provisional application No. 63/397,125, filed on Aug. 11, 2022.

(51) Int. Cl.
*B25J 9/16* (2006.01)
*B25J 11/00* (2006.01)
(Continued)

(52) U.S. Cl.
CPC ............. *B25J 9/1697* (2013.01); *B25J 9/161* (2013.01); *B25J 9/1679* (2013.01); *B25J 9/1687* (2013.01);
(Continued)

(58) Field of Classification Search
CPC ........ B25J 9/1697; B25J 9/161; B25J 9/1679; B25J 9/1687; B25J 11/008; B25J 15/0052;
(Continued)

(56) References Cited

U.S. PATENT DOCUMENTS 6,247,999 B1 6/2001 Tokiwa
8,240,109 B2 8/2012 Cusson et al.
(Continued)

FOREIGN PATENT DOCUMENTS

CA 3079669 A1 5/2019
CN 114952853 A 8/2022
(Continued)

OTHER PUBLICATIONS

International Search Report and Written Opinion issued on Dec. 13, 2021 in International Patent Application No. PCT/US2021/047849.
(Continued)

*Primary Examiner* — Dylan M Katz
(74) *Attorney, Agent, or Firm* — Lempia Summerfield Katz LLC

(57) ABSTRACT

A system and method for installing solar panels are provided. The method obtains an image of a solar panel during an in-progress solar installation and estimates features of the solar panel based on a first image using distance simulation, geometric correction, and/or angular adjustment. The method also generates control signals, based on the estimated features, for operating a robotic controller for picking the solar panel. The method also obtains a second image of the solar panel when the solar panel is in a perspective view and detects placement of the solar panel based on the image by determining if the solar panel is co-planar with and at a predetermined offset from a fixed solar panel. Based on the detected placement, control signals are generated for oper-
(Continued)

ating a second robotic controller for aligning the solar panel with the fixed solar panel.

32 Claims, 75 Drawing Sheets

(51) Int. Cl.

| | |
|---|---|
| ***G05B 19/4155*** | (2006.01) |
| ***G06N 3/0464*** | (2023.01) |
| ***G06T 5/10*** | (2006.01) |
| ***G06T 7/12*** | (2017.01) |
| ***G06T 7/194*** | (2017.01) |
| ***G06T 7/50*** | (2017.01) |
| ***G06T 7/73*** | (2017.01) |
| ***G06V 10/26*** | (2022.01) |
| ***G06V 10/44*** | (2022.01) |
| ***G06V 10/82*** | (2022.01) |
| ***G06V 20/50*** | (2022.01) |
| ***H02S 20/10*** | (2014.01) |
| ***H02S 50/00*** | (2014.01) |

(52) U.S. Cl.
CPC ......... *B25J 11/008* (2013.01); *G05B 19/4155* (2013.01); *G06N 3/0464* (2023.01); *G06T 5/10* (2013.01); *G06T 7/12* (2017.01); *G06T 7/194* (2017.01); *G06T 7/50* (2017.01); *G06T 7/73* (2017.01); *G06T 7/74* (2017.01); *G06V 10/26* (2022.01); *G06V 10/44* (2022.01); *G06V 10/82* (2022.01); *G06V 20/50* (2022.01); *H02S 20/10* (2014.12); *H02S 50/00* (2013.01); *G05B 2219/36439* (2013.01); *G06T 2207/20021* (2013.01); *G06T 2207/20061* (2013.01); *G06T 2207/20084* (2013.01); *G06T 2207/30184* (2013.01)

(58) Field of Classification Search
CPC ... B25J 15/0616; B25J 9/163; G05B 19/4155; G05B 2219/36439; G05B 2219/39109; G05B 2219/40607; G06N 3/0464; G06N 3/09; G06N 3/045; G06T 5/10; G06T 7/12; G06T 7/194; G06T 7/50; G06T 7/73; G06T 7/74; G06T 2207/20021; G06T 2207/20061; G06T 2207/20084; G06T 2207/30184; G06V 10/26; G06V 10/44; G06V 10/82; G06V 20/50; G06V 20/60; H02S 20/10; H02S 50/00; H02S 20/32; Y02E 10/50
See application file for complete search history.

(56) References Cited

U.S. PATENT DOCUMENTS

| | | | |
|---|---|---|---|
| 8,590,223 | B2 | 11/2013 | Kilgore et al. |
| 8,657,991 | B2 | 2/2014 | Potter et al. |
| 8,813,460 | B2 | 8/2014 | Cinnamon et al. |
| 9,136,411 | B2 | 9/2015 | Jolley |
| 9,362,442 | B2 | 6/2016 | Kacandes |
| 9,473,066 | B2 | 10/2016 | Stephan et al. |
| 9,625,180 | B2 | 4/2017 | King |
| 9,647,433 | B2 | 5/2017 | Meine et al. |
| 9,660,570 | B2 | 5/2017 | Stephan et al. |
| 9,831,817 | B2 | 11/2017 | Rothschild |
| 10,011,022 | B1 | 7/2018 | Lin et al. |
| 10,088,201 | B2 | 10/2018 | Stephan et al. |
| 10,157,452 | B1 | 12/2018 | Tighe et al. |
| 10,461,682 | B2 | 10/2019 | Schuit et al. |
| 10,769,318 | B2 | 9/2020 | Wachman et al. |
| 10,801,755 | B1 | 10/2020 | Nemat et al. |
| 10,845,093 | B2 | 11/2020 | Stephan et al. |
| 11,012,023 | B2 | 5/2021 | Stearns et al. |
| 11,410,362 | B1 | 8/2022 | Soltani et al. |
| 11,919,149 | B2 | 3/2024 | Zhou et al. |
| 11,951,617 | B2 | 4/2024 | Zhou et al. |
| 11,964,860 | B2 | 4/2024 | Bailey |
| 12,184,231 | B2 | 12/2024 | Shelton et al. |
| 12,334,868 | B2 | 6/2025 | Shelton et al. |
| 12,466,066 | B2 | 11/2025 | Smith |
| 2008/0096291 | A1 | 4/2008 | Takai et al. |
| 2009/0185241 | A1 | 7/2009 | Nepomniachtchi |
| 2010/0012819 | A1 | 1/2010 | Graham |
| 2010/0314843 | A1 | 12/2010 | Beck |
| 2011/0000520 | A1 | 1/2011 | West |
| 2011/0240740 | A1 | 10/2011 | Li et al. |
| 2011/0284057 | A1 | 11/2011 | Swahn et al. |
| 2012/0027550 | A1 | 2/2012 | Bellacicco et al. |
| 2012/0152877 | A1 | 6/2012 | Tadayon |
| 2012/0199266 | A1 | 8/2012 | Potter et al. |
| 2012/0325761 | A1 | 12/2012 | Kübsch et al. |
| 2013/0108409 | A1 | 5/2013 | Wu et al. |
| 2013/0133172 | A1 | 5/2013 | Kiener et al. |
| 2013/0146123 | A1 | 6/2013 | Park |
| 2013/0272833 | A1* | 10/2013 | Duncan ............... H10F 71/1375 414/800 |
| 2013/0334151 | A1 | 12/2013 | Kanczuzewski et al. |
| 2014/0246257 | A1 | 9/2014 | Jacobsen et al. |
| 2015/0059158 | A1 | 3/2015 | Kacandes |
| 2015/0059827 | A1 | 3/2015 | Reed et al. |
| 2015/0214085 | A1 | 7/2015 | Jin et al. |
| 2016/0087578 | A1 | 3/2016 | Cinnamon et al. |
| 2016/0368135 | A1 | 12/2016 | Tadayon |
| 2017/0106534 | A1 | 4/2017 | Nakamoto et al. |
| 2017/0366132 | A1 | 12/2017 | Meine et al. |
| 2018/0204111 | A1 | 7/2018 | Zadeh et al. |
| 2018/0241343 | A1 | 8/2018 | Jiang et al. |
| 2018/0253622 | A1 | 9/2018 | Chen et al. |
| 2018/0331654 | A1 | 11/2018 | Gostein et al. |
| 2019/0134822 | A1 | 5/2019 | Clemenzi et al. |
| 2019/0156210 | A1 | 5/2019 | He et al. |
| 2019/0308825 | A1 | 10/2019 | Ge et al. |
| 2020/0086504 | A1 | 3/2020 | Caron L'ecuyer et al. |
| 2020/0184278 | A1 | 6/2020 | Zadeh et al. |
| 2020/0198131 | A1 | 6/2020 | Tachi et al. |
| 2020/0244211 | A1 | 7/2020 | Kim et al. |
| 2020/0336099 | A1 | 10/2020 | Debartolo, III et al. |
| 2020/0350850 | A1* | 11/2020 | Di Stefano ............. H02S 20/23 |
| 2020/0358395 | A1 | 11/2020 | Ke et al. |
| 2021/0039264 | A1 | 2/2021 | Ishizuka et al. |
| 2021/0049780 | A1 | 2/2021 | Westmacot et al. |
| 2021/0078265 | A1 | 3/2021 | Miller |
| 2021/0111665 | A1 | 4/2021 | Van De Sande |
| 2021/0205997 | A1 | 7/2021 | Zhou et al. |
| 2021/0206003 | A1 | 7/2021 | Zhou et al. |
| 2021/0211096 | A1 | 7/2021 | Clemenzi et al. |
| 2021/0214908 | A1 | 7/2021 | West et al. |
| 2021/0216766 | A1 | 7/2021 | Luo et al. |
| 2021/0264141 | A1 | 8/2021 | Chojnacki |
| 2021/0337734 | A1 | 11/2021 | Jeanty et al. |
| 2021/0379757 | A1* | 12/2021 | Schneider ............ G05D 1/0293 |
| 2021/0386482 | A1 | 12/2021 | Gera et al. |
| 2022/0069770 | A1 | 3/2022 | Shelton et al. |
| 2022/0072712 | A1* | 3/2022 | Tang ......................... G06T 7/50 |
| 2022/0121884 | A1 | 4/2022 | Zadeh et al. |
| 2022/0164983 | A1 | 5/2022 | Rousseau |
| 2022/0411245 | A1 | 12/2022 | Bailey |
| 2023/0005115 | A1 | 1/2023 | Bedrich et al. |
| 2023/0015330 | A1 | 1/2023 | Schuknecht et al. |
| 2023/0094619 | A1 | 3/2023 | Shelton et al. |
| 2023/0238919 | A1 | 7/2023 | Kunz et al. |
| 2024/0051145 | A1 | 2/2024 | Asami et al. |
| 2024/0051146 | A1 | 2/2024 | Luan et al. |
| 2024/0051152 | A1 | 2/2024 | Tadepalli et al. |
| 2024/0189978 | A1 | 6/2024 | Asmari et al. |
| 2024/0228195 | A1 | 7/2024 | Smith |
| 2024/0238989 | A1 | 7/2024 | Asmari et al. |
| 2025/0054183 | A1 | 2/2025 | Murcott et al. |

(56) References Cited

U.S. PATENT DOCUMENTS

FOREIGN PATENT DOCUMENTS

| | | | |
|---|---|---|---|
| CN | 115709373 | A | 2/2023 |
| CN | 218771921 | U | 3/2023 |
| CN | 218771936 | U | 3/2023 |
| CN | 116276979 | A | 6/2023 |
| CN | 116442285 | A | 7/2023 |
| CN | 116448094 | A | 7/2023 |
| CN | 116449876 | A | 7/2023 |
| CN | 116645413 | A | 8/2023 |
| CN | 116719315 | A | 9/2023 |
| CN | 116833190 | A | 10/2023 |
| CN | 116840869 | A | 10/2023 |
| CN | 116843713 | A | 10/2023 |
| CN | 219791691 | U | 10/2023 |
| CN | 219834050 | U | 10/2023 |
| CN | 117011387 | A | 11/2023 |
| CN | 220145954 | U | 12/2023 |
| CN | 116276979 | B | 1/2026 |
| FR | 3094159 | B1 | 11/2021 |
| WO | 2010145844 | A2 | 12/2010 |
| WO | 2012167130 | A2 | 12/2012 |
| WO | 2014108196 | A1 | 7/2014 |
| WO | 2019097348 | A1 | 5/2019 |
| WO | 2020188077 | A1 | 9/2020 |
| WO | 2021132829 | A1 | 7/2021 |

OTHER PUBLICATIONS

HypérTracker [Online]. Ita Scuola Politecnica, Nov. 2020 [retrieved on Mar. 28, 2022]. Retrieved from the Internet: <URL: https://www.asp-poli.it/projects/hypertracker/>.
International Search Report and Written Opinion issued on Mar. 22, 2023 in International Patent Application No. PCT/US2022/051899.
Horschel, "Automatic Solar Installation" Oct. 25, 2012 (Oct, 25, 2012) entire YouTube video, in particular screenshots pp. 1-4 <retrieved from the internet: https://youtu.be/ebLam_3_Vko>.
Spencer, et al., "The monocular depth estimation challenge, in Proceedings of the IEEE/CVF Winter Conference on Applications of Computer Vision" (pp. 623-632) (2023).
Hirschmuller, "Stereo Processing by Semiglobal Matching and Mutual Information, in IEEE Transactions on Pattern Analysis and Machine Intelligence", vol. 30, No. 2, pp. 328-341, Feb. 2008, doi: 10.1109/TPAMI.2007.1166.
Patil et al., "A Comparative Evaluation of SGM Variants (including a New Variant, tMGM) for Dense Stereo Matching", ArXiv, abs/1911.09800 (2019).
O'Mahony et al., "Deep learning vs. traditional computer vision, in Advances in Computer Vision: Proceedings of the 2019 Computer Vision Conference (CVC)", Springer Nature Switzerland AG, vol. 11 (pp. 128-144) (2020).
International Search Report and Written Opinion issued on Nov. 17, 2023 in International Patent Application No. PCT/US2023/030048.
International Search Report and Written Opinion issued on Jan. 26, 2024 in International Patent Application No. PCT/US2023/030050.
Saurav, Kumar, and Seul Jung. "Robust detection of the coordinate of a solar panel using deep learning algorithm." 2019 19th international conference on control, automation and systems (ICCAS). (pp. 1116-1119) IEEE, 2019.
Belova, Irina A., Miroslav V. Martinovich, and Vladimir A. Skolota. "Application of Photovoltaic Cells with an Intelligent Control System for Railway Transport." 2016 13th International Scientific-Technical Conference on Actual Problems of Electronics Instrument Engineering (APEIE). vol. 3. IEEE, 2016 (5 pages).
Kramer, Evan L., William E. Parker, and Rebecca A. Masterson. "Vision-Based Spacecraft Relative Pose Estimation in Variable Lighting Conditions." 2022 IEEE Aerospace Conference (Aero). IEEE, 2022 (12 pages).
Lukas Bommes, Claudia Buerhop-Lutz, Tobias Pickel, Jens Hauch, Christoph Brabec, lan Marius Peters, "Georeferencing of Photovoltaic Modules from Aerial Infrared Videos using Structure-from-Motion" (Year: 2022) (11 pages).
T. Janthori, B. Lertpornsuksawat and T. Sapsaman, "Automatic Data Collection for Ariel Thermographic Inspections of Photovoltaic Modules," 2022 Research, Invention, and Innovation Congress: Innovative Electricals and Electronics (RI2C), Bangkok, Thailand, 2022, pp. 278-283 (Year: 2022) (6 pages).
Tani, Eiichiro, et al. "Development ofthe Tightening Nut Task Skill Using a Power Distribution Line Maintenance Experimental Robot." 2015 IEEE/SICE International Symposium on System Integration (SII). IEEE, 2015 (pp. 558-563) (6 pages).
Vlaminck, Michiel, et al. "Region-Based CNN for Anomaly Detection in PV Power Plants Using Aerial Imagery." Sensors 22.3 (2022): 1244 (18 pages).
Li, Xiaoxia, et al. "Deep learning based module defect analysis for large-scale photovoltaic farms." IEEE Transactions on Energy Conversion 34.1 (2018): 520-529.

* cited by examiner

3526

4502

4500

4502

4800

4802

Laser Line Generation:
Vertical (Tube) and
Horizontal (Clamp)

4804

Camera Uses Leser Lines to Locate Tube and Clamp, and Uses Ring Light (Below) to Locate Nut.

AUTONOMOUS SOLAR INSTALLATION USING ARTIFICIAL INTELLIGENCE

RELATED APPLICATION DATA

This application is based on and claims priority under 35 U.S.C. § 119 to U.S. Provisional Application No. 63/397,125, filed Aug. 11, 2022, the entire contents of which is incorporated herein by reference.

BACKGROUND

Field of the Invention

The present disclosure generally relates to a solar panel handling system, and more particularly, to a system and method for installation of solar panels on installation structures.

Discussion of the Related Art

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Installation of a photovoltaic array typically involves affixing solar panels to an installation structure. This underlying support provides attachment points for the individual solar panels, as well as assists with routing of electrical systems and, when applicable, any mechanical components. Because of the fragile nature and large dimensions of solar panels the process of affixing solar panels to an installation structure poses unique challenges. For example, in many instances the solar panels of a photovoltaic array are installed on a rotatable structure which can rotate the solar panels about an axis to enable the array to track the sun. In such instances, it is difficult to ensure that all of the solar panels in an array are coplanar and leveled relative to the axis of the rotatable structure. Additionally, the installation costs for photovoltaic array can be a considerable portion of the total build cost for the photovoltaic array. Thus, there is a need for a more efficient and reliable solar panel handling system for installing solar panels in photovoltaic array. Conventional computer vision techniques may be used when the environment is ideal. However, glare, over- or under-exposure can negatively affect object detection algorithms.

Use of solar panels is particularly suited to tropical and/or equatorial installations, which are ideal for sun availability, but are difficult working environments. Thus, there is a need for autonomous, robotic solutions to install solar panels in such environments. But to do so, also means improvements in robotic installation are needed, such as those related to one or more of guiding and navigating automatic picking of panels from shipping or storage containers, such as a crate, and correct placement on installation hardware, such as a torque tube, and in alignment with any previously placed panel(s), and detection (and avoidance) of potential mechanical structures, jigs and fixtures, like clamps and fan gears.

SUMMARY

Accordingly, the present invention is directed to a solar panel handling system that substantially obviates one or more of the problems due to limitations and disadvantages of the related art.

The solar panel handling system disclosed herein facilitates the installation of solar panels of a photovoltaic array on a pre-existing installation structure such as, for example, a torque tube. Installing solar panels can be made more efficient and reliable by combining tooling for handling the solar panel with components that enable mating of the solar panel to the solar panel support structure. Some embodiments use machine learning techniques to overcome environmental inconsistencies. The system can learn from examples with glare and illumination issues, and can generalize to new data during inference.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system for installing a solar panel may comprise an end of arm assembly tool comprising a frame and suction cups coupled to the frame, and a linear guide assembly coupled to the end of arm assembly tool, wherein the linear guide assembly includes: a linearly moveable clamping tool including an engagement member configured to engage a clamp assembly slidably coupled to an installation structure, a force torque transducer configured to move the clamping tool along the installation structure, and a junction box coupled to the frame and including a controller configured to control the force torque transducer and the suction cups, and a power supply.

In another aspect, a method of installing a solar panel may comprise engaging an end of arm assembly tool with a solar panel, the end of arm assembly tool comprising a frame and suction cups coupled to the frame, positioning the solar panel relative to an installation structure having a clamp assembly slidably coupled thereto, engaging a linear guide assembly coupled to the end of arm assembly tool with the clamp assembly, the linear guide assembly comprising a linearly moveable clamping tool including an engagement member configured to engage the clamp assembly and a force torque transducer configured to move the clamping tool along the installation structure, and actuating the force torque transducer to move the clamp assembly along the installation structure so as to engage with a side of the solar panel, thereby fixing the solar panel relative to the installation structure.

In another aspect, a method of installing a solar panel may comprise using machine learning algorithms to automatically detect the center and corners of the solar panel (of varying sizes) to direct a robot to accurately pick and place the solar panel. In some embodiments, the method includes isolating the center and corners of the solar panels, and placing the solar panels in relation to a mounting, such as a torque tube, and a previously placed panel. In some embodiments, the method includes detecting ancillary equipment or structures, such as clamps and/or fan gears. In some embodiments, the techniques described herein do not use synthetic imagery and is thus a simulation based approach that employs a predictor-corrector schema with possible emulation.

In another aspect, a method of installing a solar panel may include obtaining a first image of a solar panel during an in-progress solar installation. The method also includes estimating a plurality of features of the solar panel based on the first image using distance simulation, geometric correction and angular adjustment and generating a first set of control signals, based on the estimated plurality of features, for operating a first robotic controller for picking the solar panel. The method also includes obtaining a second image of the solar panel when the solar panel is in a perspective view and detecting placement of the solar panel based on the second image by determining if the solar panel is co-planar with and at a predetermined offset from a fixed solar panel, i.e., an already mounted solar panel. The method also includes generating a second set of control signals, based on the detected placement, for operating a second robotic controller for aligning the solar panel with the fixed solar panel.

In another aspect, a method of installing a solar panel may include obtaining a first image of a solar panel in a staging area using a viewing camera. The method also includes estimating a plurality of areas/features of the solar panel based on the first image using at least one of distance simulation, geometric correction and angular adjustment. The method also includes generating a first set of control signals for operating a first robotic controller for picking the solar panel, where the first set of control signals are based on one or more of the estimated plurality of areas/features. The method also includes obtaining a second image of the solar panel when the solar panel is picked and is in a perspective orientation relative to the viewing camera and detecting an orientation in space of the picked solar panel based on the second image. The method also includes generating a second set of control signals, based on the detected orientation, for moving the picked the solar panel to an installation position. The installation position aligns the picked solar panel with a previously installed solar panel. The floating/picked panel is moved into place to align with the fixed panel on the torque tube. "Moved into place" means that the floating panel is directionally, distance wise and orientation wise, aligned with the fixed (reference) panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated herein and form part of the specification, illustrate the present invention and, together with the description, further serve to explain principles of the invention and to enable a person skilled in the relevant arts to make and use the invention. The exemplary embodiments are best understood from the following detailed description when read in conjunction with the accompanying drawings. It is emphasized that, according to common practice, the various features of the drawings are not to scale. On the contrary, the dimensions of the various features are arbitrarily expanded or reduced for clarity. Included in the drawings are the following figures.

Figure 1:
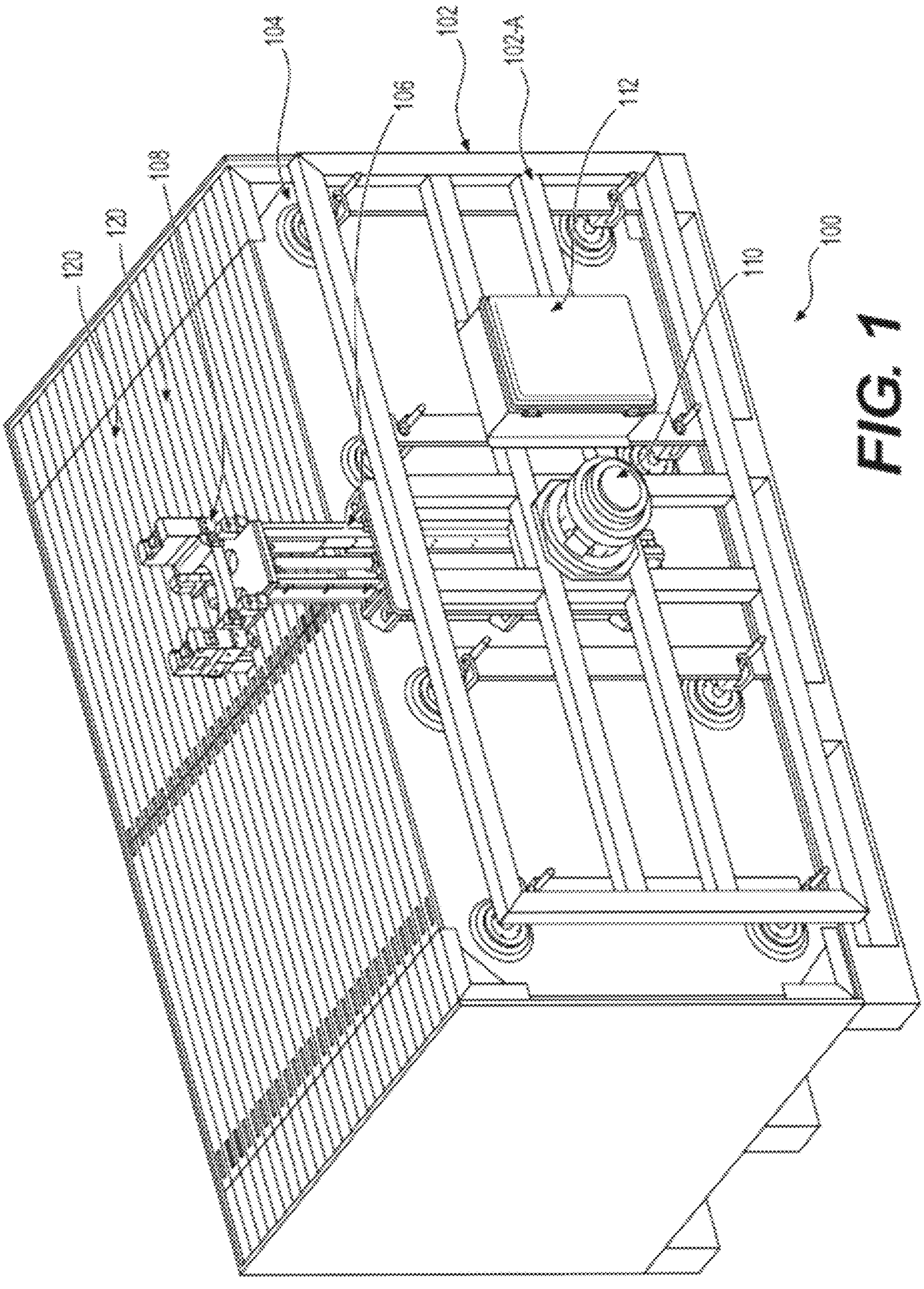
FIG. 1 shows a perspective view of a solar panel handling system along with a container of solar panels, in accordance with an embodiment of the present disclosure.
Figure 2A:
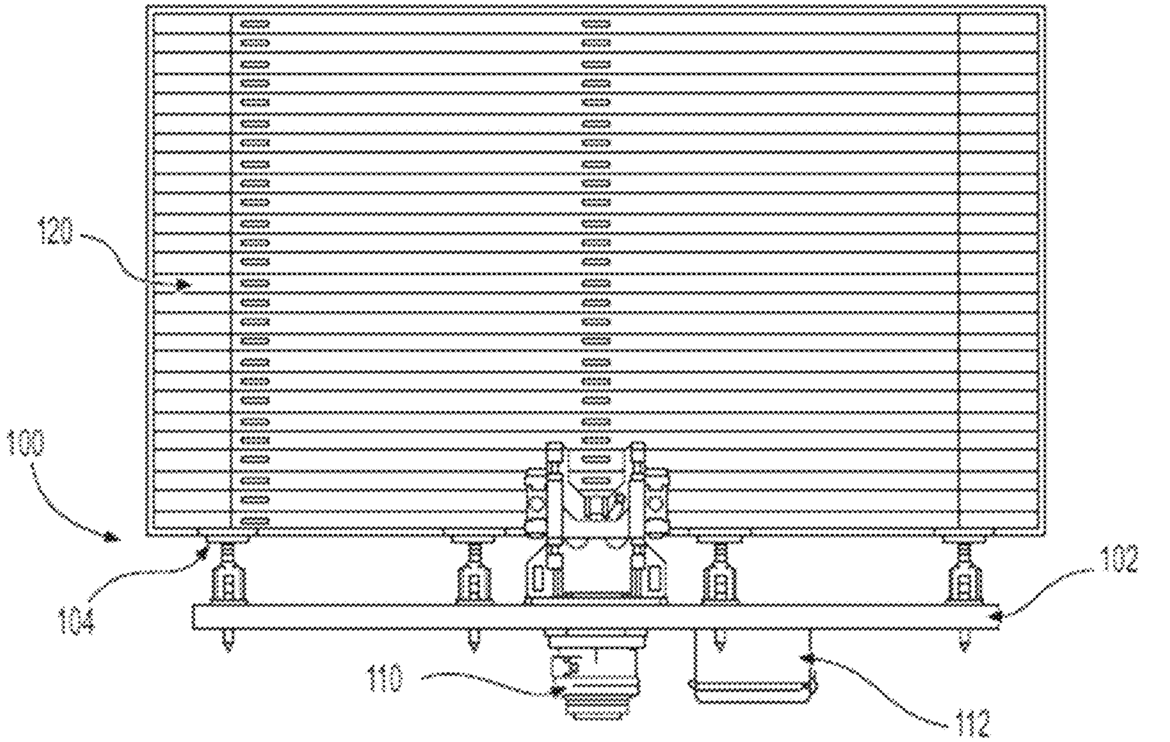
FIG. 2A-2C show a top, front, and side view, respectively, of the solar panel handling system and container of solar panels of FIG. 1.
Figure 2B:
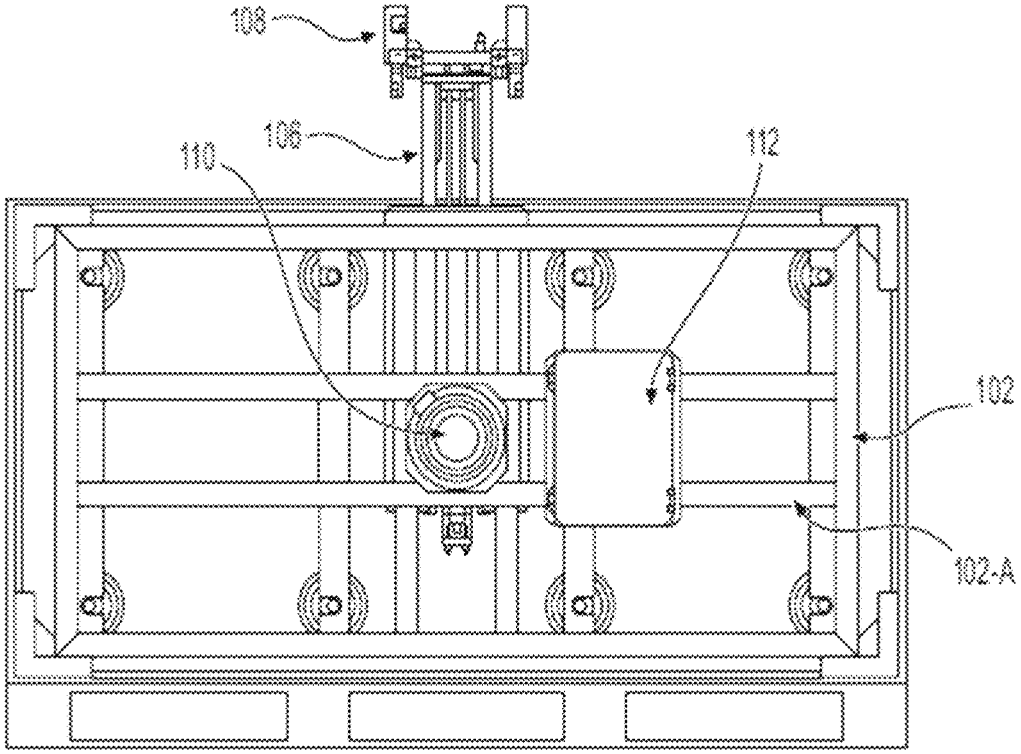
Figure 2C:
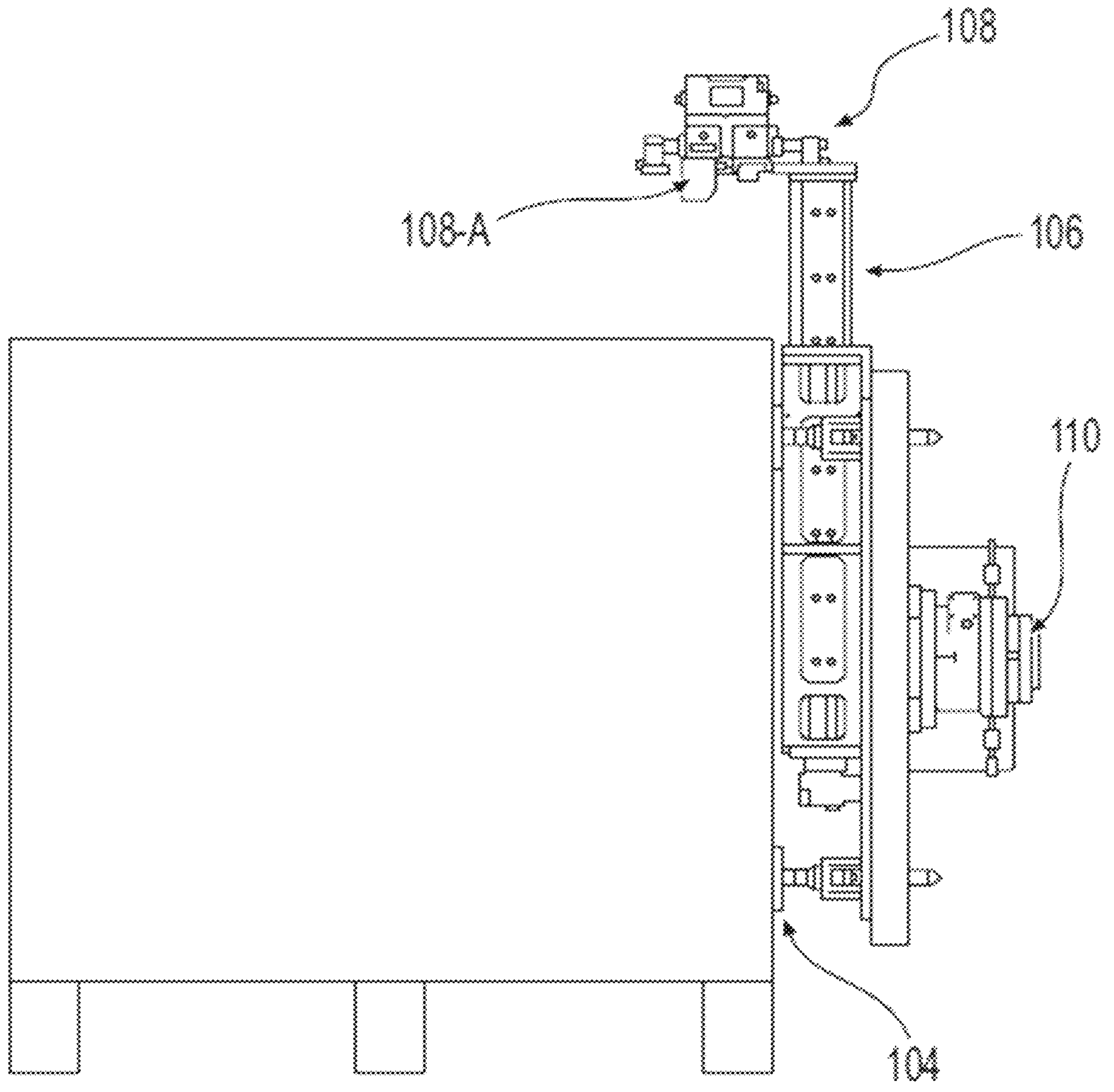
Figure 3A:
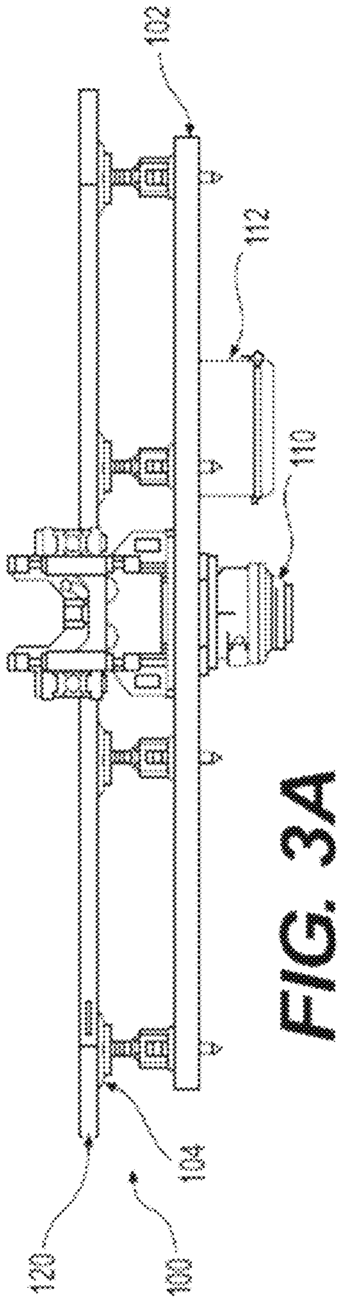
FIGS. 3A-3C shows a top (FIG. 3A), front (FIG. 3C), and side view (FIG. 3B) of the solar panel handling system coupled to a single solar panel, in accordance with an embodiment of the present disclosure.
Figure 3C:
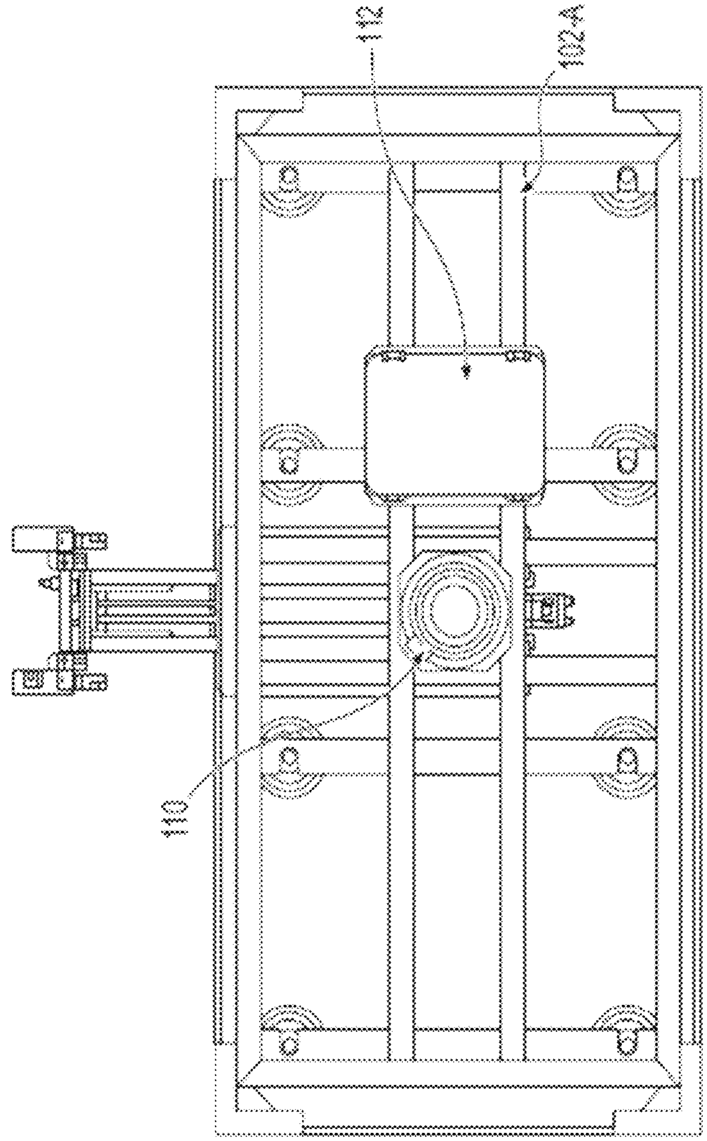
Figure 3B:
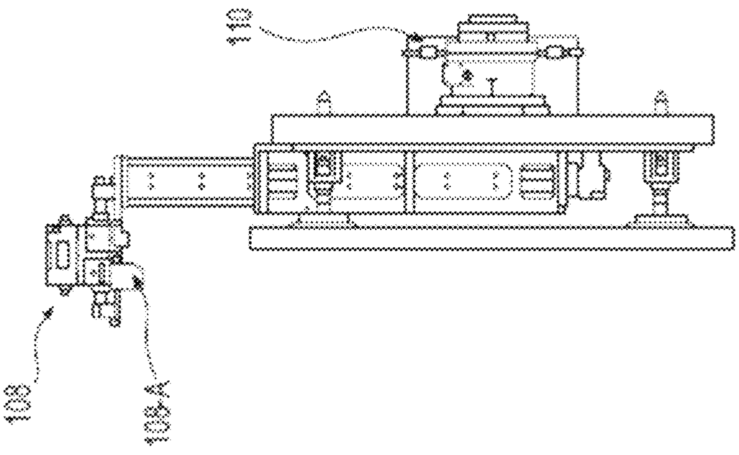
Figure 4A:
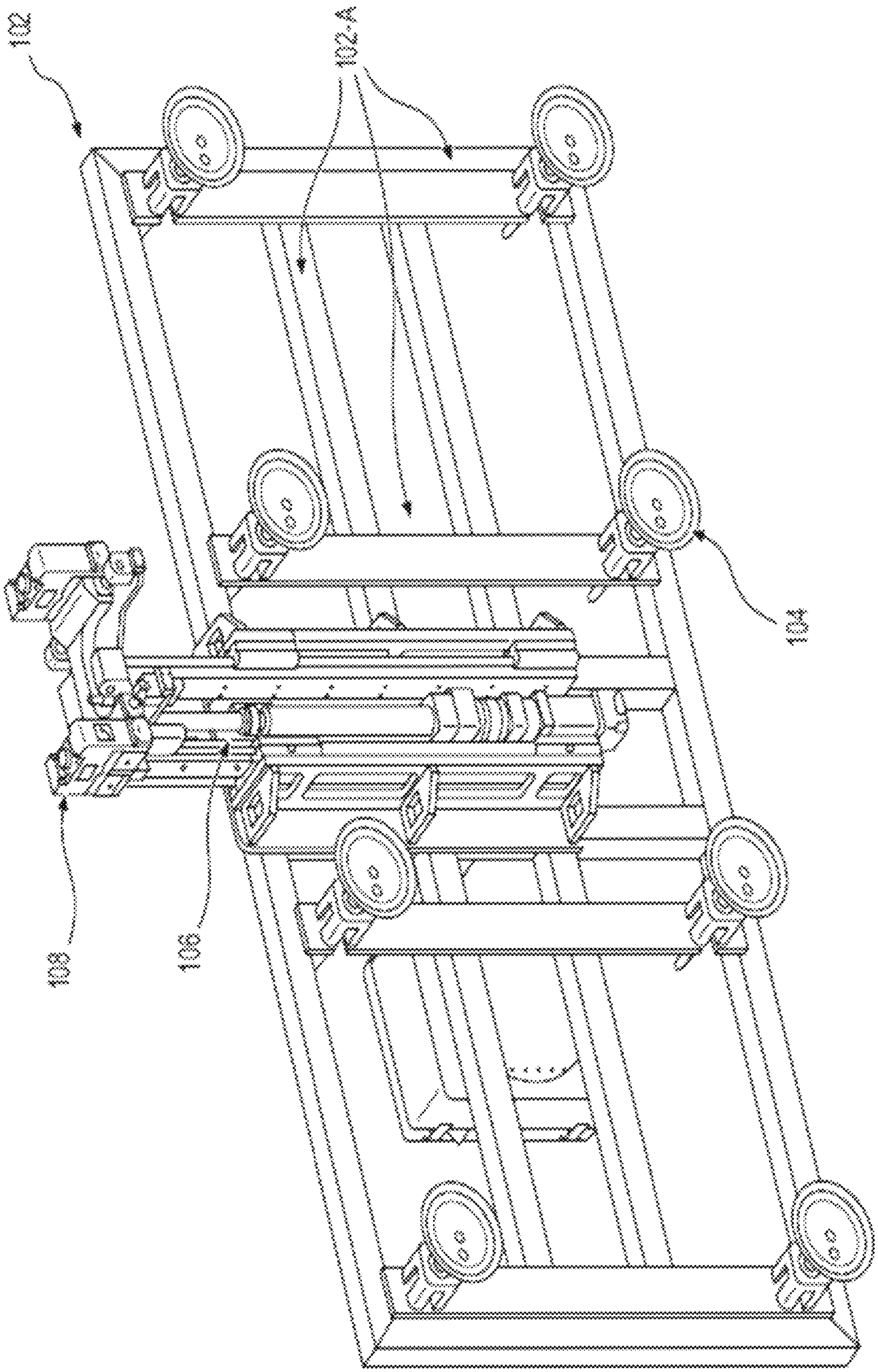
FIGS. 4A and 4B show perspective views of the solar panel handling system, in accordance with an embodiment of the present disclosure.
Figure 4B:
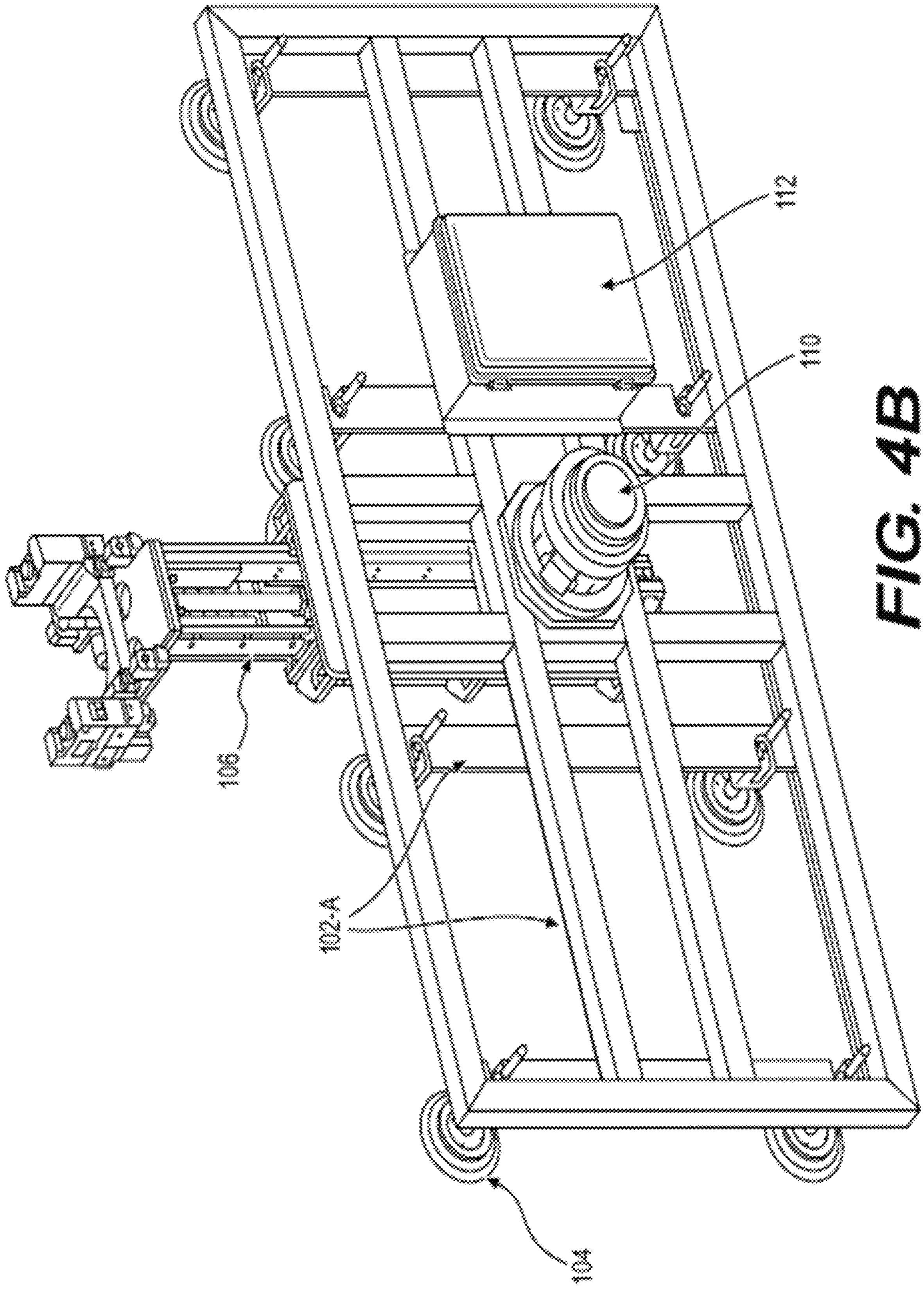
Figure 5A:
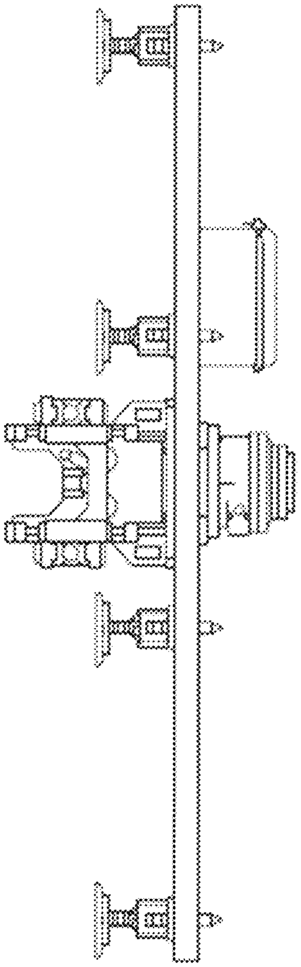
FIGS. 5A and 5B show a top view and a front view, respectively, of a solar panel handling system, in accordance with an embodiment of the present disclosure.
Figure 5B:
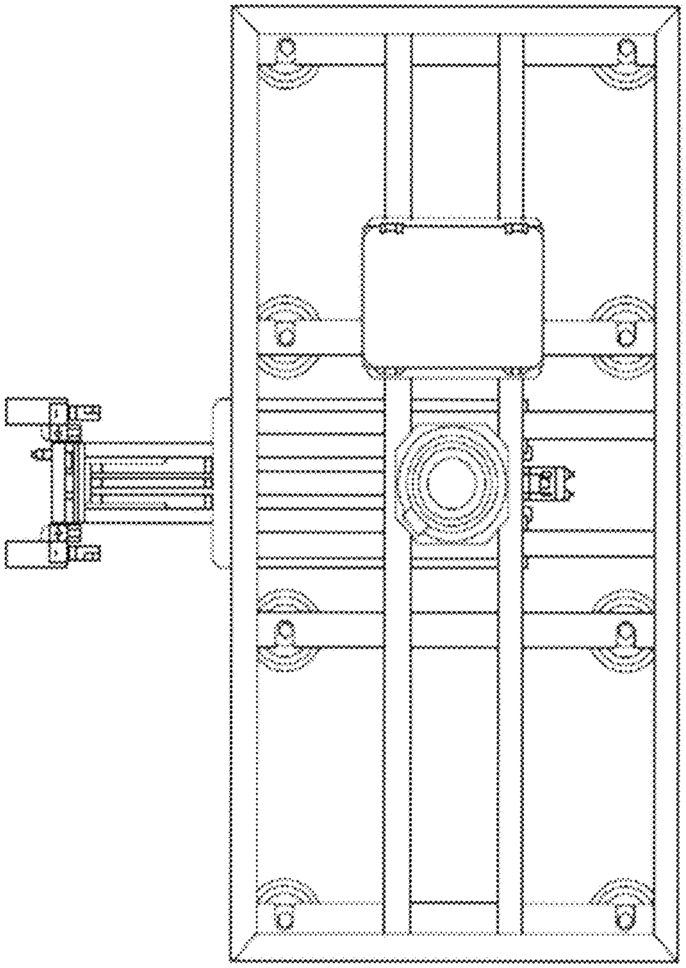
Figure 5D:
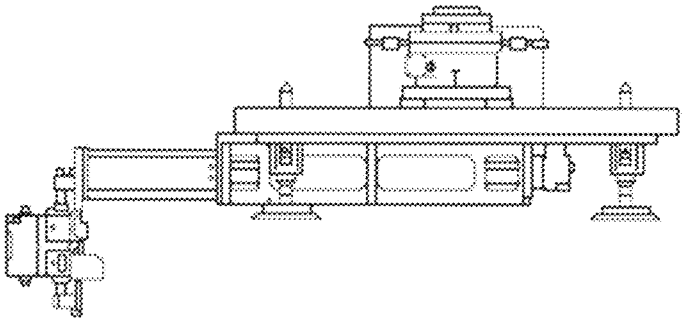
FIG. 5D shows a side view with a clamping tool in an extended or advanced position, in accordance with an embodiment of the present disclosure.
Figure 5C:
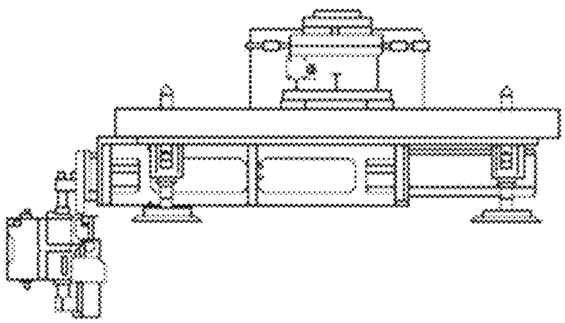
FIG. 5C shows a side view with a clamping tool of the solar panel handling system in a retracted position, in accordance with an embodiment of the present disclosure.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Reference will now be made in detail to embodiments of the present invention, examples of which are illustrated in the accompanying drawings.

FIG. 1 shows a perspective view of a solar panel handling system along with a box of solar panels, in accordance with an embodiment of the present disclosure. The solar panel handling system may include an end of arm assembly tool 100 which can couple to individual solar panels 120 from a box of solar panels and move them to a position relative to an installation structure for installation.

The end of arm assembly tool 100 may include a frame 102 and one or more attachment devices 104 coupled to the frame 102. Example attachment devices 104 include suction cups or other structures that can be releasably attached to the surface of the solar panel 120 and, at least in the aggregate, maintain attachment during manipulation of the solar panel 120 by the end of arm assembly tool 100. The frame 102 may consist of several trusses 102-A for providing structural strength and stability to the frame 102. The frame 102 also functions as a base for the end of arm assembly tool 100 and other related components of the solar panel handling system disclosed herein.

Other related components of the solar panel handling system disclosed herein may be coupled to the frame 102 so as to fix a relative position of the components on the end of arm assembly tool 100. One or more of the various components of the solar panel handling system may be coupled to one or more of the trusses 102-A so as to fix a relative position of the components on the end of arm assembly tool 100.

The attachment devices 104 are configured to reliably attach to a planar surface such, as for example, a surface of a solar panel, such as by using vacuum. In a suction cup embodiment, the suction cups can be actuated by pushing the cup against the planar surface, thereby pushing out the air from the cup and creating a vacuum seal with the planar surface. As a consequence, the planar surface adheres to the suction cup with an adhesion strength that is dependent on the size of the suction cup and the integrity of the seal with the planar surface. In some embodiments, the suction cups engage with the solar panel to create an air-tight seal, and then a vacuum pump sucks the air out of the suction cups, generating the vacuum required for the proper adhesion to the solar panel. In some embodiments, an air inlet (not shown) provides air onto the planar surface when the planar surface is sealed to the suction cup so as to deactivate the vacuum and release the planar surface from the suction cup.

The system may further include a linear guide assembly 106 coupled to the end of arm assembly tool 100. The linear guide assembly 106 includes a linearly movable clamping tool 108 with an engagement member 108-A configured to engage a clamp assembly coupled to an installation structure. The linear guide assembly 106 can be actuated to move the clamping tool 108 along an axis between, for example, an extended position and a retracted position. The axis of movement of the clamping tool 108 may be parallel to an axis of the installation structure. Thus, the linear guide assembly 106 can move the clamping tool 108 and the engagement member 108-A along the installation structure.

Figure 6B:
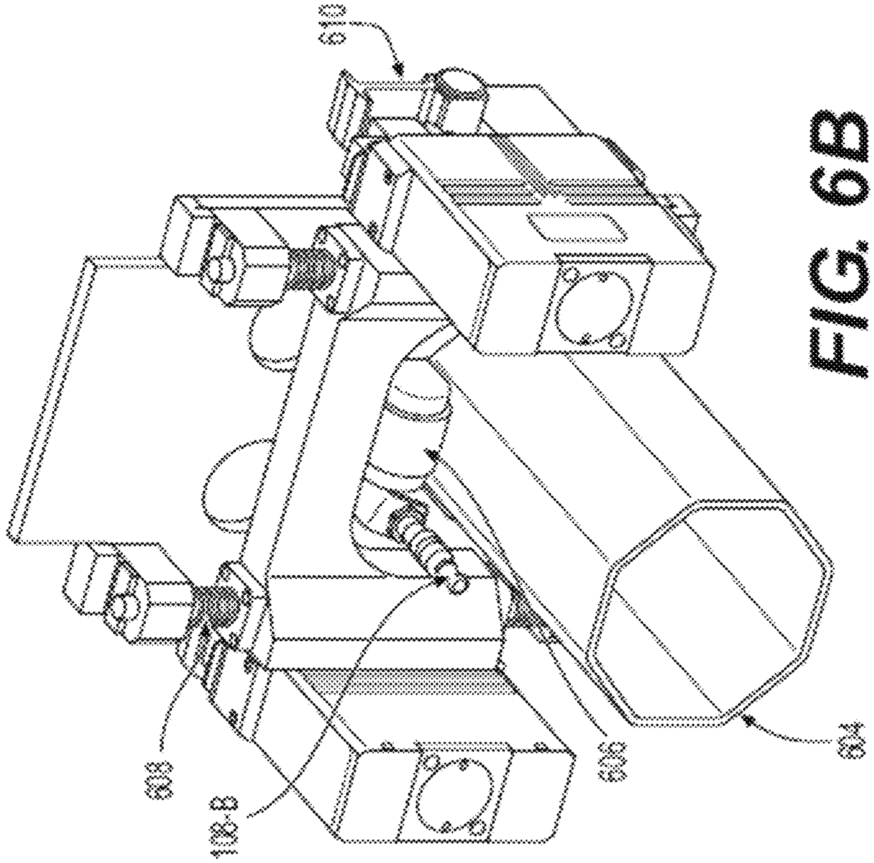
FIGS. 6A and 6B show perspective views of the clamping tool of a solar panel handling system in engagement with a clamp assembly coupled to an installation structure, in accordance with an embodiment of the present disclosure.
Figure 6A:
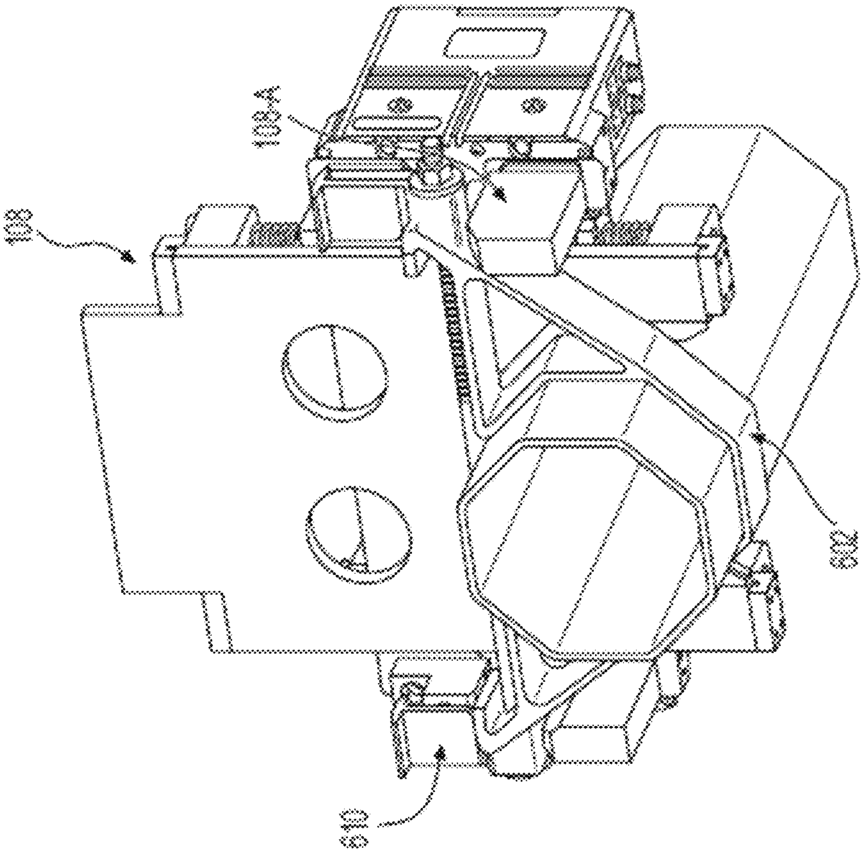
Figure 7A:
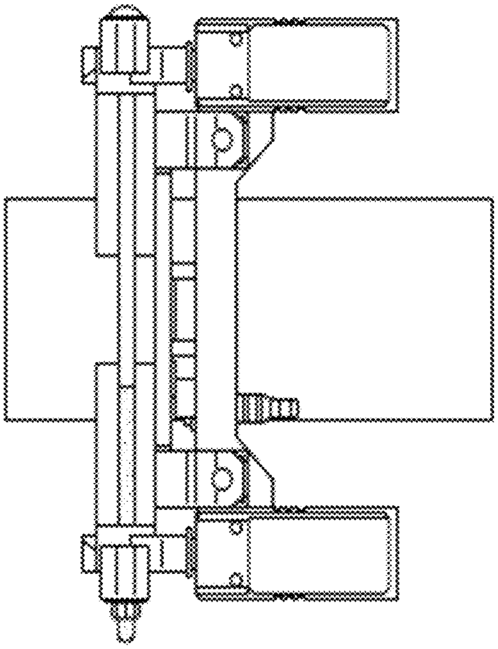
FIG. 7A shows a top view of the clamping tool of the solar panel handling system in engagement with a clamp assembly coupled to an installation structure, in accordance with an embodiment of the present disclosure.
Figure 7B:
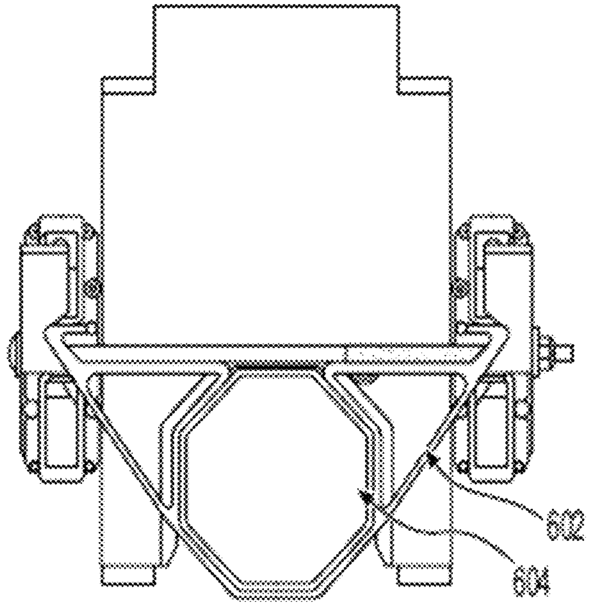
FIG. 7B shows a front view of the clamping tool of the solar panel handling system in engagement with a clamp assembly coupled to an installation structure, in accordance with an embodiment of the present disclosure.
Figure 7C:
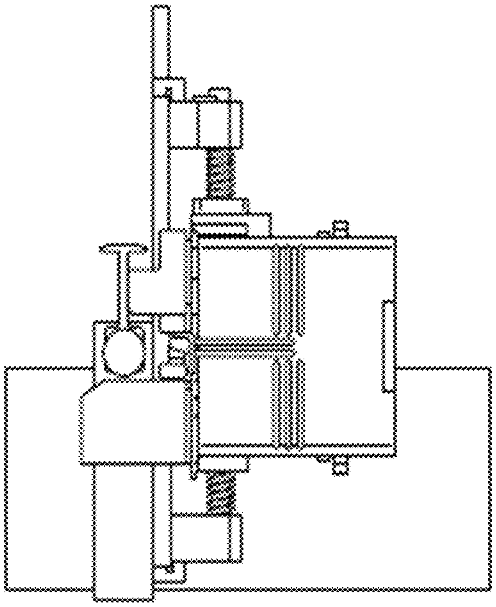
FIG. 7C shows a side view of the clamping tool of the solar panel handling system in engagement with a clamp assembly coupled to an installation structure, in accordance with an embodiment of the present disclosure.
Figure 7D:
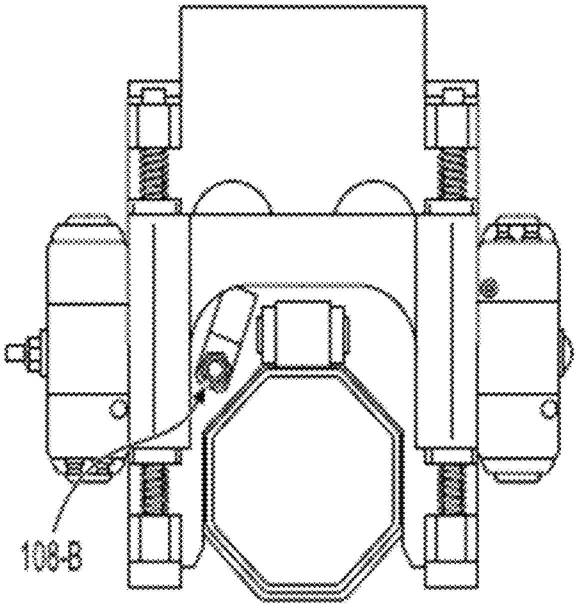
FIG. 7D shows a back view of the clamping tool of the solar panel handling system in engagement with a clamp assembly coupled to an installation structure, in accordance with an embodiment of the present disclosure.

In some embodiments, the engagement member 108-A may include electromagnets which may be actuated to grasp a clamp assembly 602 (see FIG. 6A, 6B). Alternatively, or additionally, the engagement member 108-A may include a gripper to prevent disengagement between the clamp assembly 602 and the engagement member 108-A when the linear guide assembly 106 is actuated to move the clamping tool relative to the installation structure as described in more detail elsewhere herein.

The linear guide assembly 106 is actuated using a force torque transducer 110. In some embodiments, the linear guide assembly 106 and the force torque transducer 110 may form a rack and pinion structure such that the rotation of the force torque transducer 110 results in advancement or retraction of the clamping tool 108. In some embodiments, the linear guide assembly 106 may be a hydraulic assembly including a telescoping shaft coupled to the clamping tool 108. In such embodiments, the force torque transducer 110 may be configured in the form of a pump for pumping a hydraulic fluid. In other embodiments, the force torque transducer 110 may be configured in the form of or coupled to a liner drive motor that engages a surface of the telescoping shaft coupled to the clamping tool 108.

In some embodiments, the linear guide assembly 106 may include an electric rod actuator to move the clamping tool 108 parallel to an axis of the installation structure.

In some embodiments, the guide assembly 106 may include a roller 606 to facilitate the movement of the clamping tool 108 along the installation structure 604. The roller may, for example, include a bearing or other components designed for reducing friction while the clamping tool 108 moves relative to the installation structure. The roller may be coupled with a sensor, such as by a force sensor or rotation sensor, to provide feedback to a controller.

In some embodiments, the guide assemble may include a spring mechanism 608 that enables small amounts of tilting (up to 15 degrees of tilt) of the clamping tool 108 relative to the installation structure 604. Such tilting may occur when the orientation assembly 804 tilts the end of arm assembly tool 100 relative to the installation structure 604 in order to appropriately level the solar panel.

The system may further include a junction box 112 coupled to the frame 102. The junction box 112 may include a controller configured to control the force torque transducer 110 and the attachment devices 104. In some embodiments, the junction box 112 may also include a power supply or a power controller for controlling the power supply to various components.

In some embodiments, the controller 112 may include a processor operationally coupled to a memory. The controller 112 may receive inputs from sensors associated with the solar panel handling system (e.g., an optical sensor or a proximity sensor 108-B described elsewhere herein). The controller 112 may then process the received signals and output a control command for controlling one or more components (e.g., the linear guide assembly 106, the clamping tool 108, or the attachment devices 104). For example, in some embodiments, the controller 112 may receive a signal from a proximity sensor determining that the clamp assembly is approaching a trailing edge of a solar panel being installed and accordingly reduce the speed of the linear guide assembly 106 to reduce excessive forces and impacts on the solar panel.

Figure 8:
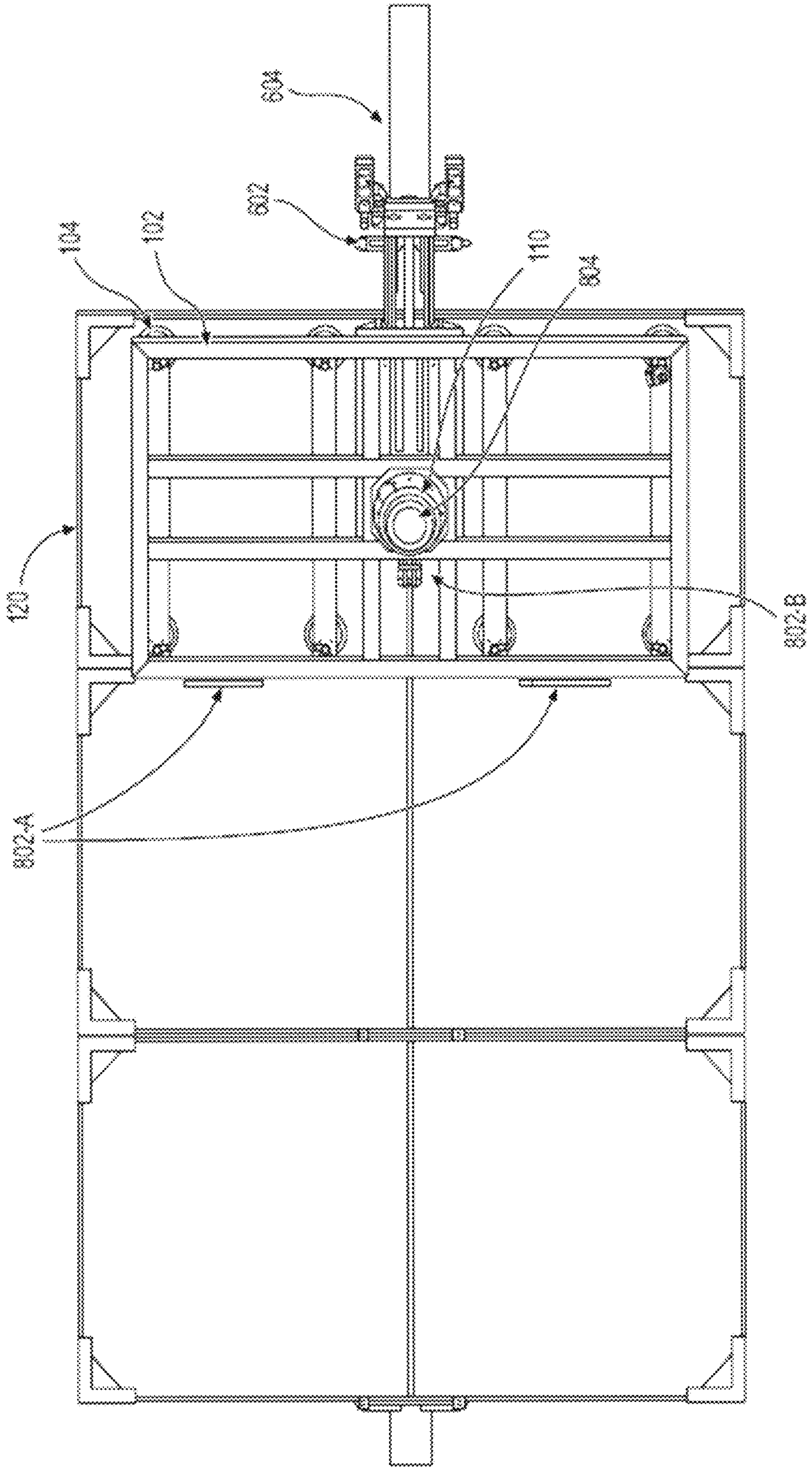
FIG. 8 schematically illustrates, in an overhead view, the solar panel handling system during the process of installing a solar panel, in accordance with an embodiment of the present disclosure.

Referring to FIG. 8, in some embodiments, the solar panel handling system may further include an optical sensor 802 such as, for example, a camera, a photodetector, or any other optical imaging or light sensing device. The optical sensor is suitably located on the frame 102, for example, at an outer or lower surface of an edge member indicated by position 802-A in FIG. 8, or at an interior location of the frame 102 that has a field of view that includes the leading edge of the solar panel, such as indicated by position 802-B in FIG. 8. The optical sensor may be configured to sense an orientation of the solar panel relative to the installation structure during the operation of the end of arm assembly tool. In some embodiments, the optical sensor may be configured in the form of one or more light guided levels (not shown). In such embodiments, one or more light beams (e.g., laser beams) may be projected along or parallel to the axis of the installation structure 604 from one end of the end of arm assembly tool 100, such as first locations on the frame 102. One or more photodetectors may be positioned at another end of the end of arm assembly tool 100, such as second locations on the frame 102, so as to detect the one or more laser beams. Thus, if the solar panel 120 being installed is not appropriately oriented or properly level relative to the installation structure 604, the solar panel 102 may obstruct the some or all of one or more laser beams resulting in varying signals from the one or more photodetectors, indicating that the solar panel 120 is not appropriately oriented or properly level relative to the installation structure 604.

In some embodiments, one or more sensors, such as optical sensors 802, may be used to detect and recognize objects to position and control the installation with improved accuracy. The sensor(s) may be implemented together with a neural network of, for example, an artificial intelligence (AI) system. For example, a neural network can include acquiring and correcting images related to the solar panel handling system, the solar panels (both installed and to be installed), and the installation environment (both natural environment, such as topography, and installed equipment, such as structures related to the solar panel array). Also, for example, a neural network can include acquiring and correcting positional or proximity information. The corrected images and/or the corrected positional or proximity information are input into the neural network and processed to estimate movement and positioning of equipment of the solar panel handling system, such as that related to autonomous vehicles, storage vehicles, robotic equipment, and installation equipment. The estimated movement and positioning are published to a control system associated with the individual equipment of the solar panel handling system or to a master controller for the solar panel handling system as a whole.

In some embodiments, the signal from the optical sensor may be input to the controller. In some embodiments, the solar panel handling system may further include an orientation assembly 804 (see FIG. 8) configured to tilt the end of arm assembly tool 100 relative to the installation structure 604. In such embodiments, the controller 112 may control the orientation in response to an input from the optical signal indicating that the solar panel being installed is not appropriately oriented or properly level relative to the installation structure, such as a torque tube 604. It will be appreciated that while the orientation assembly 804 is shown as being coupled to the force torque transducer 110, those of ordinary skill in the art will readily recognize other means of implementing the orientation assembly 804.

In some embodiments, the controller 112 may also be configured to control the attachment devices 104 so as to activate or deactivate the attachment/detachment thereof. For embodiments in which the attachment devices 104 are suction cups, a vacuum can enable coupling or release of the solar panels 120 with the end of arm assembly tool 100.

In some embodiments, the installation structure 604 may have an octagonal cross-section, as shown, e.g., in FIGS. 6A, 6B, and 7A-7D, to form a torque tube preventing inadvertent slipping of the clamp assembly 602. However, other cross-sectional shapes may be used, such as squared, oval, or other shape. Further, the installation structure 604 may use a circular cross-sectional shapes.

Figure 9:
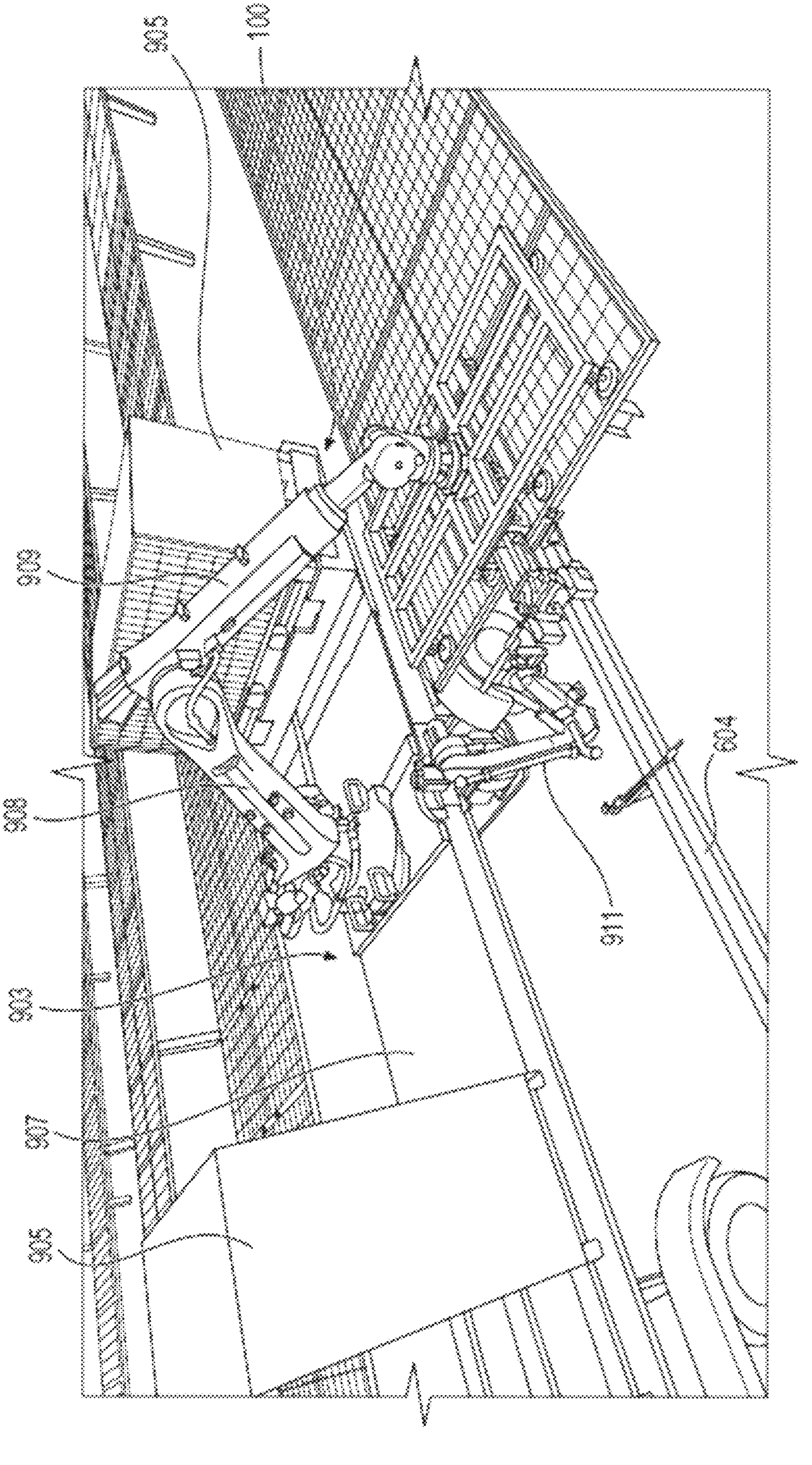
FIG. 9 illustrates the solar panel handling system including the assembly tool coupled with an assembly moving robot using a robotic arm.
Figure 10:
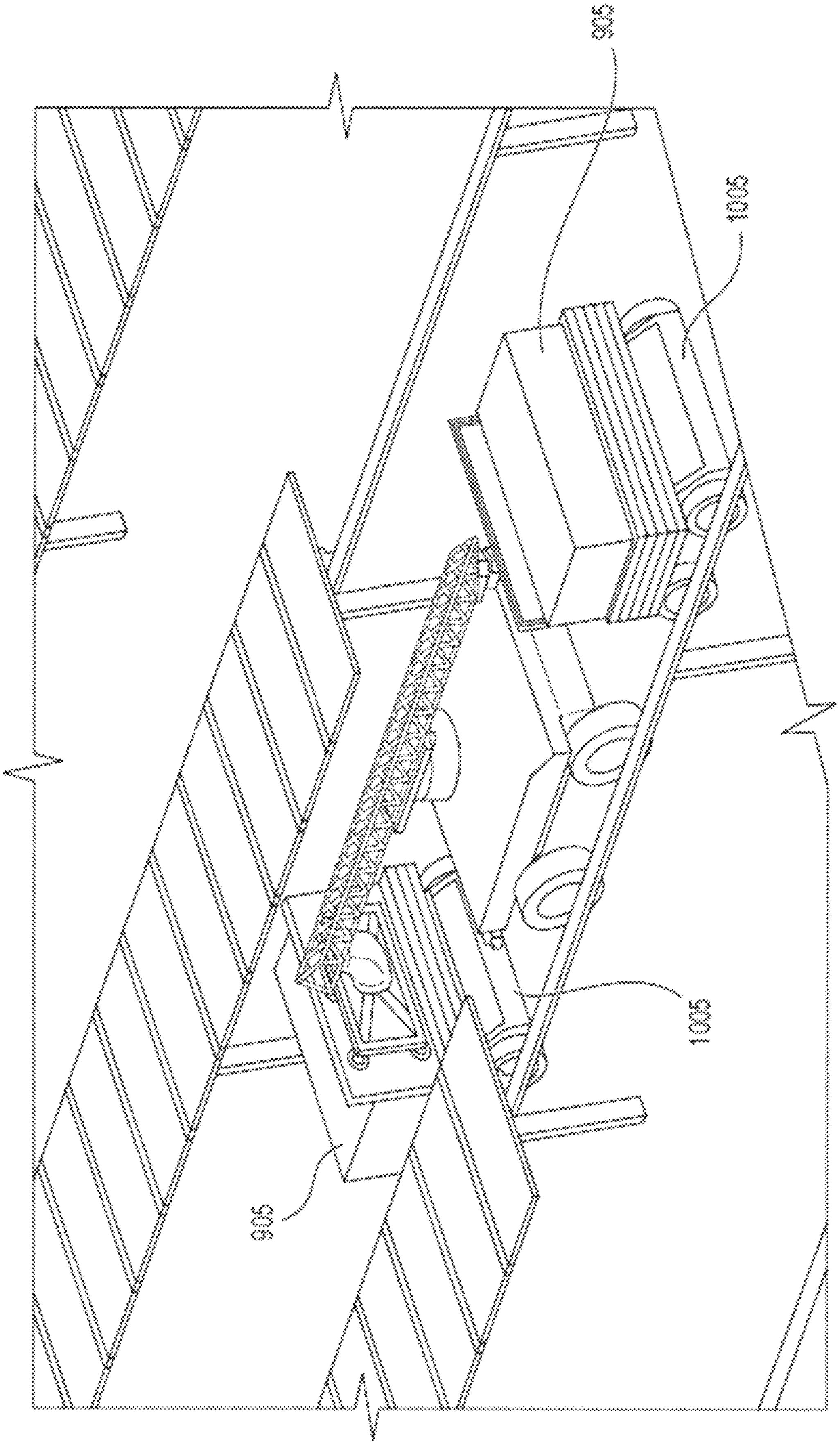
FIG. 10 illustrates the solar panel handling system having two robotic arms in which two assembly tools are coupled with an assembly moving robot using respective robotic arms.

In some embodiments, the assembly tool 100 may be configured to couple with an assembly moving robot 903 (an example of which is shown in FIGS. 9 and 10). The assembly moving robot 903 may be configured to position the end of the arm assembly tool 100 relative to a stack or storage container 905 of solar panels, move a selected solar panel and position the selected solar panel relative to the installation structure 604. In some embodiments, the assembly moving robot 903 may be operationally coupled with the end of arm assembly tool 100 via the force transducer 110 (or where applicable, the orientation assembly 804). In some embodiments, the assembly moving robot may also be operationally coupled to the controller, enabling an operator of the assembly moving robot to control the various functions of the end of arm assembly tool 100, such as, for example, activation and/or deactivation of the attachment devices 104, advancement and/or retraction of the clamping tool, and/or activation and/or deactivation of the engagement member relative to the clamp assembly.

Referring now to FIGS. 1, 6A, 6B, 7A-7D, 9, and 10, in operation, a solar panel 120 is obtained and positioned over the installation structure 604. The solar panel is then tilted relative to the installation structure 604 so that a leading edge of the solar panel (i.e., an edge that will be adjacent an edge of the previously installed solar panel or, for a first solar panel, an edge that will be adjacent a stop affixed to the installation structure 604) is oriented closer to the installation structure 604 than an opposite, trailing edge. The leading edge is then placed in a receiving channel (either a receiving channel positioned along the edge of the previously installed solar panel, i.e. as part of a clamp assembly, or a receiving channel in the stop) and the tilt of the solar panel reduced to an installed position on the installation structure. The tilt angle is reduced while the solar panel is biased into the receiving channel so that in the installed position the edge region of the top planar surface of the solar panel (i.e., the photovoltaically active surface that is oriented to the sun) is captured within the receiving channel. An example embodiment of a receiving channel 610 on a clamp assembly 602 is shown in FIGS. 6A and 6B.

Once the solar panel is in position on the installation structure, the force torque actuator 110 actuates the guide assembly 106 of the end of arm assembly tool 100 to contact the engagement member 108-A of the clamping tool 108 with a clamp assembly 602. This clamp assembly was originally positioned on the installation structure outside the area to be occupied by the solar panel being installed, but also sufficiently close so as to be reached by the relevant components of the end of arm assembly tool 100. Surfaces and features of the engagement member 108-A may be located and sized so as to mate with complimentary features on the clamp assembly 602. After this contact, the force torque actuator 110 is actuated (either continued to be actuated or actuated in a second mode) to axially slide the clamp assembly 602 along a portion of the length of the installation structure 604. Axially sliding of the clamp assembly 602 engages a receiving channel of the clamp assembly 602 with the trailing edge of the just installed solar panel. Sensors, such as in the force torque actuator 110 or in the clamping tool 108, can provide feedback to the controller indicating full engagement of the receiving channel of the clamp assembly 602 with the trailing edge of the solar panel. Once the clamp assembly 602 is positioned, the guide assembly 106 is retracted and installation of the next solar panel can occur.

In some embodiments, the linear guide assembly 106 may include a proximity sensor 108-B configured to sense a distance between the engagement member 108 and the trailing edge of the solar panel 120 during an operation of installation of the solar panel 120. An output from the proximity sensor 108-B may be used to suitably control the speed of the clamping tool 108 during the operation of linear guide assembly 106 so as to avoid excessive forces and impacts on the solar panel 120. In some embodiments, the proximity sensor 108-B may be, for example, an optical or an audio sensor (e.g., sonar) that detects a distance between the leading edge of the solar panel 120 and the engagement member 108; in other embodiments, the proximity sensor 108-B may be a limit switch that is retracted by contact.

With further reference to FIGS. 9 and 10, the assembly moving robot 903 may be implemented using a ground vehicle 907. For example, the ground vehicle 907 may be implemented as an electric vehicle (EV). The ground vehicle 907 may autonomously move adjacent to the installation structure 604. While not shown, the ground vehicle 907 may move along a track or a rail that is attached to or separate from the installation structure. In some embodiments, the ground vehicle 907 may be controlled using sensors or be controlled based on input or feedback from sensors. The sensors can be, for example, optical sensors or proximity sensors. In further embodiments, a neural network using artificial intelligence may be used in controlling movement of the ground vehicle 907, such as by analyzing the operating environment and developing instructions for movement and of the ground vehicle.

FIG. 10 illustrates an embodiment of a solar panel handling system having two robotic arms in which two assembly tools are coupled with an assembly moving robot using respective robotic arms.

As shown FIG. 9, the storage container 905 containing the solar panels to be installed may be disposed on the ground vehicle. Here, FIG. 9 illustrates the solar panel handling system including an arm assembly tool 100 coupled with an assembly moving robot using a robotic arm. Alternatively, as shown in FIG. 10, one or more storage containers 905 may be disposed on respective one or more of module vehicles 1005 adjacent to the ground vehicle 907. As such, FIG. 10 illustrates the solar panel handling system having two robotic arms in which two assembly tools are coupled with an assembly moving robot using respective robotic arms. In embodiments of the disclosure, the robotic arm(s) may be an articulated arm having two or more sections coupled with joints, or alternatively may be a truss arm. Illustrations herein are intended to disclose the use of any type of arm in accordance with the present disclosure.

In accordance with FIG. 9, for example, the robotic arm of the arm assembly tool 100 having an upper section 908 and a lower section 909 may offer increased flexibility in operation while maintaining light weight and simple operation. As additionally illustrated in FIG. 9, a second robotic arm 911 may be provided with the arm assembly tool 100 having a nut runner or nut driver at an end thereof to secure the solar panel to the installation structure 604. While any type of robotic arm may be used for the second robotic arm 911, FIG. 9 illustrates an example using an articulated arm with the nut runner or nut driver at an end thereof. Here, the robotic arms 100 and 911 may be autonomous operated using computer vision with a neural network and artificial intelligence control. Alternatively, the robotic arms 100 and 911 may be manually operated or remote control operated.

In some embodiments, the ground vehicle 907 may be an autonomous vehicle in which the neural network and artificial intelligence control the movement and operation and the module vehicles 1005 are towed or coupled to the ground vehicle 907. In other embodiments, the module vehicles 1005 may be an autonomous vehicle in which the neural network and artificial intelligence control the movement and operation and the ground vehicle 907 is towed or coupled to the module vehicles 1005. Also, in some embodiments, the assembly moving robot 903 is mounted on one of the ground vehicles 907 and the module vehicles 1005. In other embodiments, the assembly moving robot 903 can be mounted on a dedicated robot vehicle.

Figure 11A:
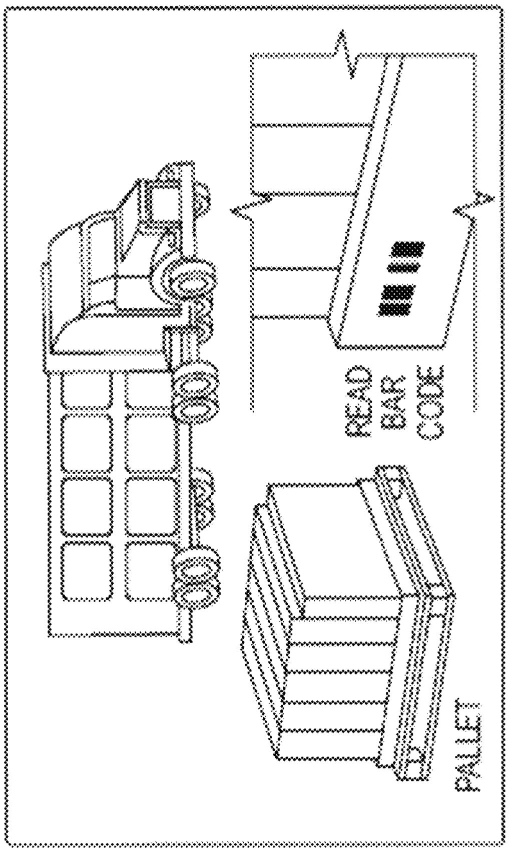
FIGS. 11A to 11C illustrate a process for installing the solar panels.
Figure 11B:
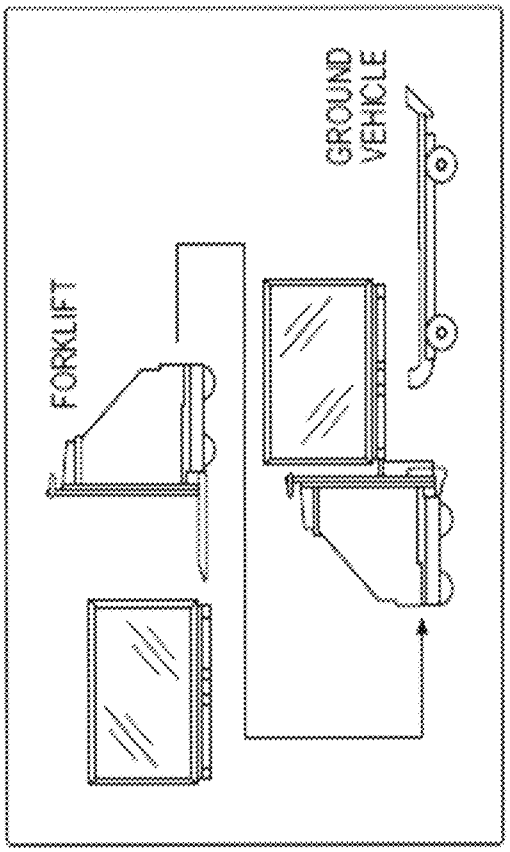
Figure 11C:
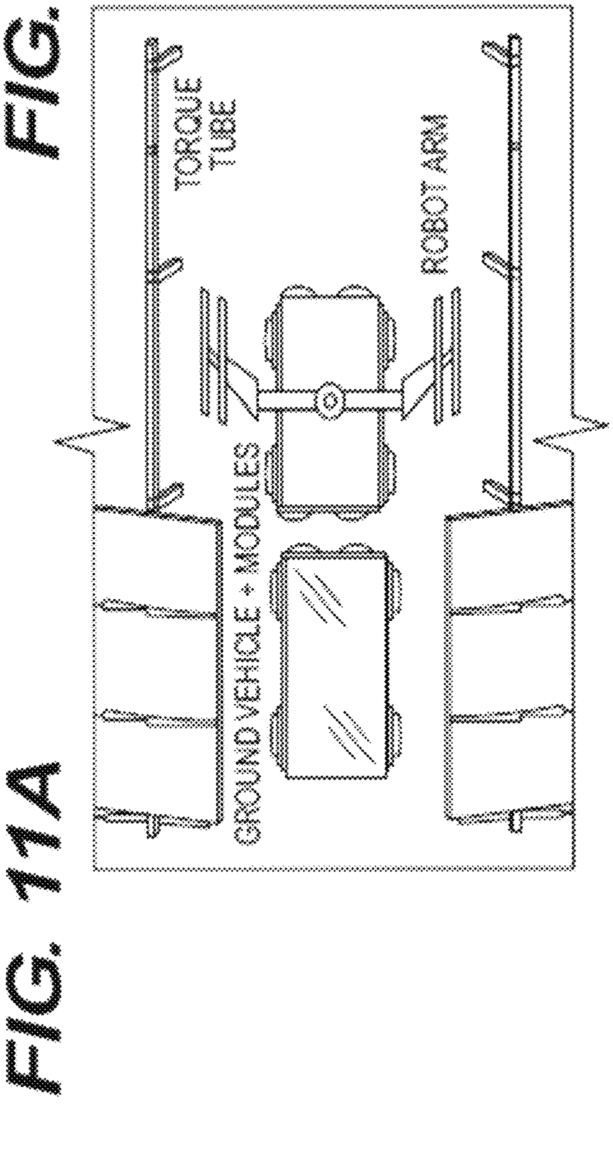

A process for installing the solar panels is shown in FIGS. 11A to 11C. As shown in FIG. 11A, a pallet of solar panels may be delivered via truck. In some embodiments, the pallet may compose the storage container 905 of solar panels. The pallet may include machine readable signage, such as a bar code, a QR-code, or other manufacturing reference, which can be read to provide information regarding the solar panels, the installation instructions or other information to be used in the installation process, particularly information to be used by the neural network and artificial intelligence control. Such information can include, for example, number of solar panels, the type of solar panels, physical characteristics of the solar panel such as size, characteristics related to installation, such as hardware type and location, installation instructions, or other characteristics of the solar panels, the storage of the solar panels on the pallet, and information related to installation. Further, using the machine-readable signage, the system may control feeding or replenishing the panels boxes in the right order and/or to ensure panels with similar impedance from the factory are used.

As shown in FIG. 11B, mechanized equipment such as a forklift may be used to move and position the pallet on the ground vehicle. Here, the forklift may be manually operated, remotely operated, or autonomous. In FIG. 11B, the pallet is positioned on the ground vehicle. Alternatively, the pallet may be positioned on a module vehicle. Then, as shown in FIG. 11C, the arm of the robot is used to install the solar panels. In the illustrated example, two arms are used to handle respective solar panels to be installed on respective installation structures. Here, the ground vehicle moves between two respective installation structures. Further, one module vehicle is provided, which may be separated from the ground vehicle.

Figure 12A:
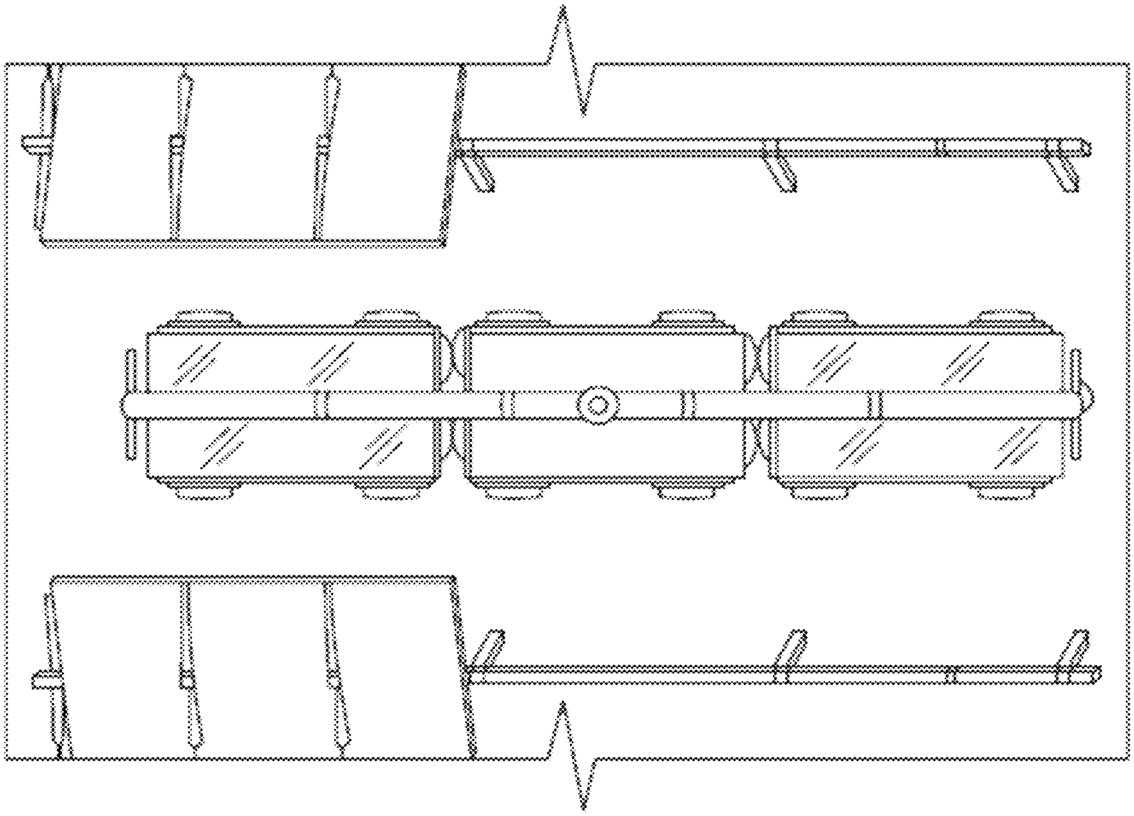
FIGS. 12A and 12B illustrate an arrangement for a moving robot system including two module vehicles and a ground vehicle having two robotic arms.
Figure 12B:
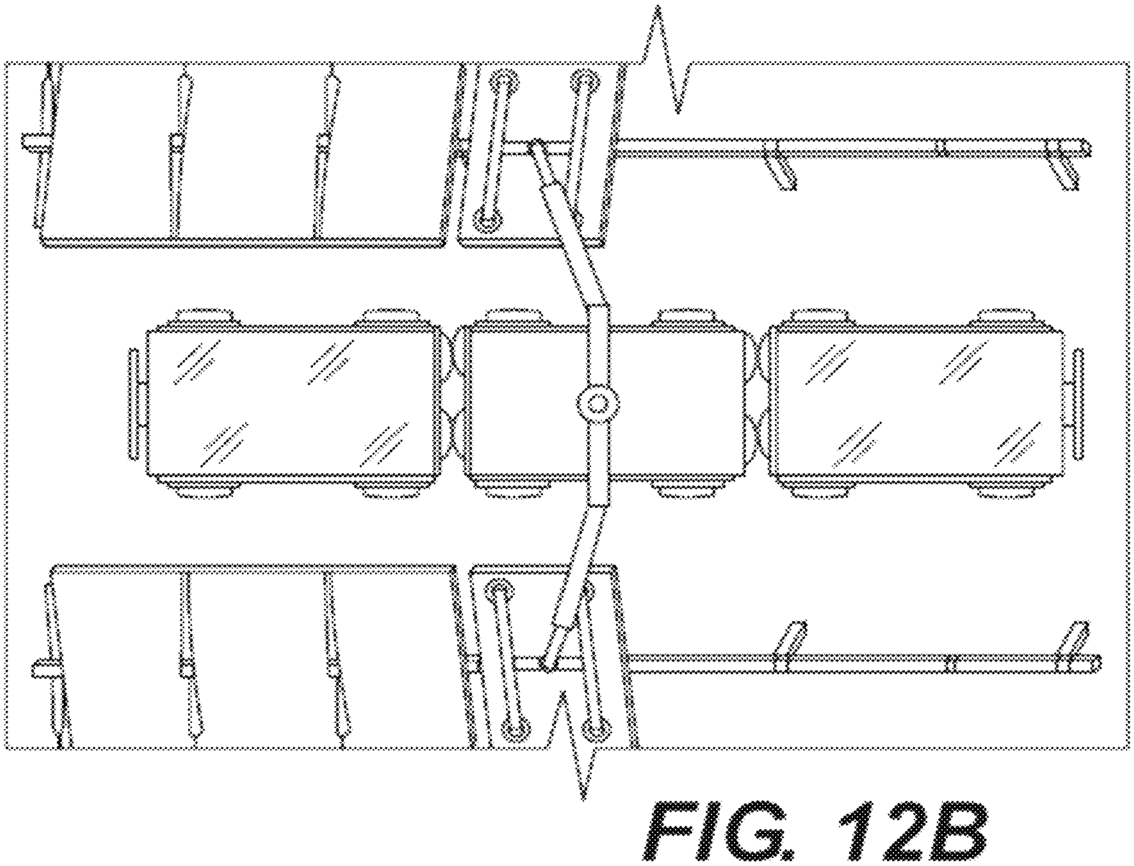

As one of ordinary skill in the art would recognize, modifications and variations in implementation may be used. For example, as shown in FIGS. 12A and 12B, two module vehicles may be provided for the respective robot arms. In a further alternative, the module vehicles may be connected with the ground vehicle instead of being separated. Thus, as shown in FIG. 12A, the robot arms may engage respective solar panels to be installed as illustrated in FIG. 12B).

Figure 13:
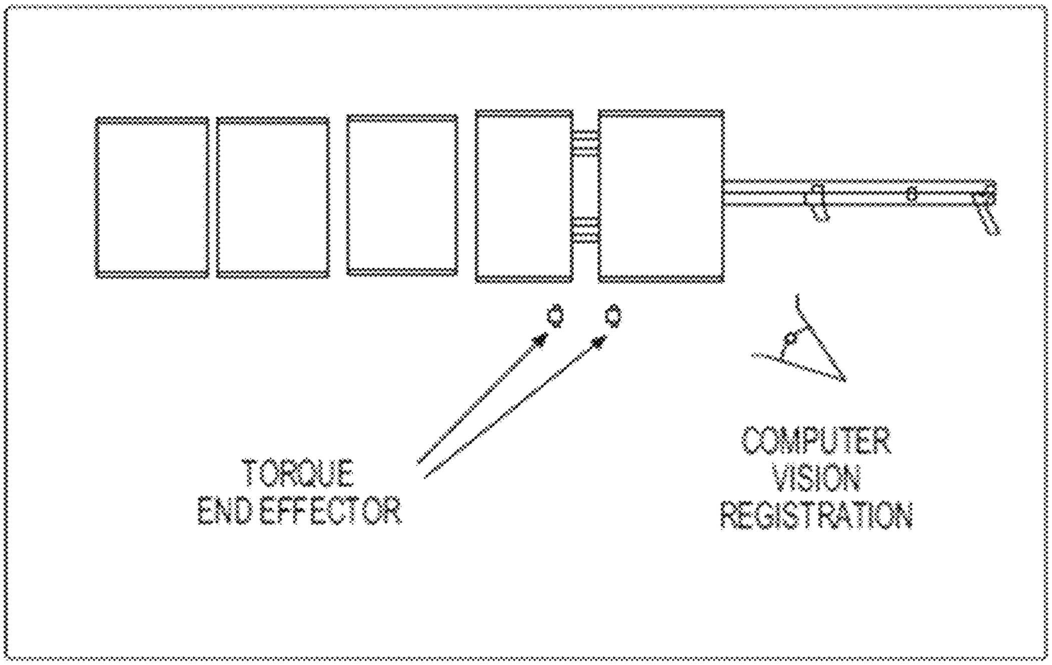
FIG. 13 schematically illustrates installation achieved using computer vision registration.

In some embodiments, as illustrated in FIG. 13, installation may be achieved using computer vision registration. For example, as mentioned above, optical sensors or the like may be utilized with a neural network for artificial intelligence.

Figure 14:
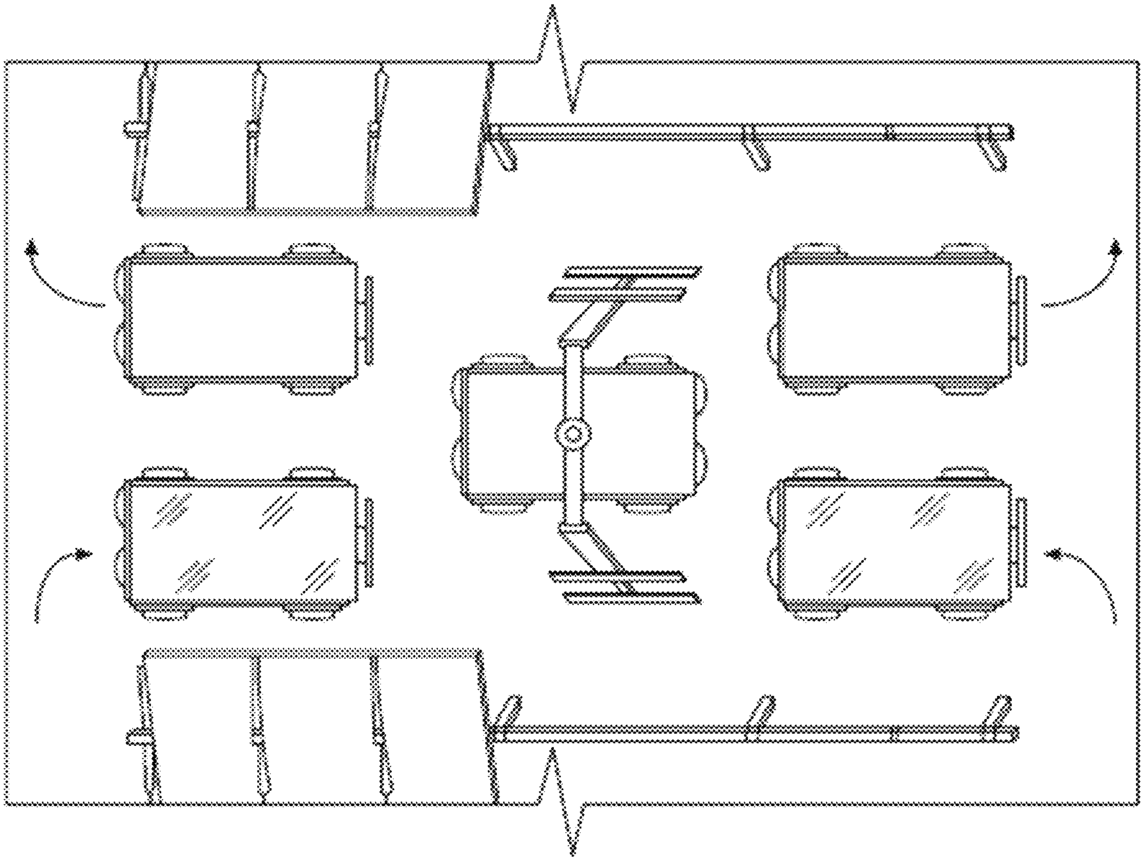
FIG. 14 schematically illustrates an arrangement wherein the module vehicles are exchanged with new module vehicles having additional solar panels for replenishment.
Figure 15:
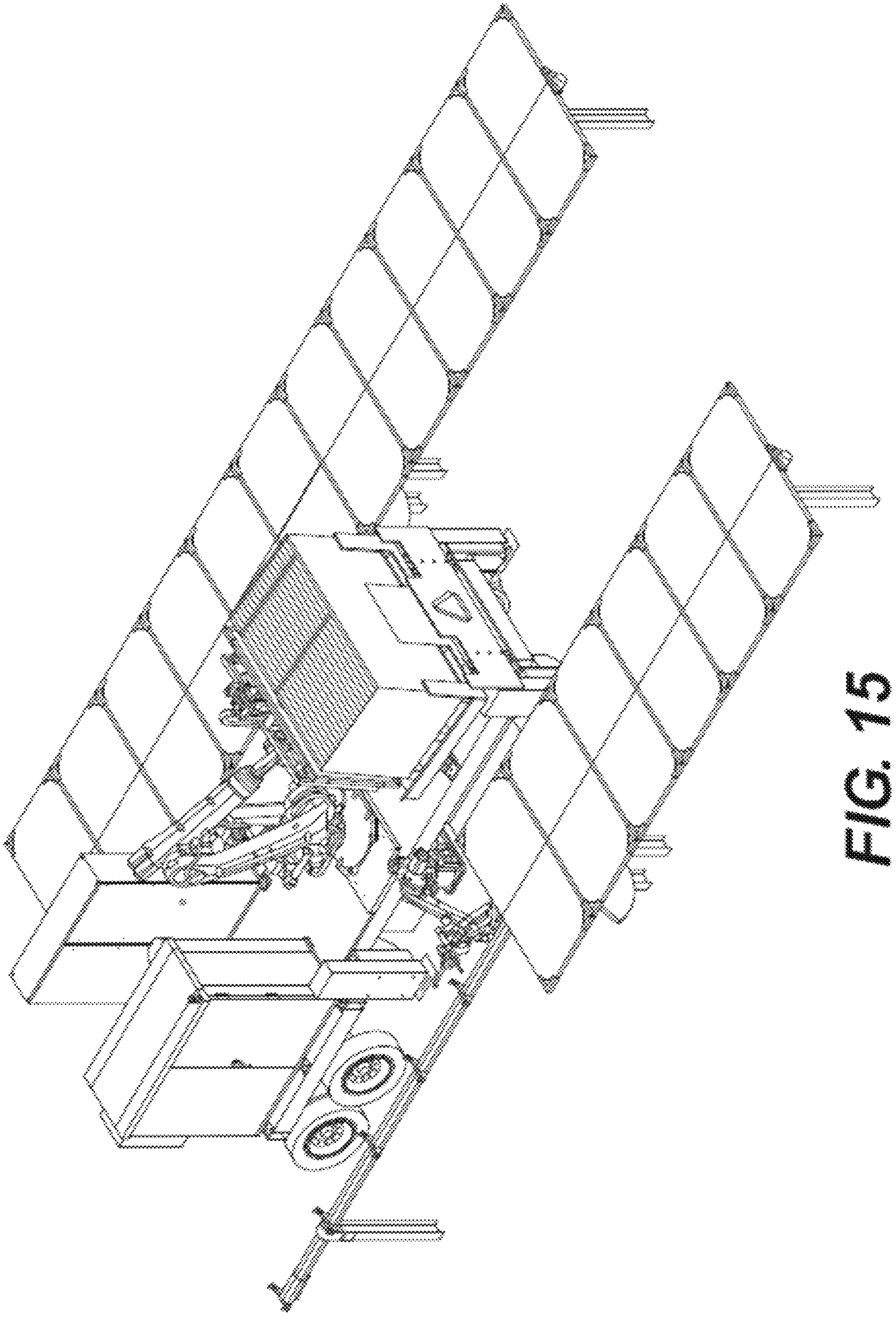
FIGS. 15-34 provide detailed illustrations of an example configuration for a system for installing solar panels according to an embodiment of the present disclosure.
Figure 16:
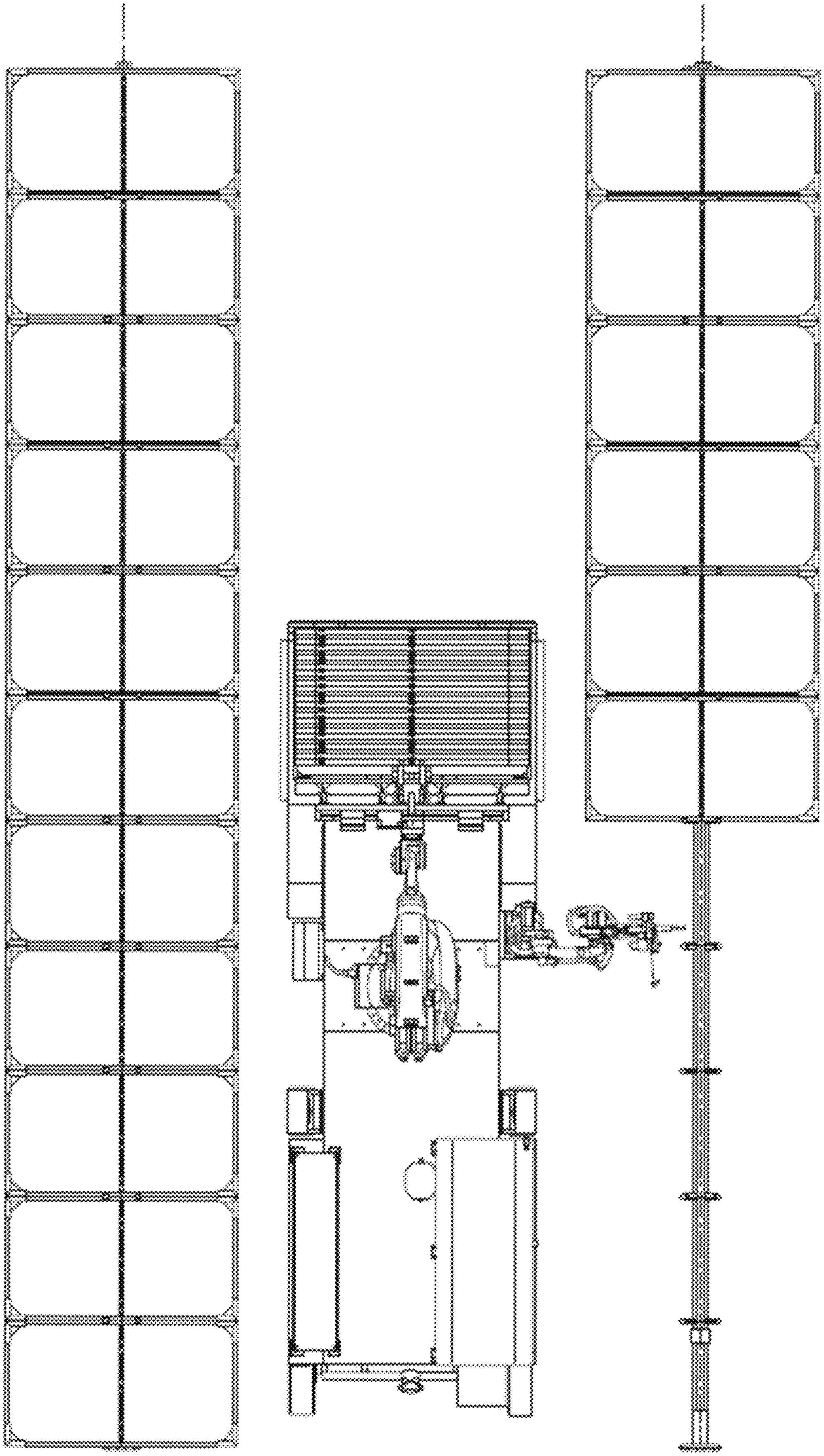
Figure 17:
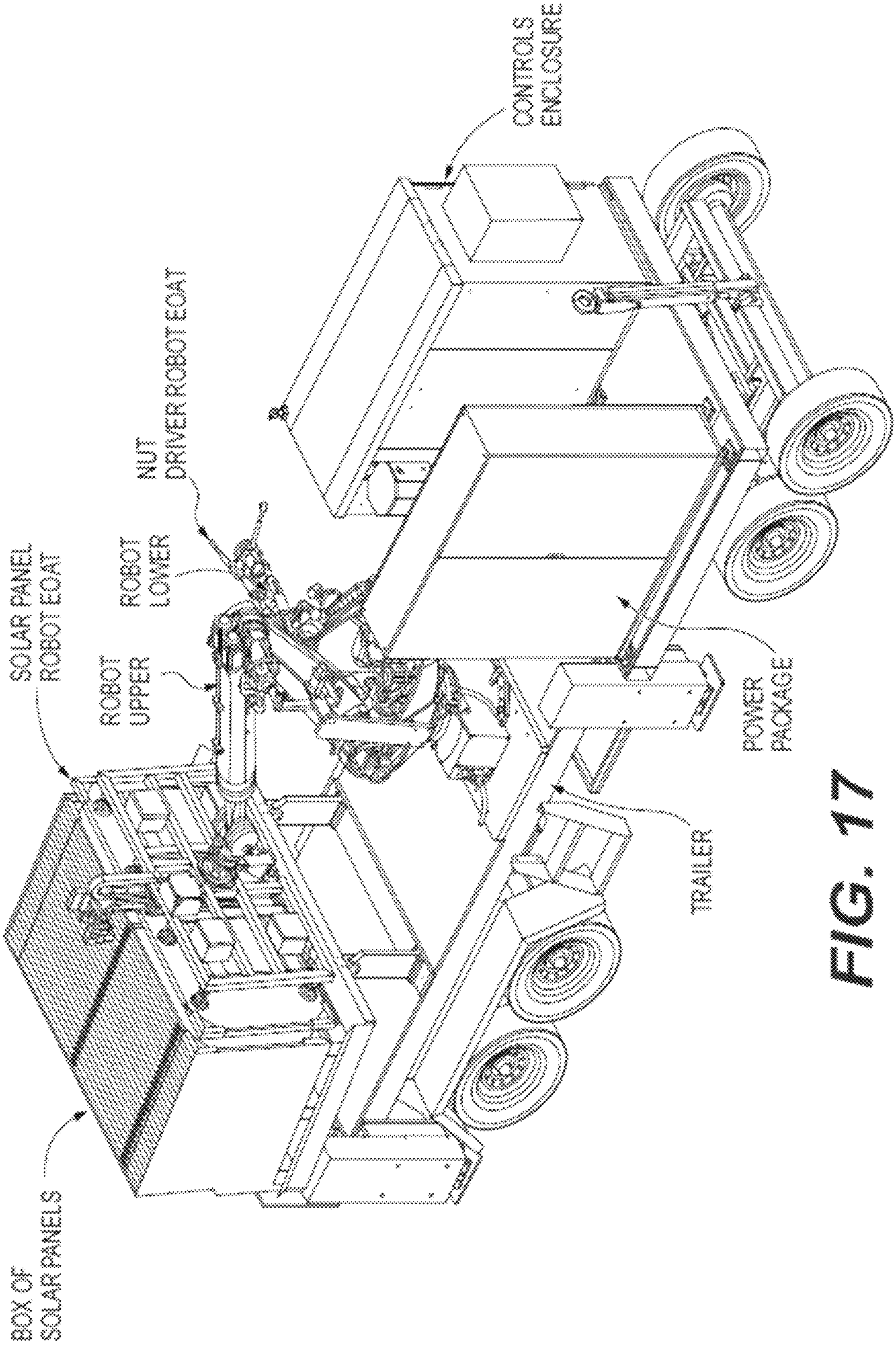
Figure 17:
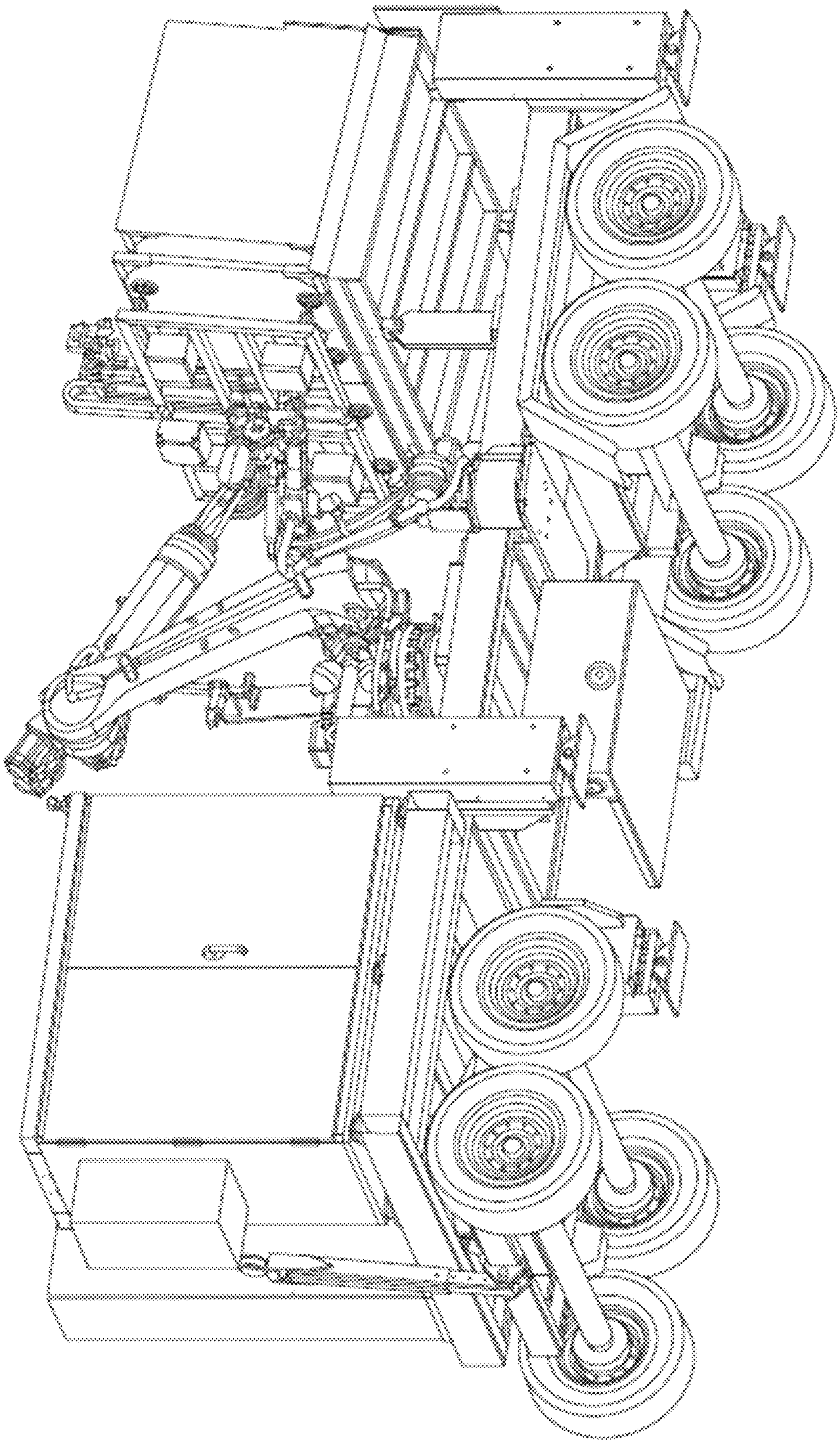
Figure 18:
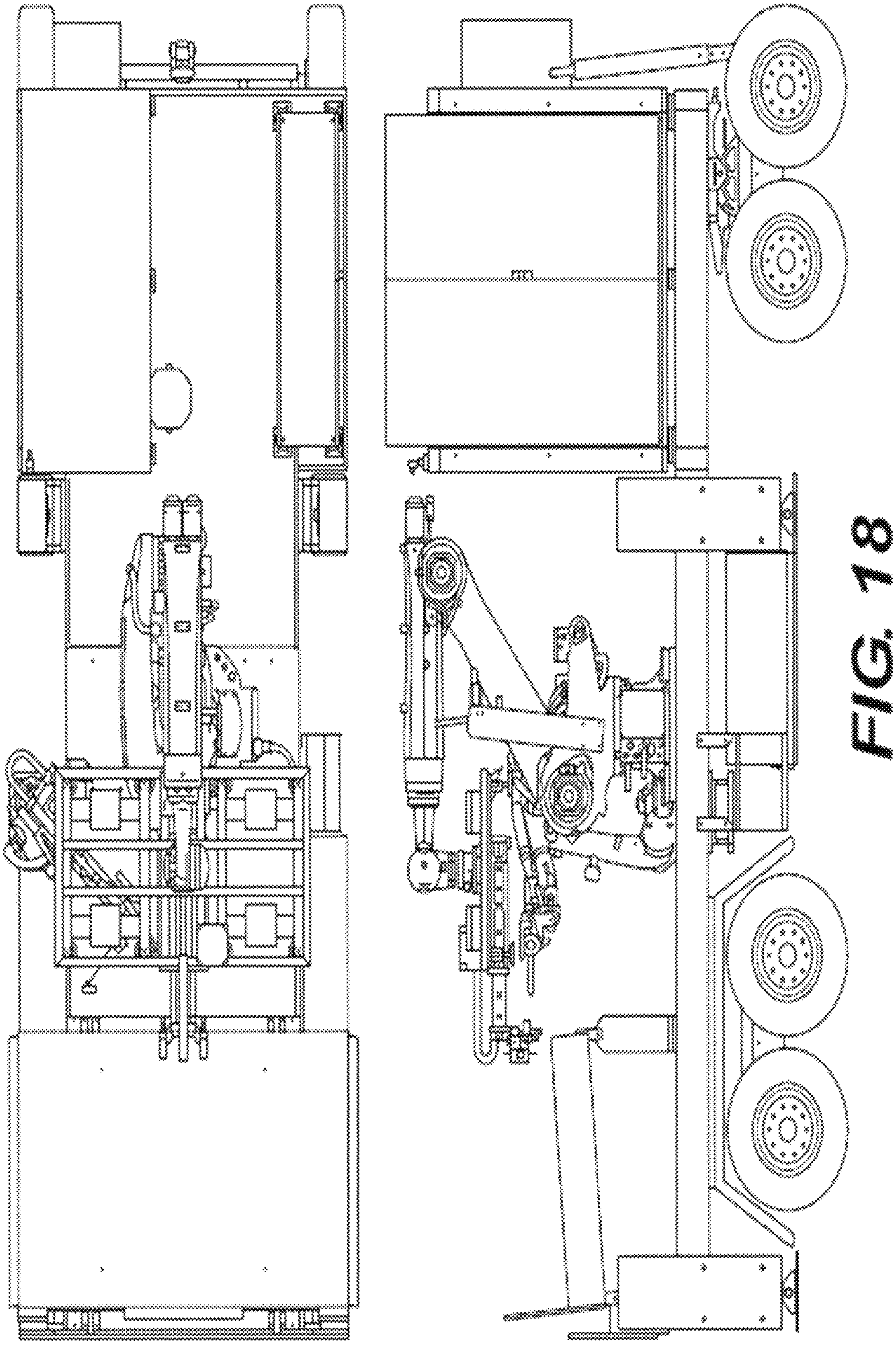
Figure 18:
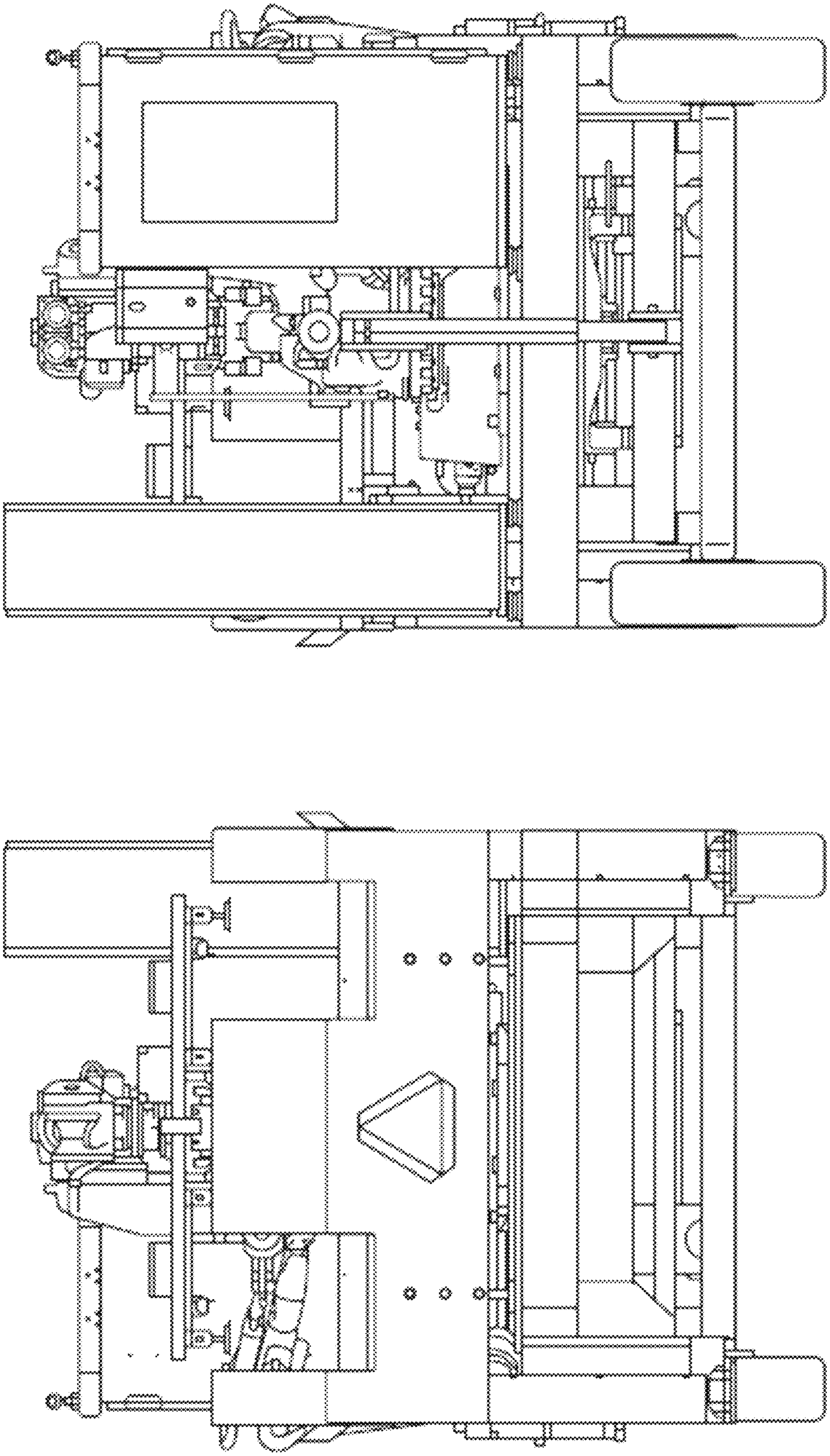
Figure 19:
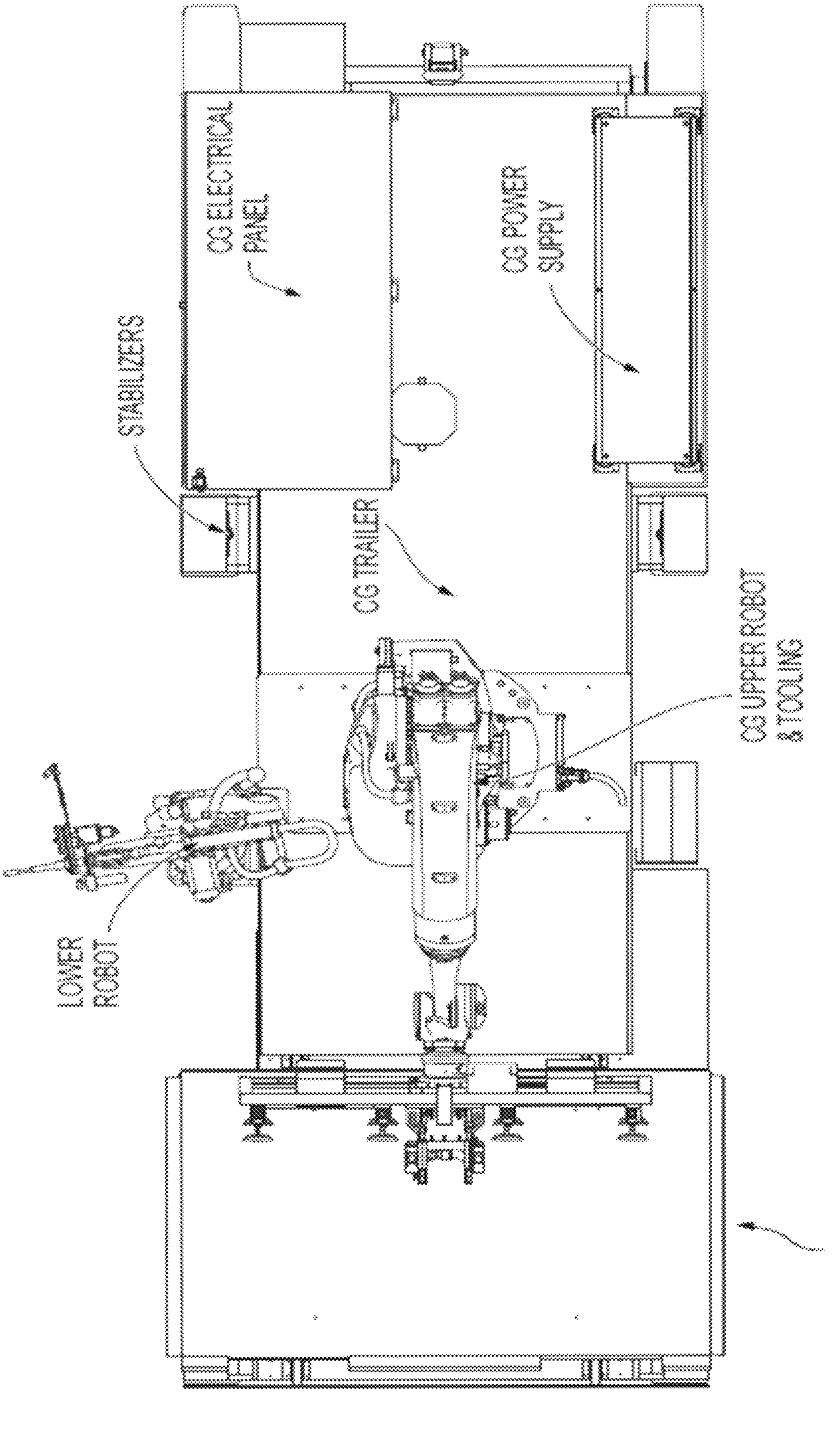
Figure 20:
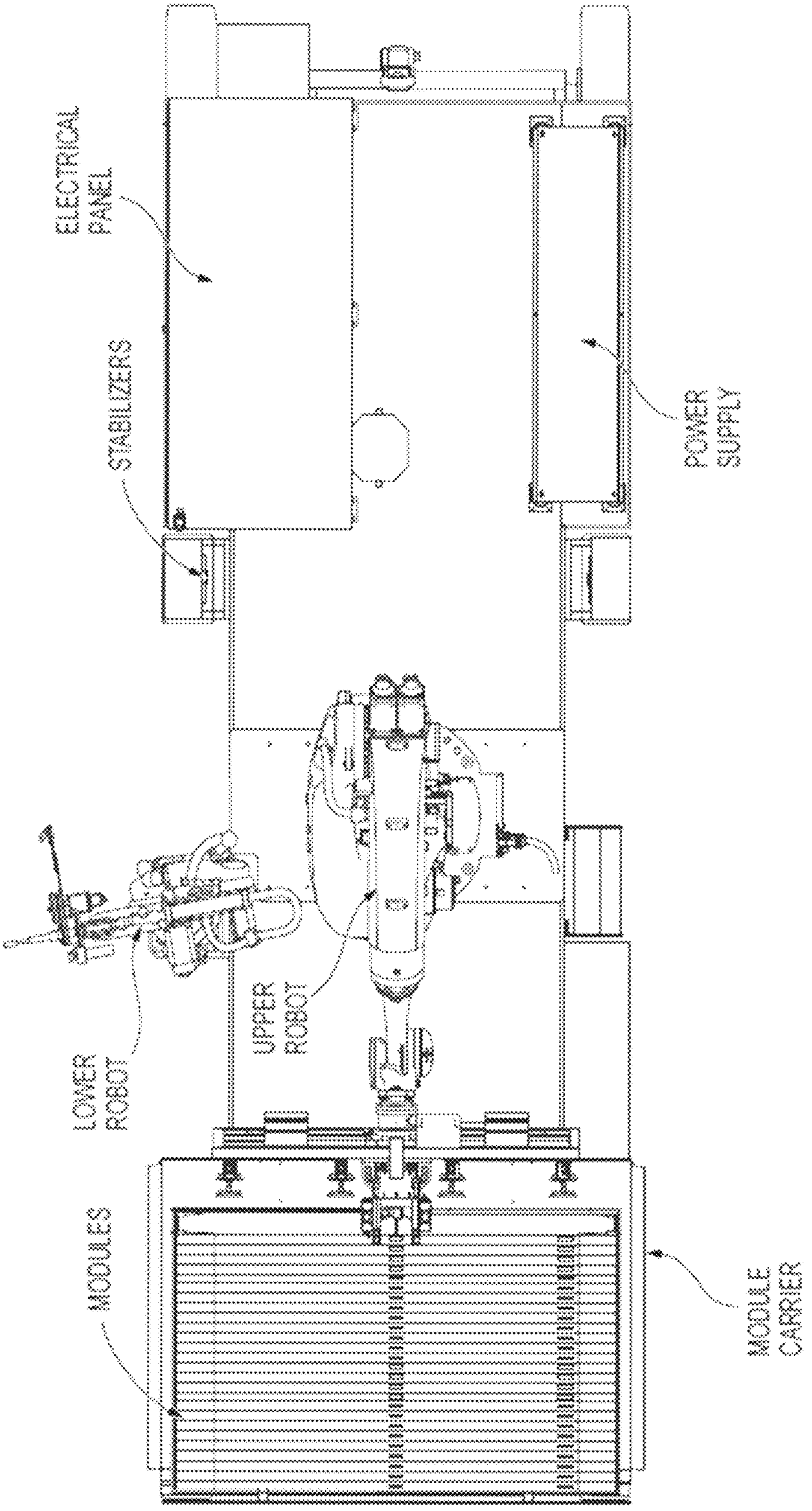
Figure 21:
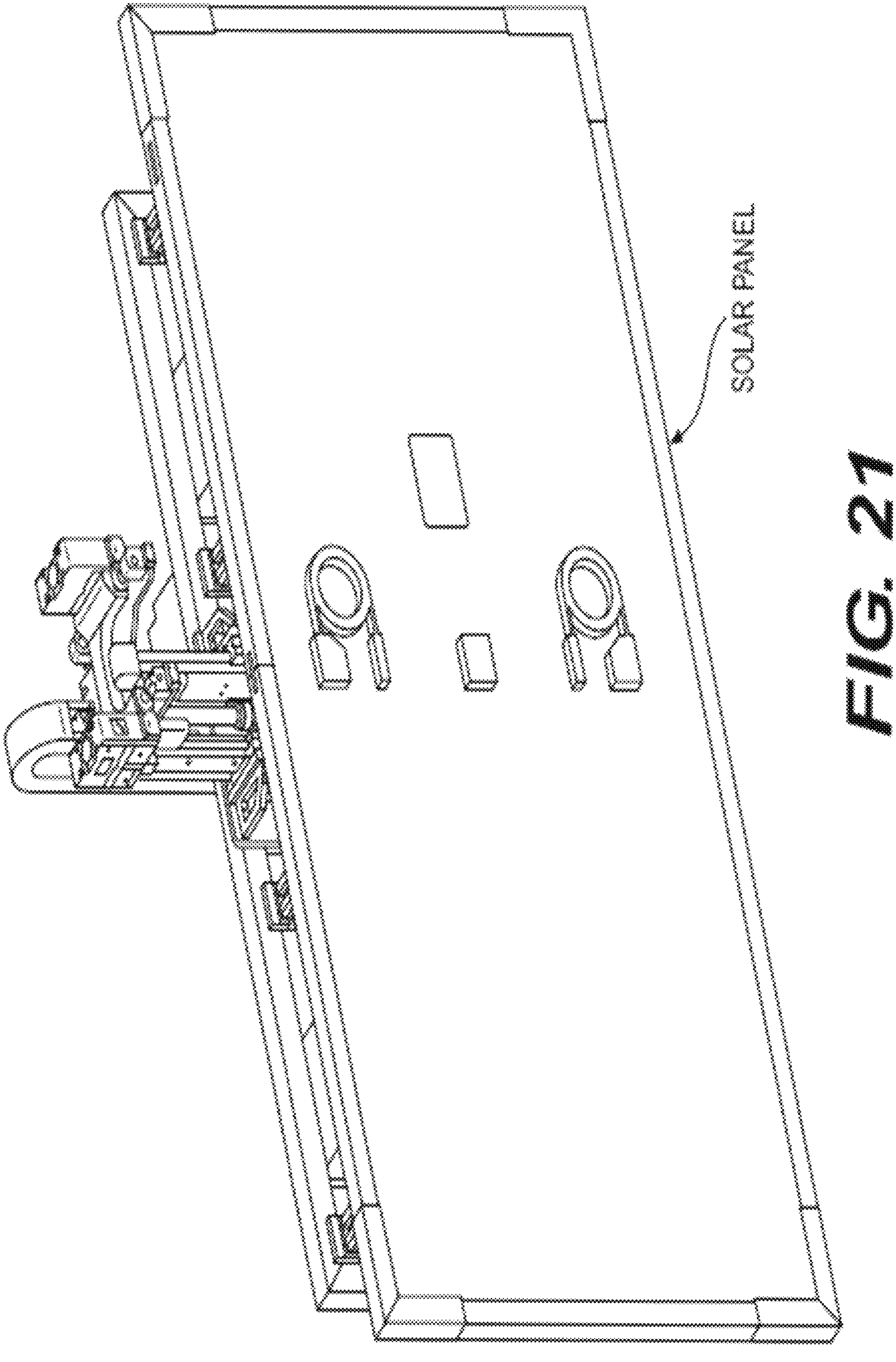
Figure 21:
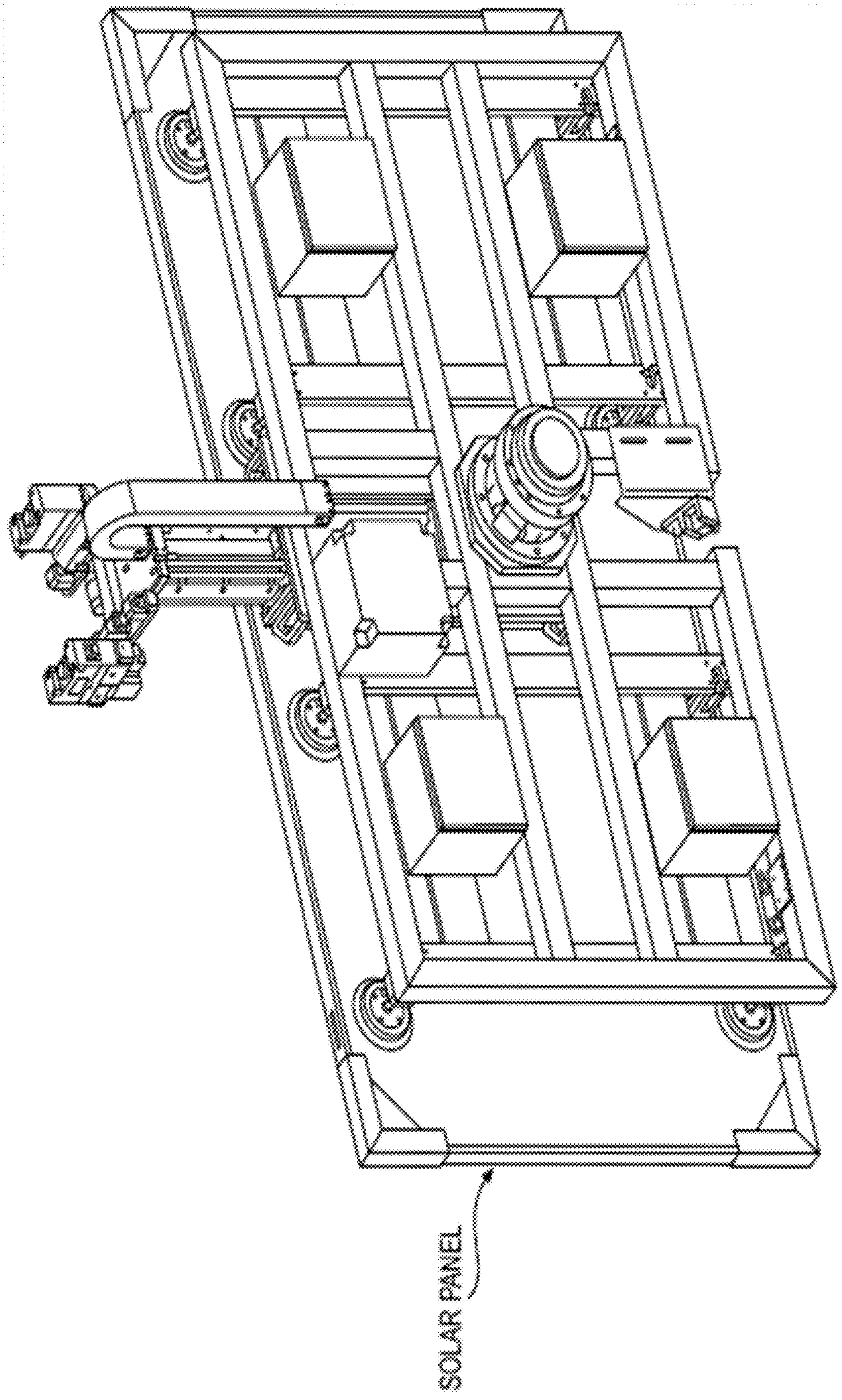
Figure 22:
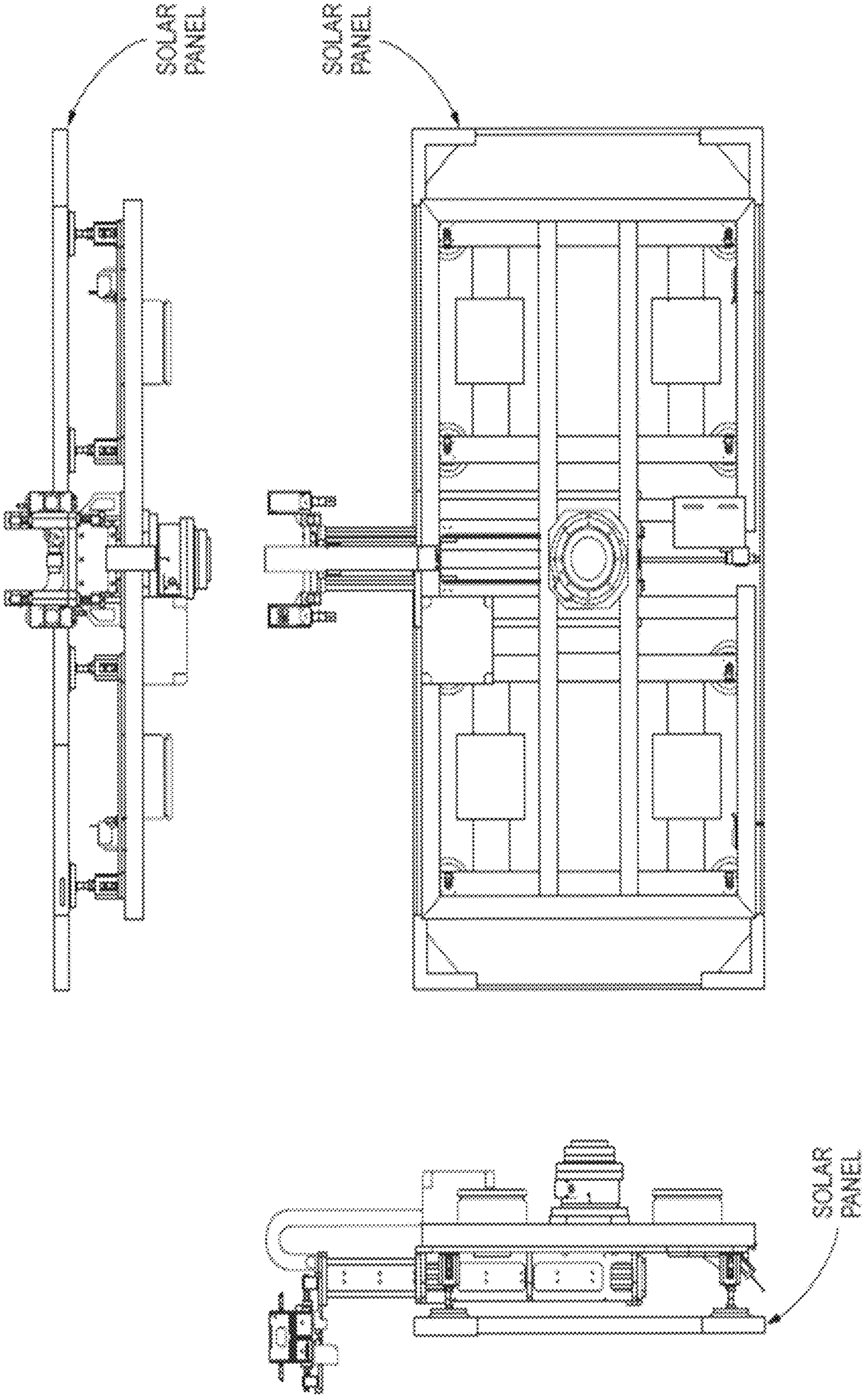
Figure 23:
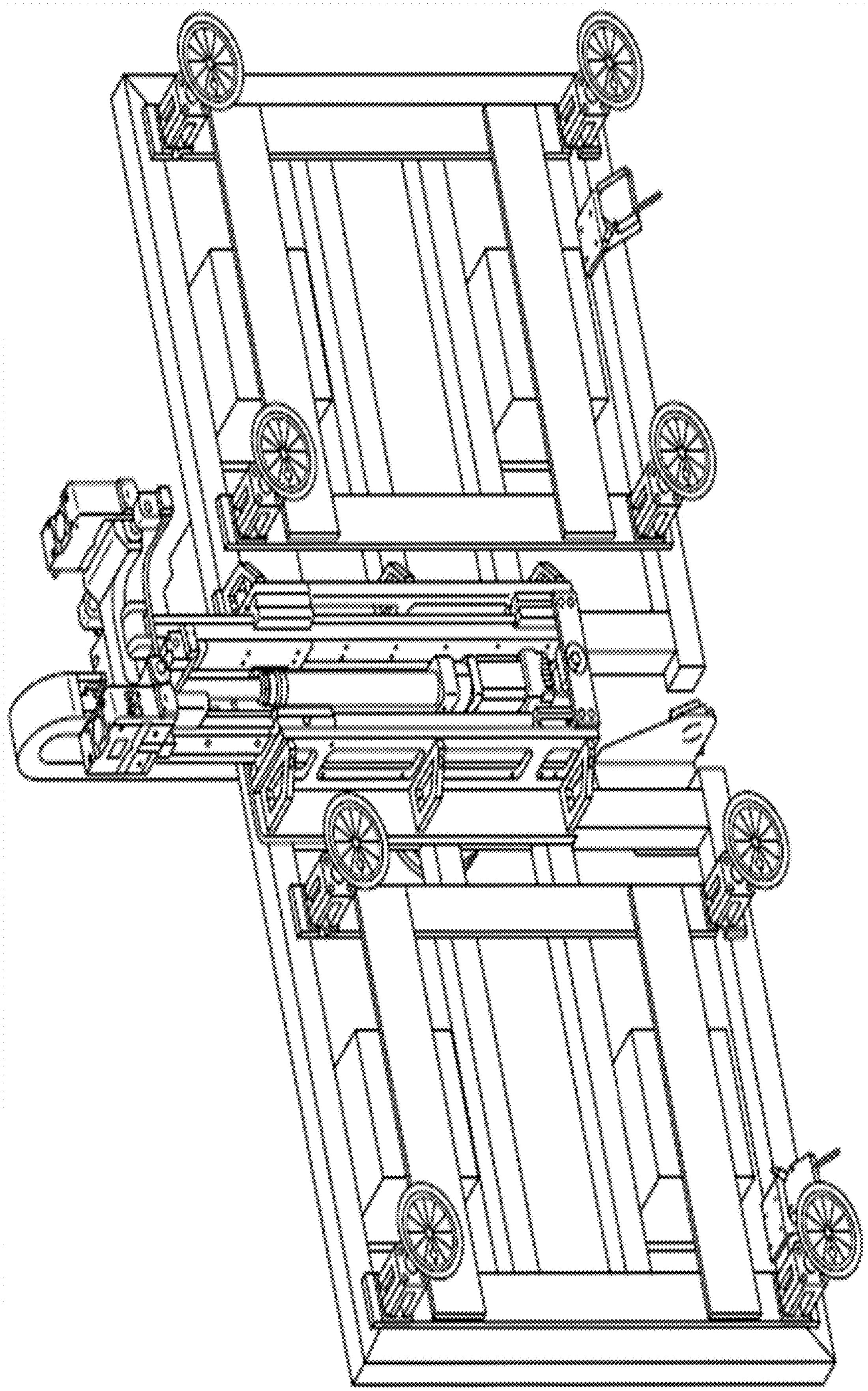
Figure 23:
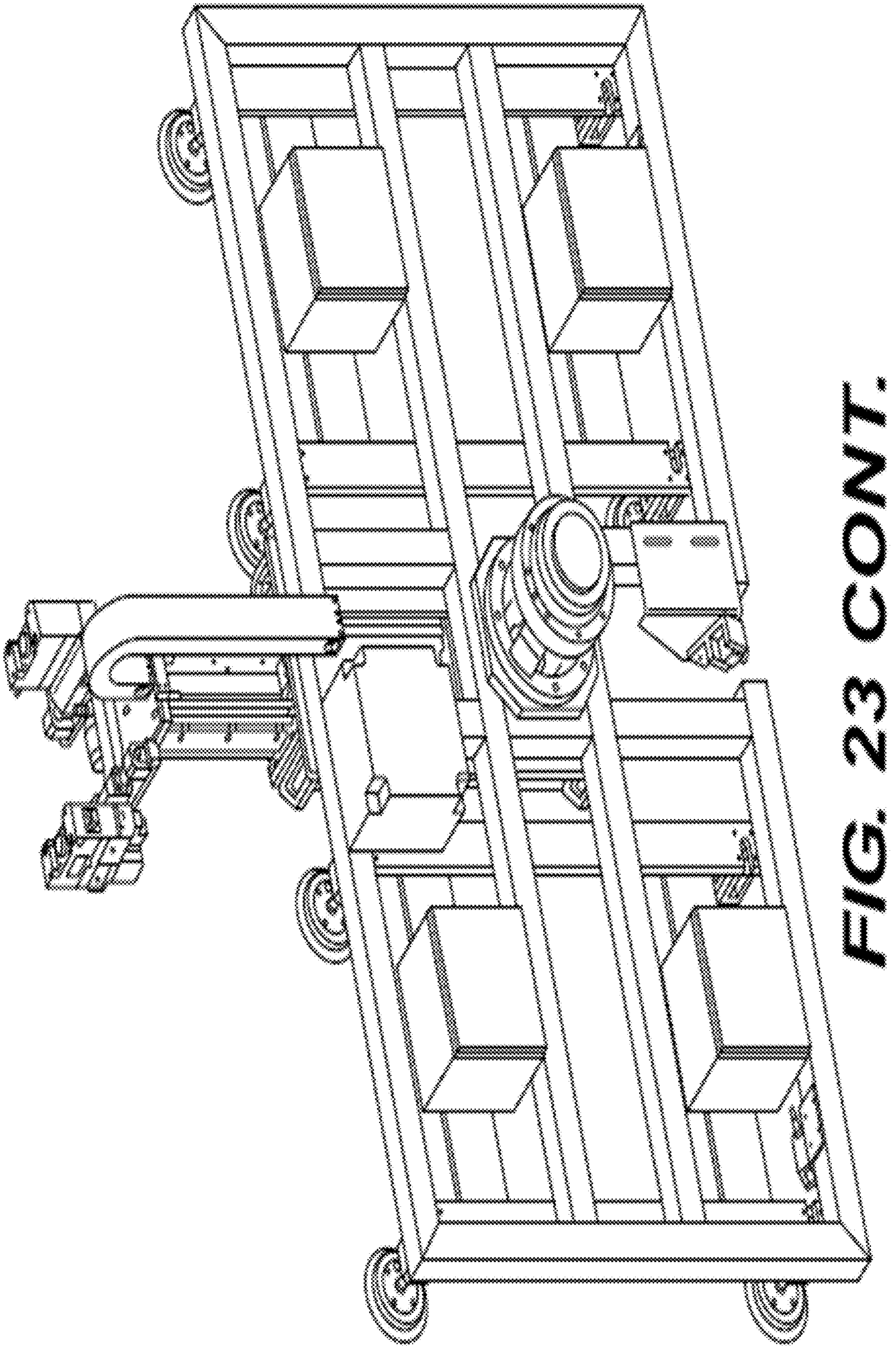
Figure 24:
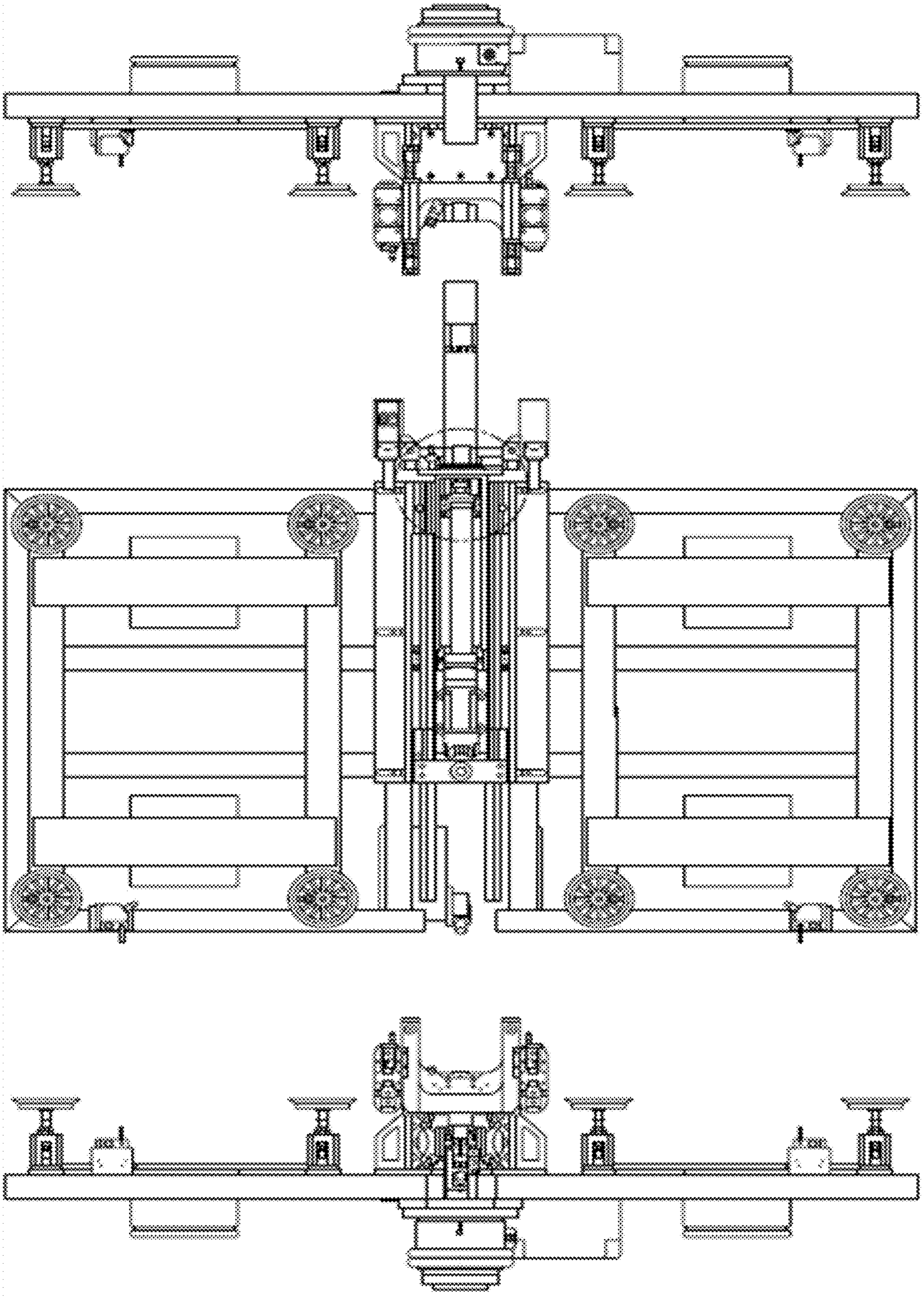
Figure 24:
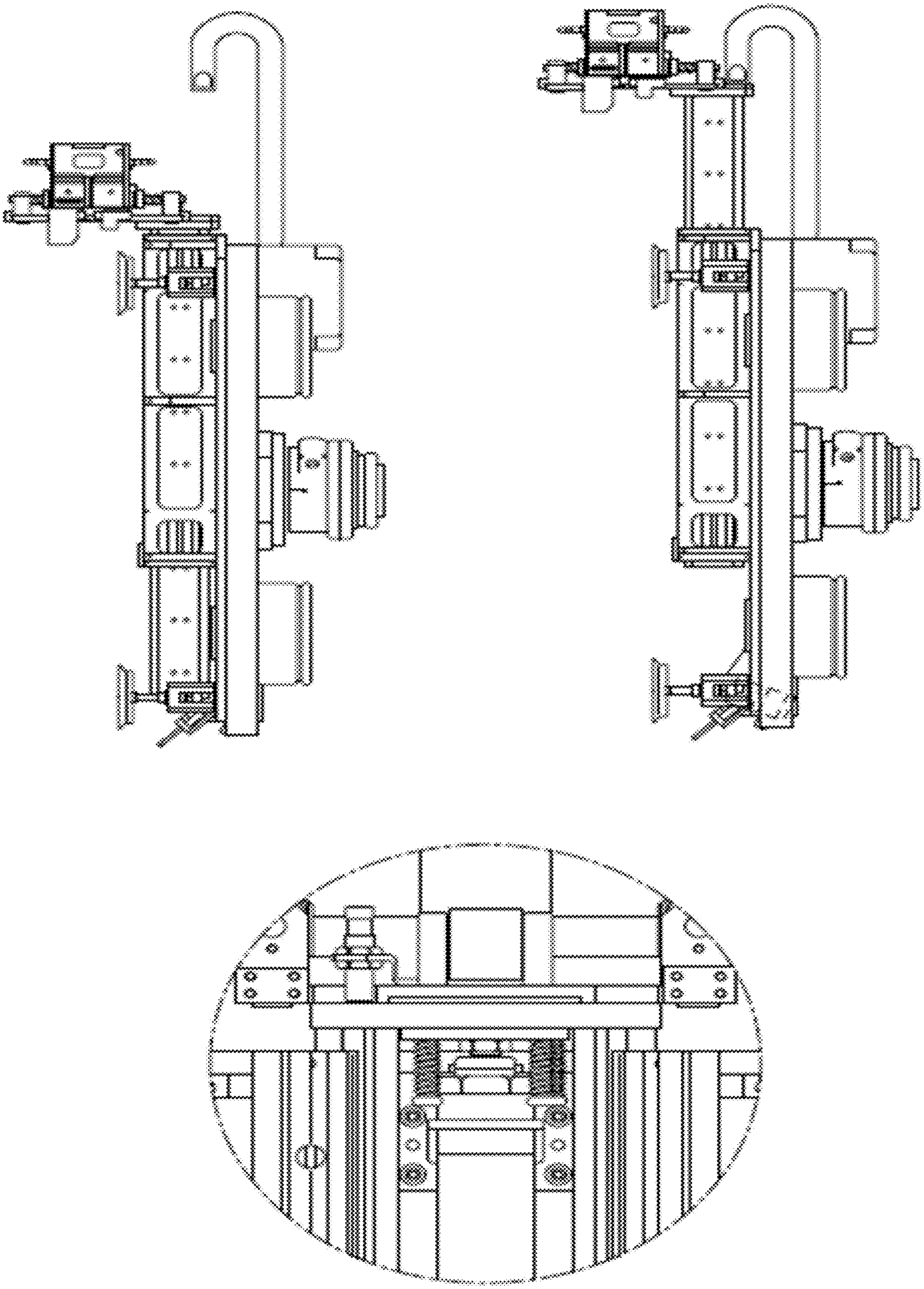
Figure 25:
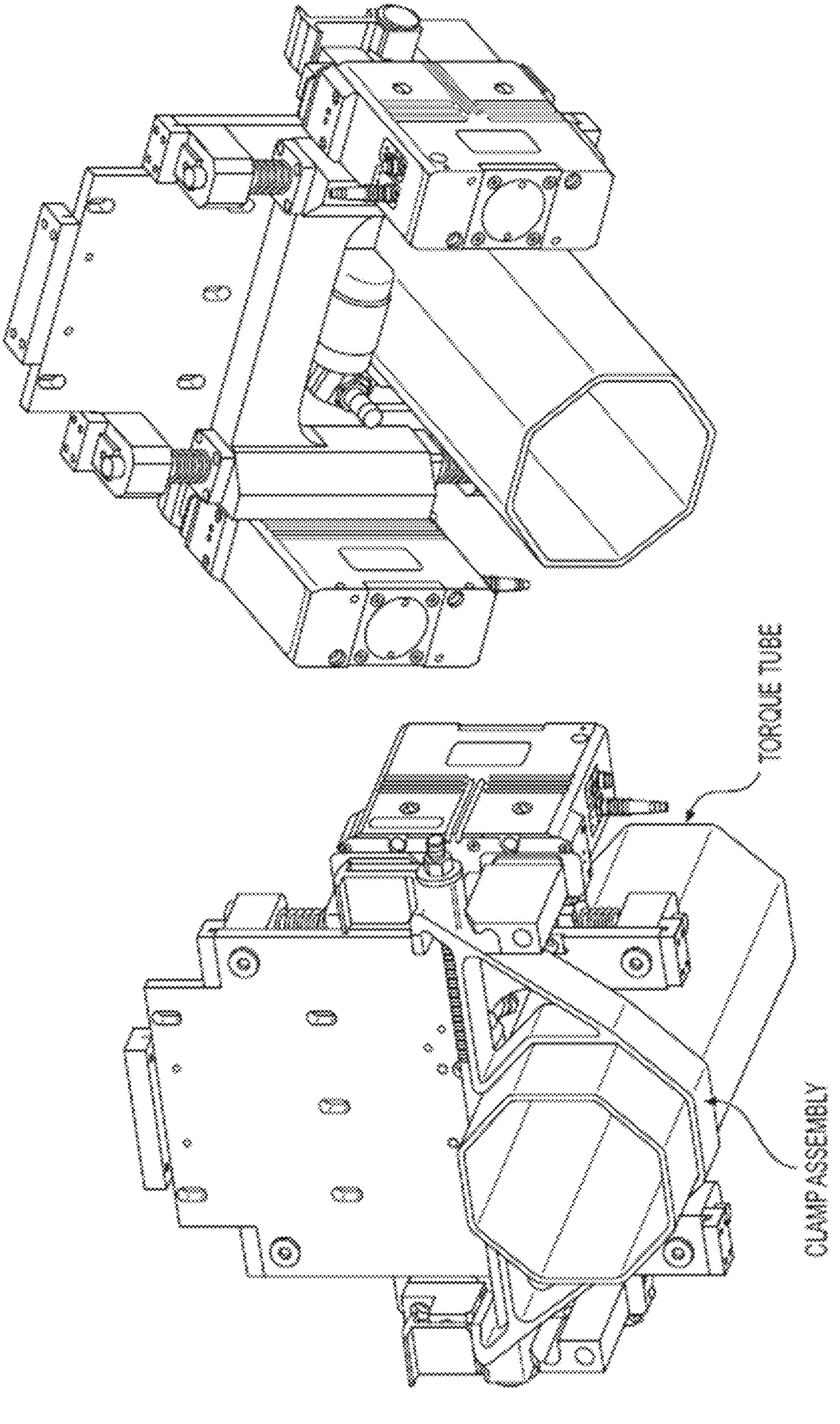
Figure 26:
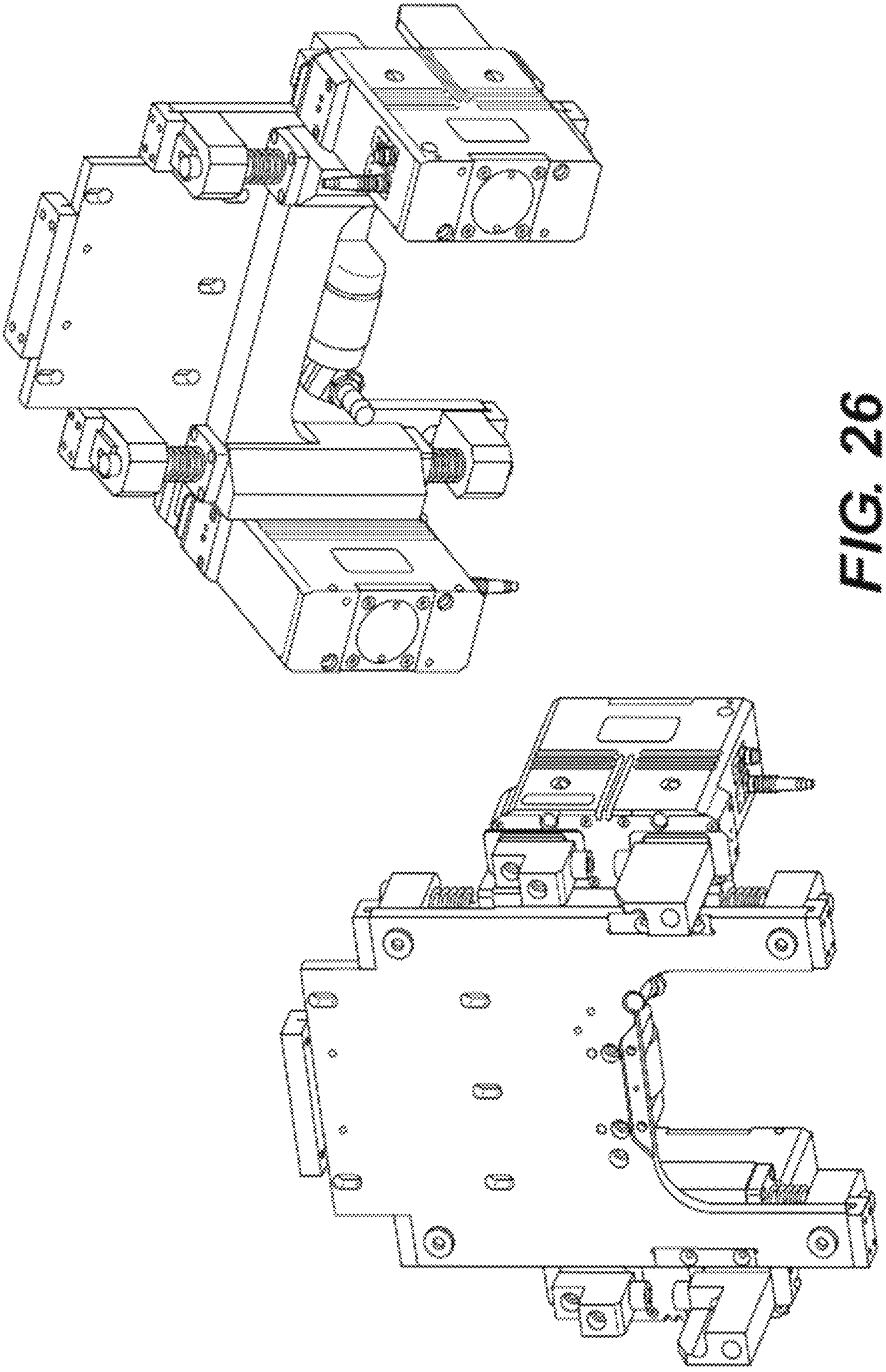
Figure 27:
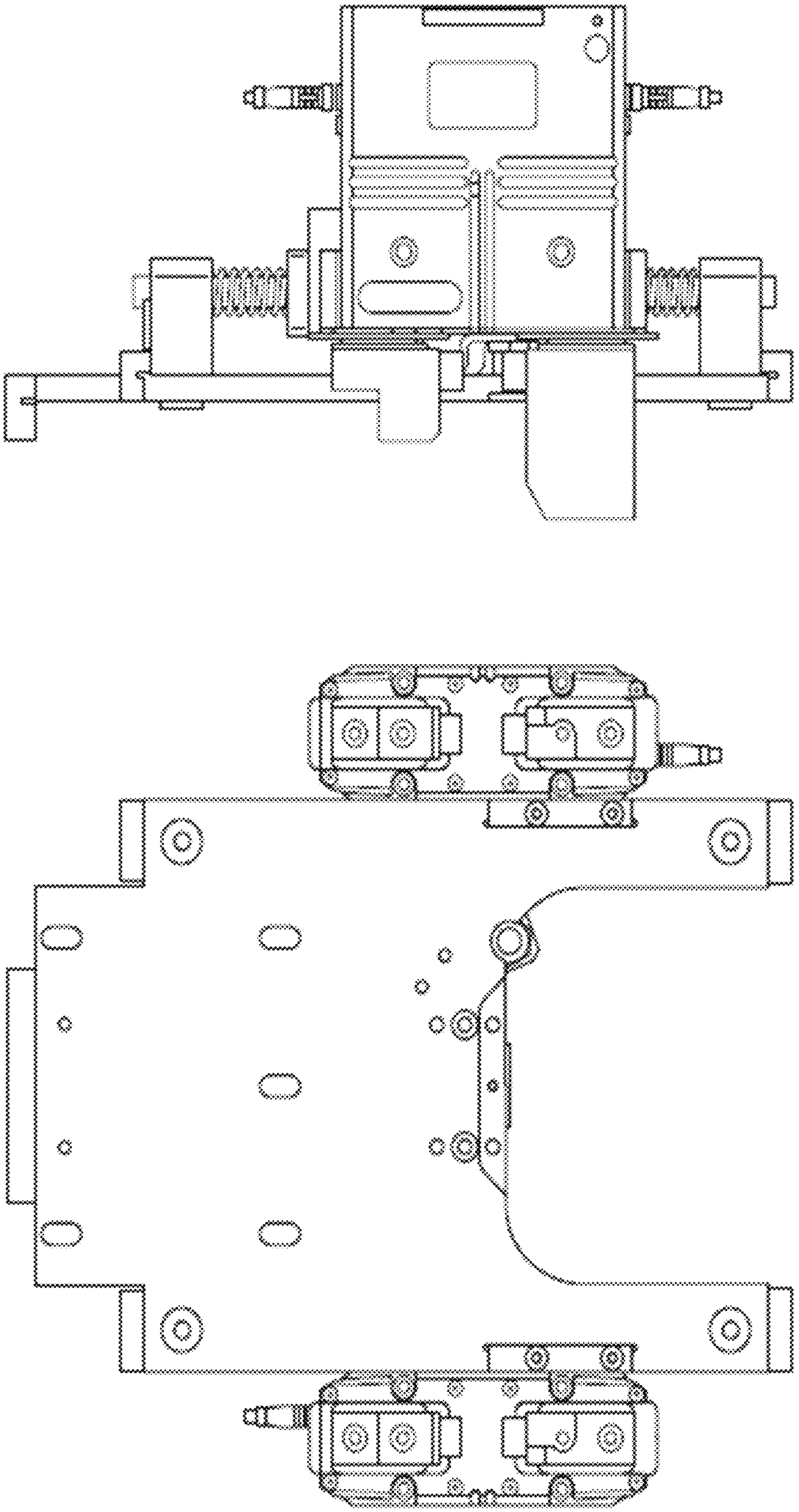
Figure 27:
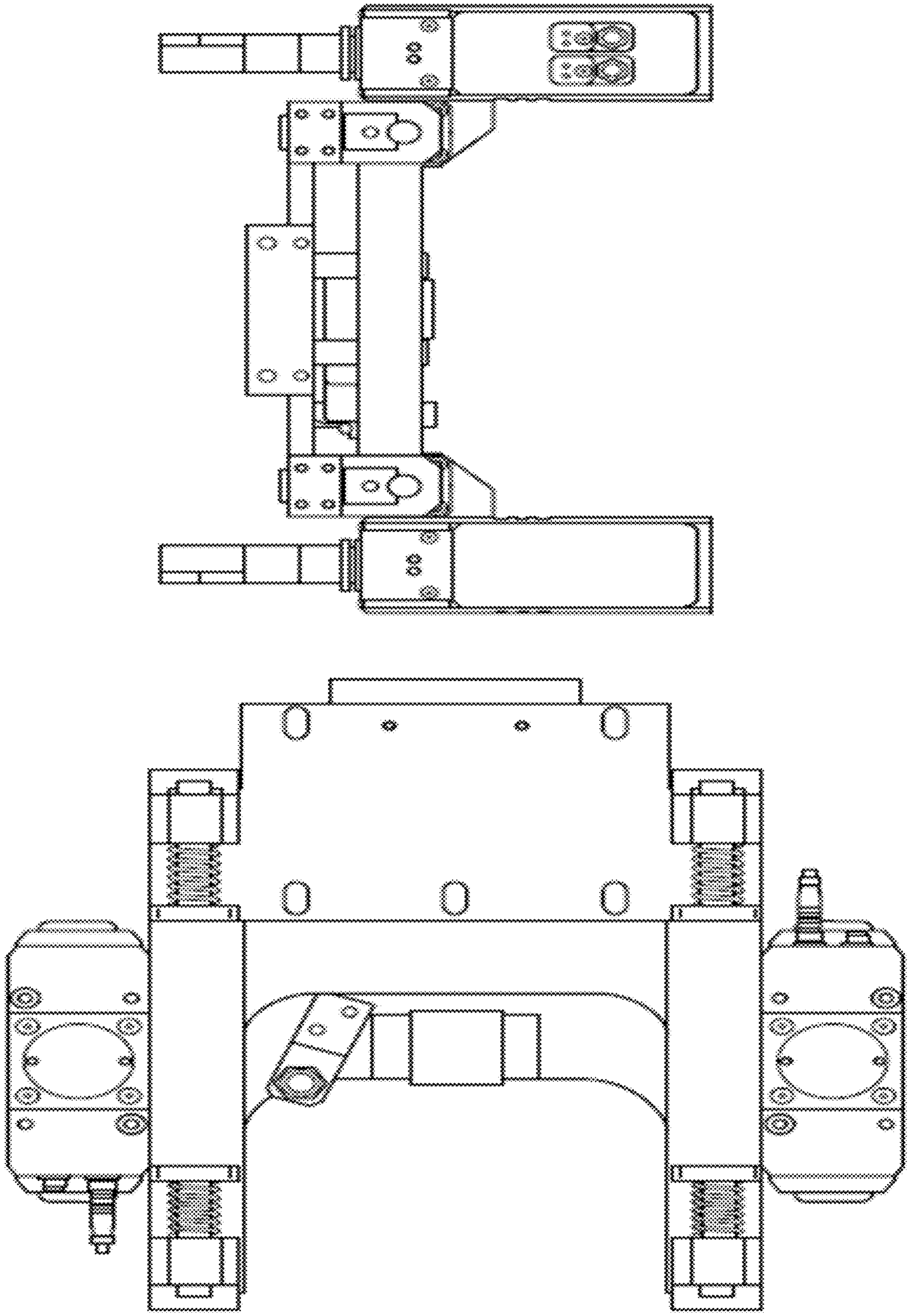
Figure 28:
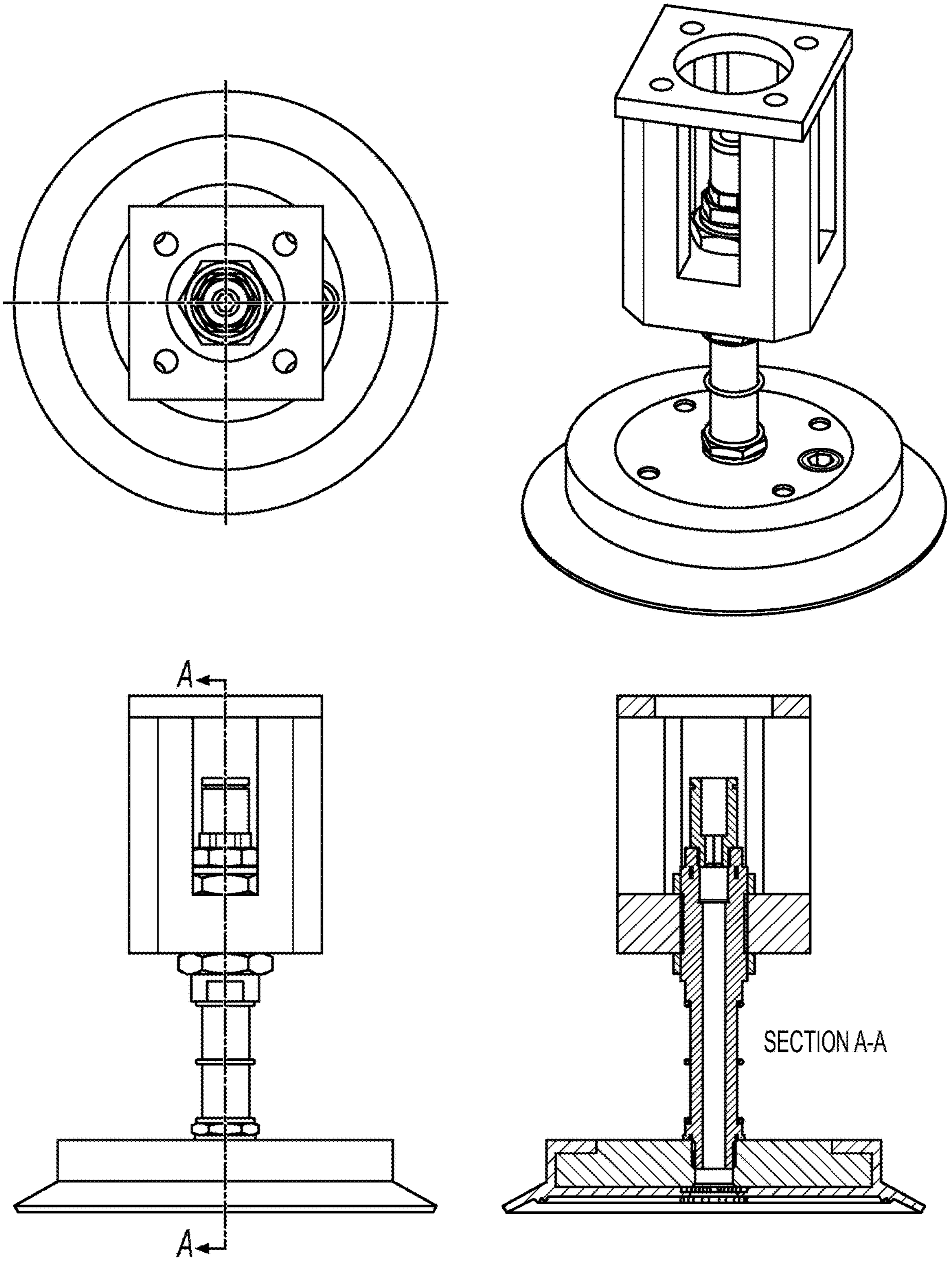
Figure 29:
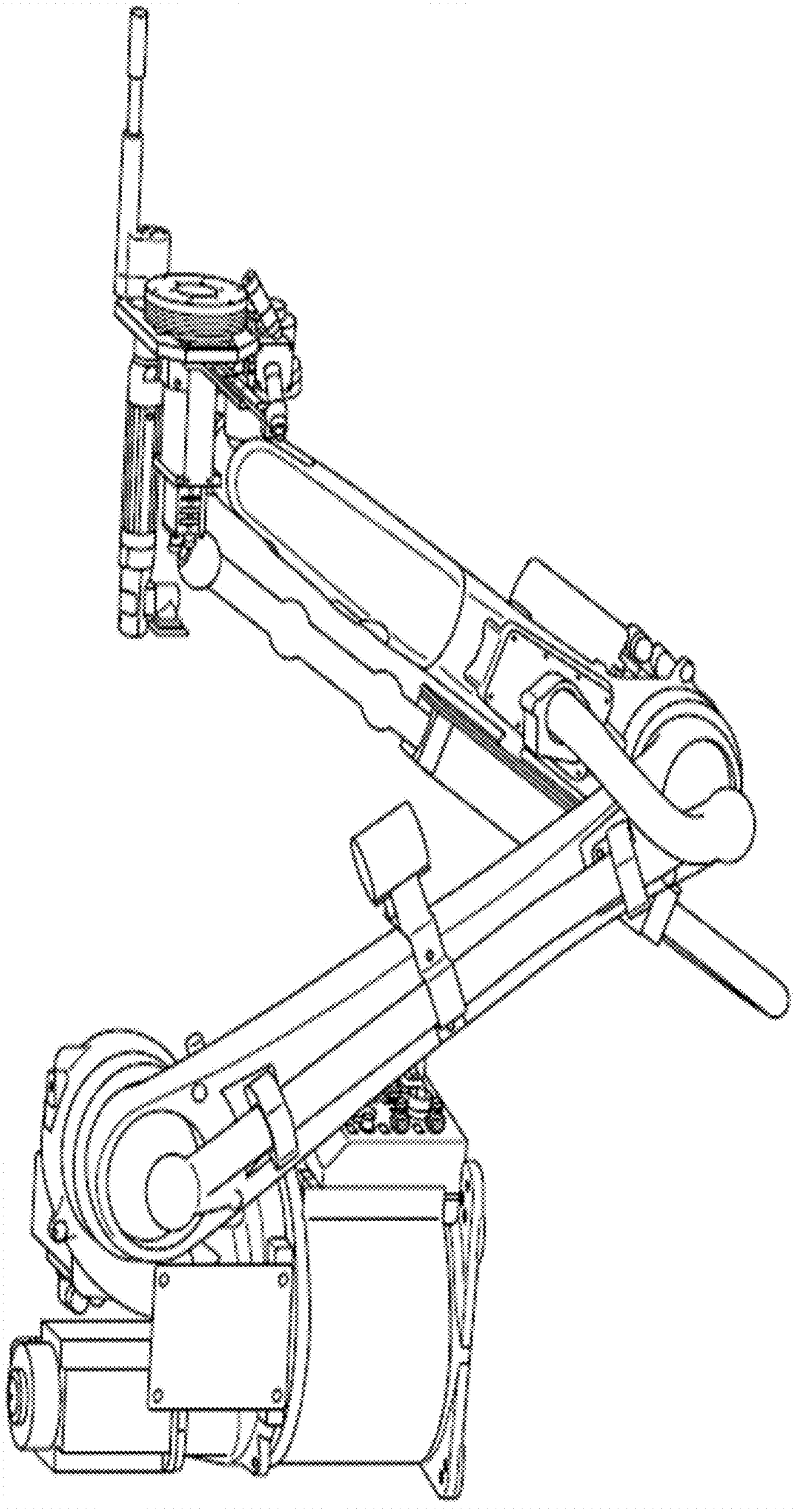
Figure 29:
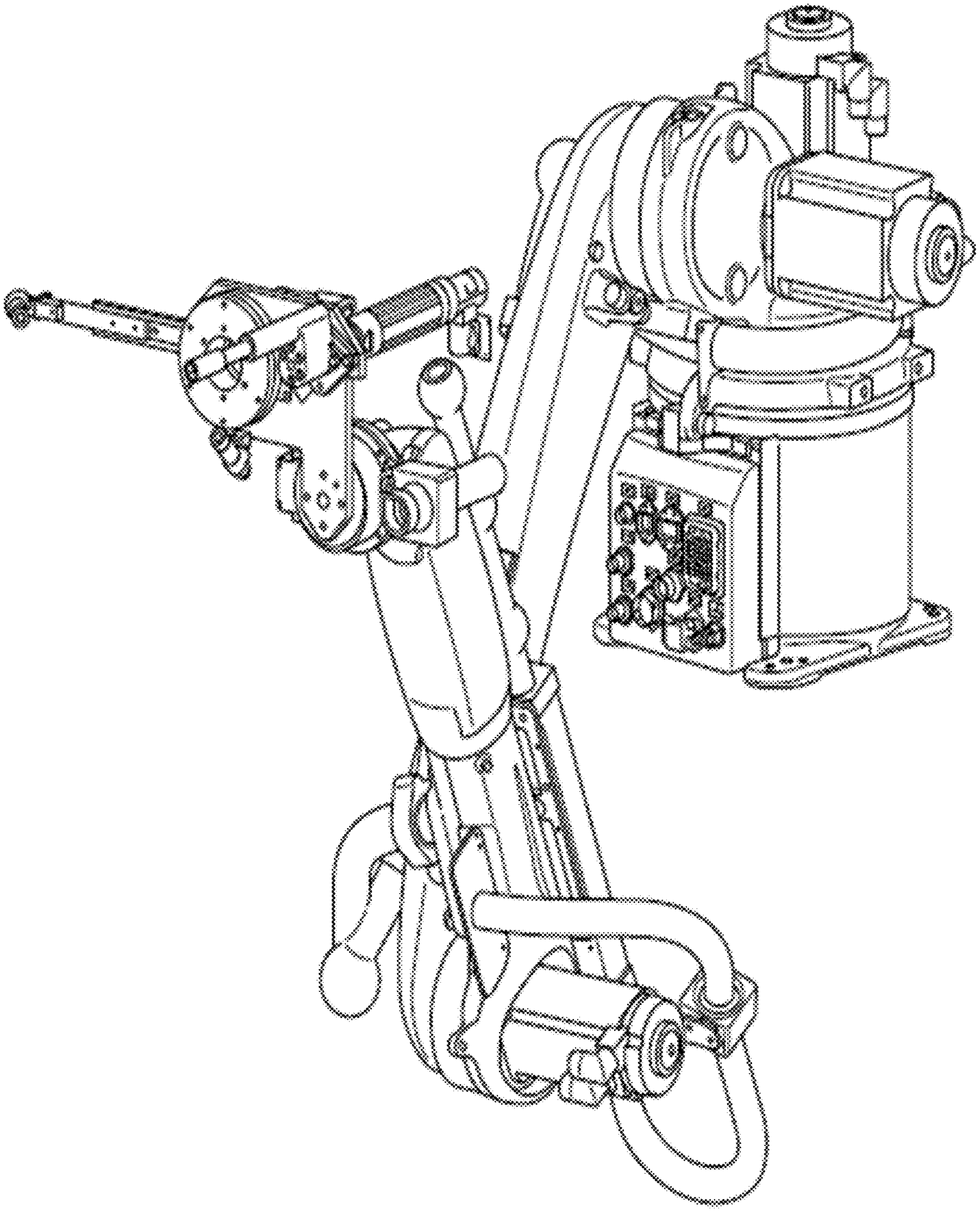
Figure 30:
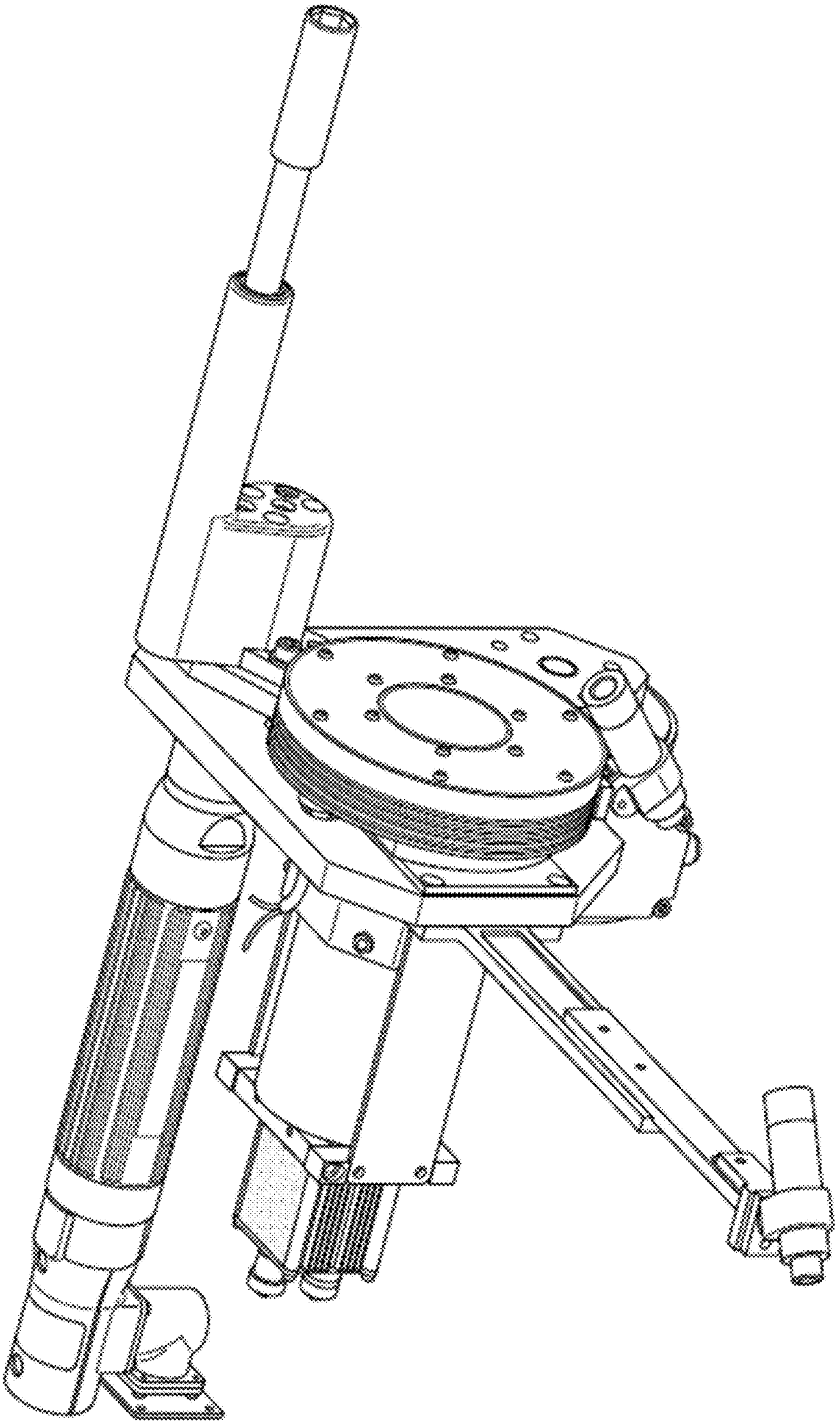
Figure 31:
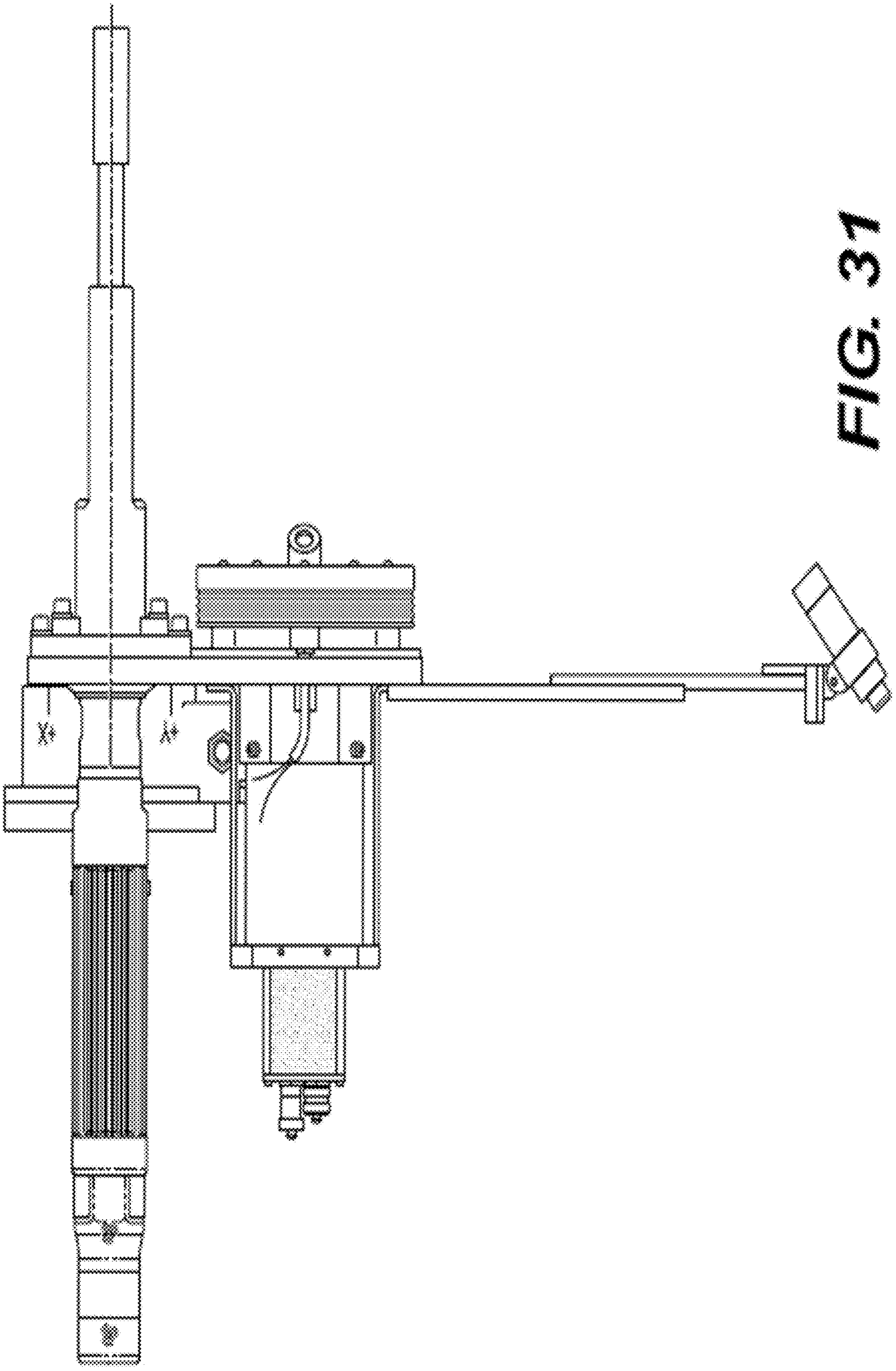
Figure 31:
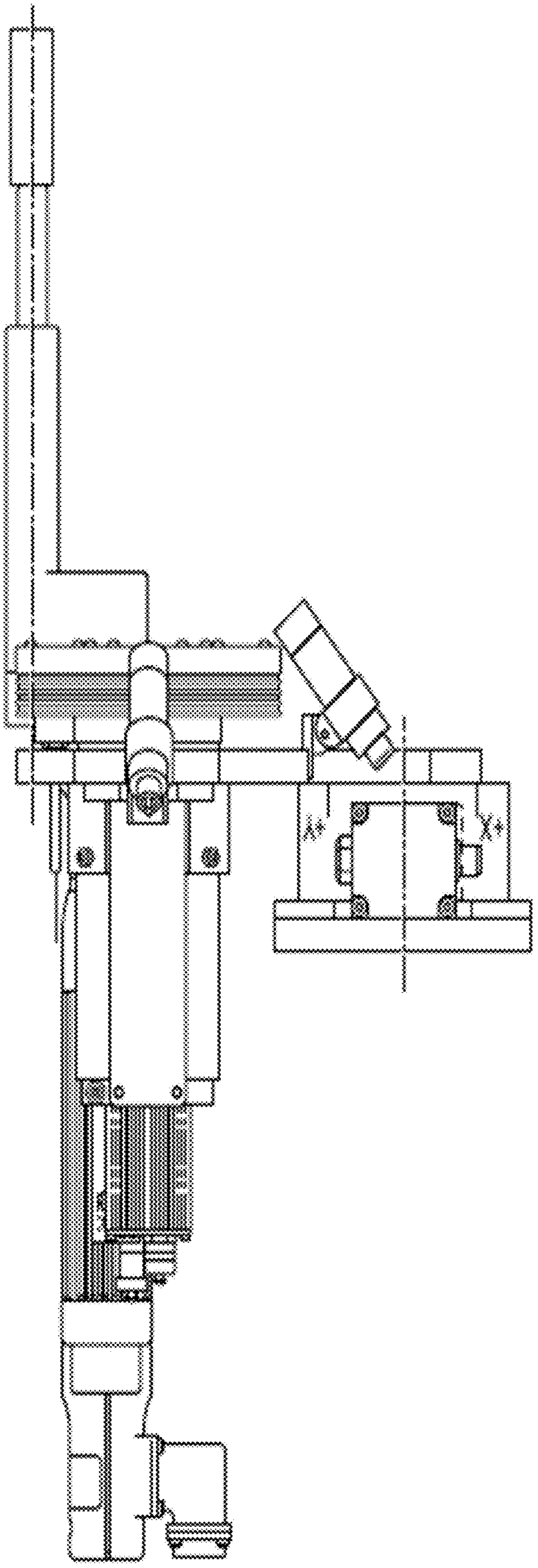
Figure 32:
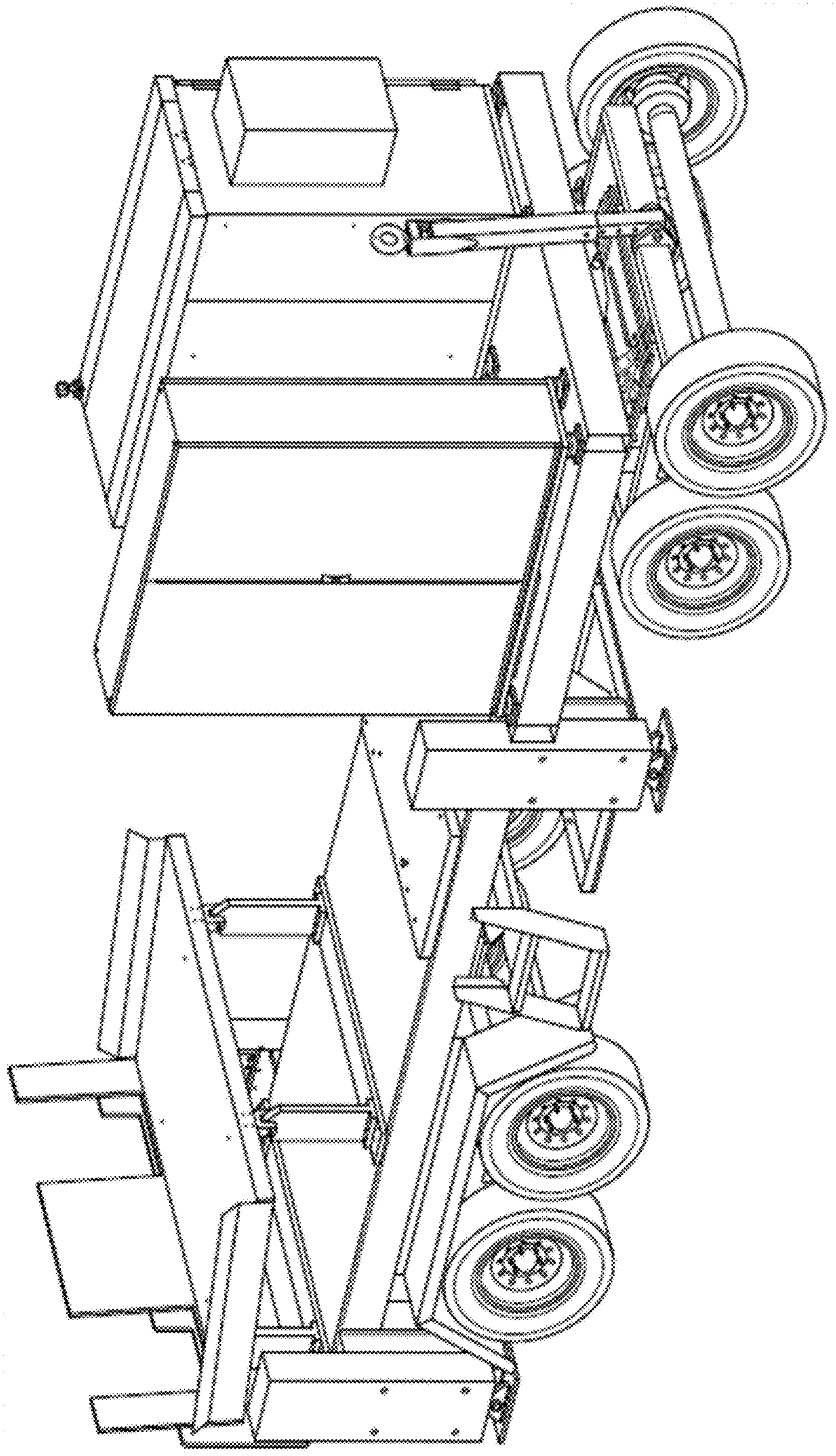
Figure 33:
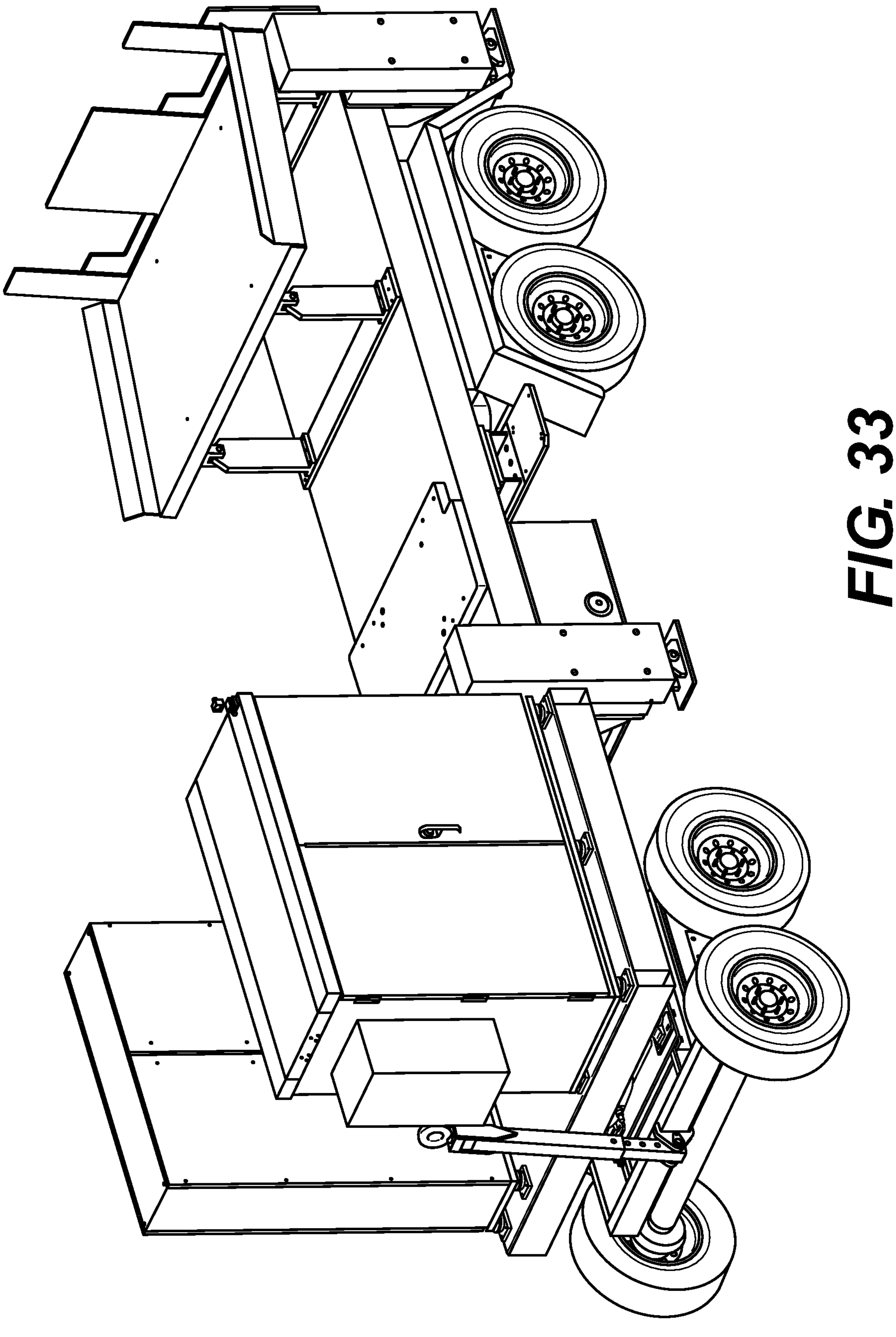
Figure 34:
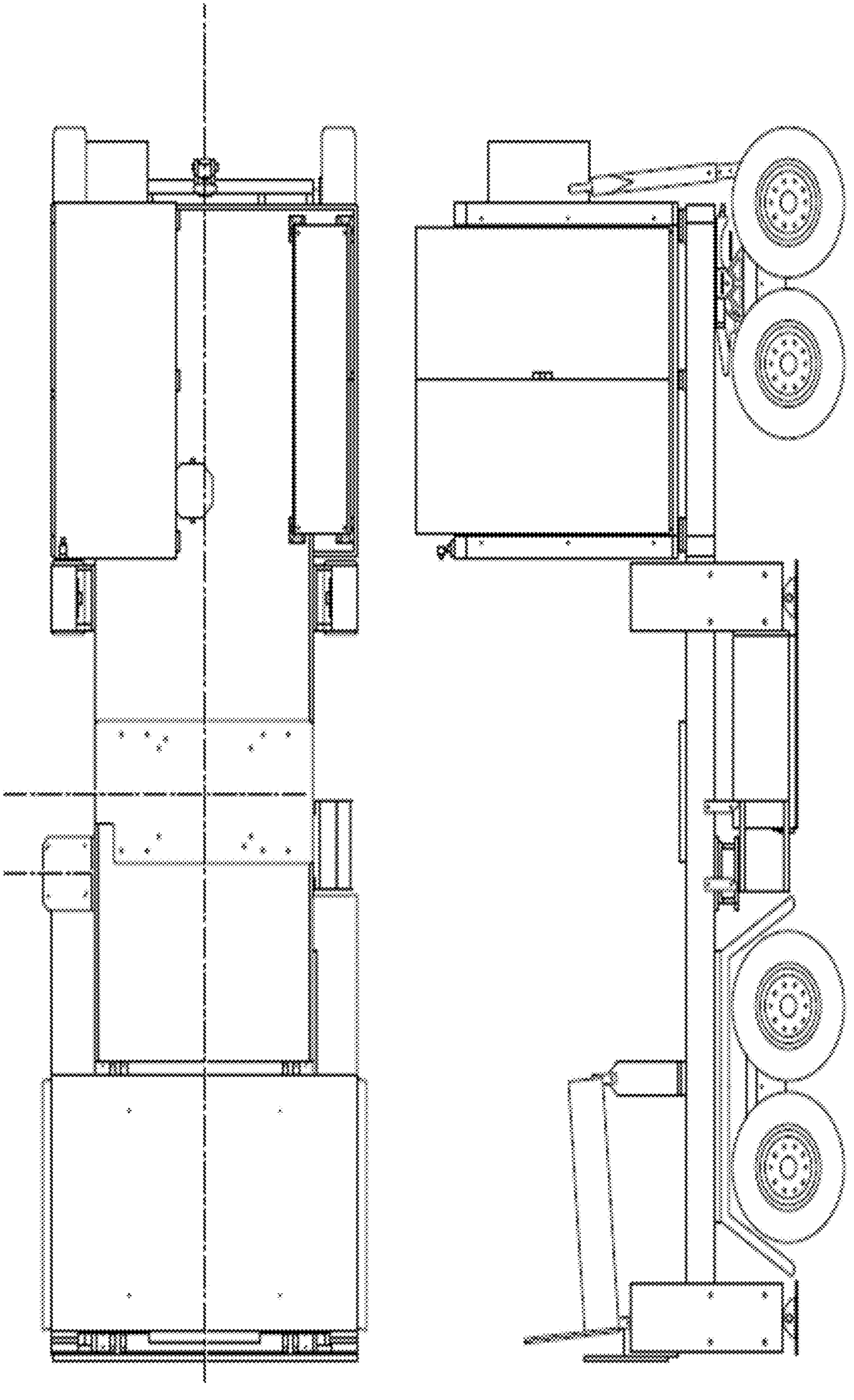
Figure 34:
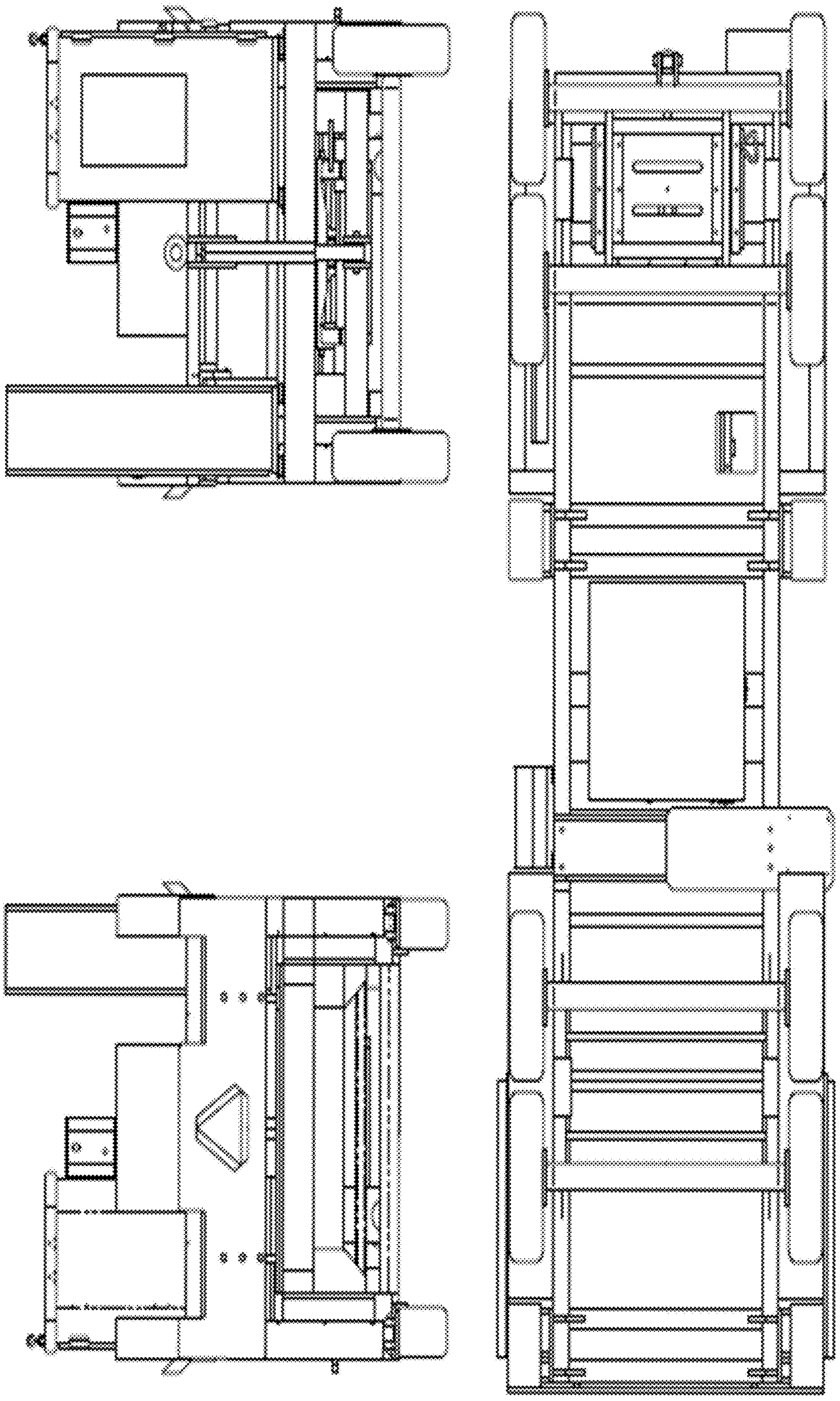

In some embodiments, as illustrated in FIG. 14, if module vehicles are used with the ground vehicle, the module vehicles may be exchanged with replenished module vehicles when all solar panels of the module vehicle are installed. Here, the computer vision process may be used to communicate with and to control an autonomous independent vehicle, such as a forklift, to bring additional solar panel boxes. Thus, the supply of solar panels may be replenished.

In the replenishment operation using the example of a forklift, the forklift (whether autonomous, remote controlled or manually operated) may be used to return empty boxes or containers of the solar panels to a waste area, remove straps, open lids, or cut away box faces from boxes being delivered, pick up boxes to correct rotation/orientation of the solar panels, or other tasks. Further, the forklift may be maintained near the ground vehicle to wait for the system to deplete the next box of solar panels. Thus, the forklift may manually or autonomously discard a depleted box, position a next box on the ground vehicle or the module vehicle, open box (including removing straps, opening lids, or cutting away box faces) and back away from the ground vehicle/module vehicle. As described, the replenishment may be autonomous, remote controlled, or manually operated, for example.

FIGS. 15-34 provide detailed illustrations of an example configuration for a system for installing solar panels according to an embodiment of the present disclosure.

Figure 35A:
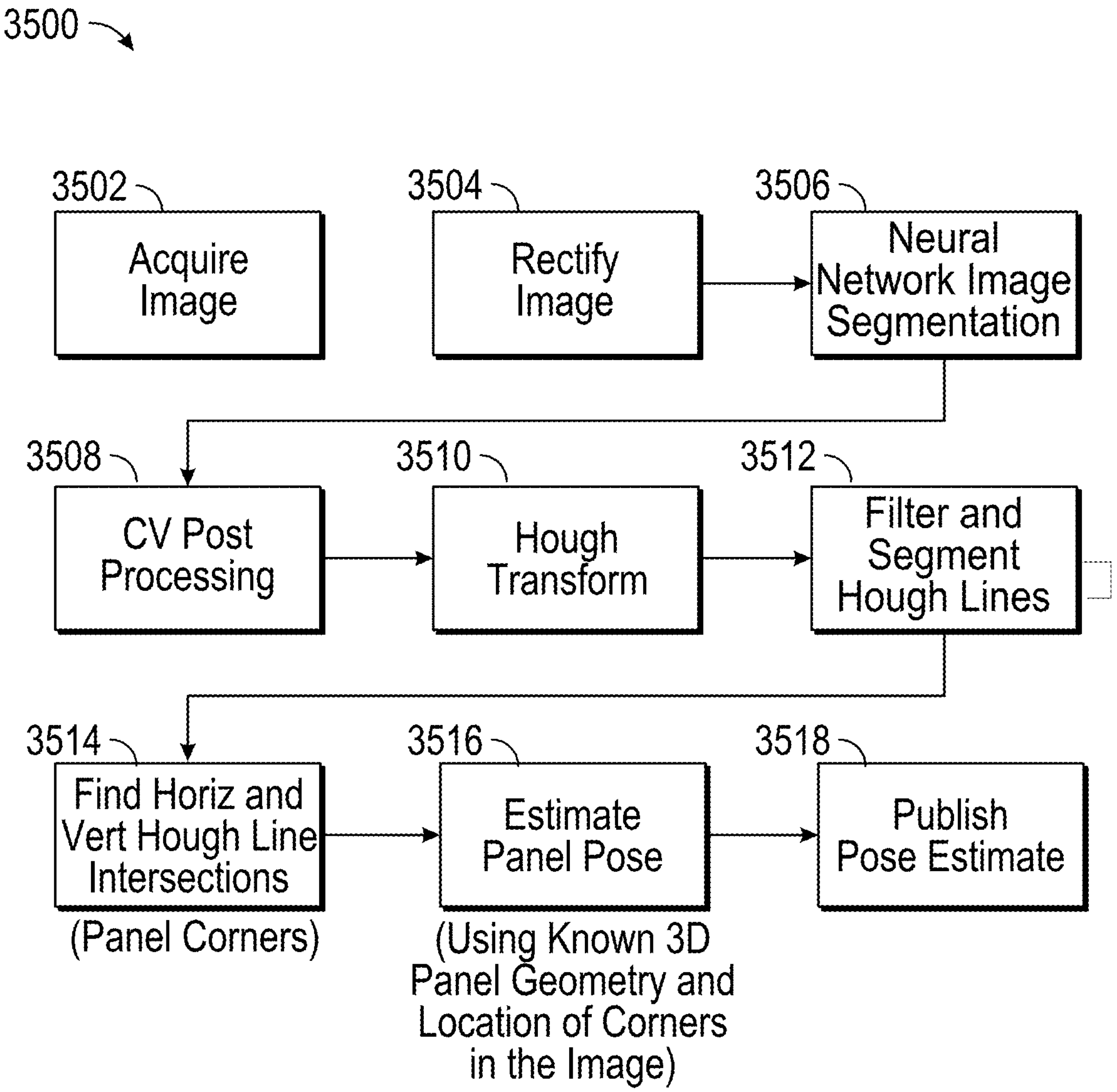
FIG. 35A shows a block diagram of an example image processing pipeline, according to some embodiments.
Figure 35B:
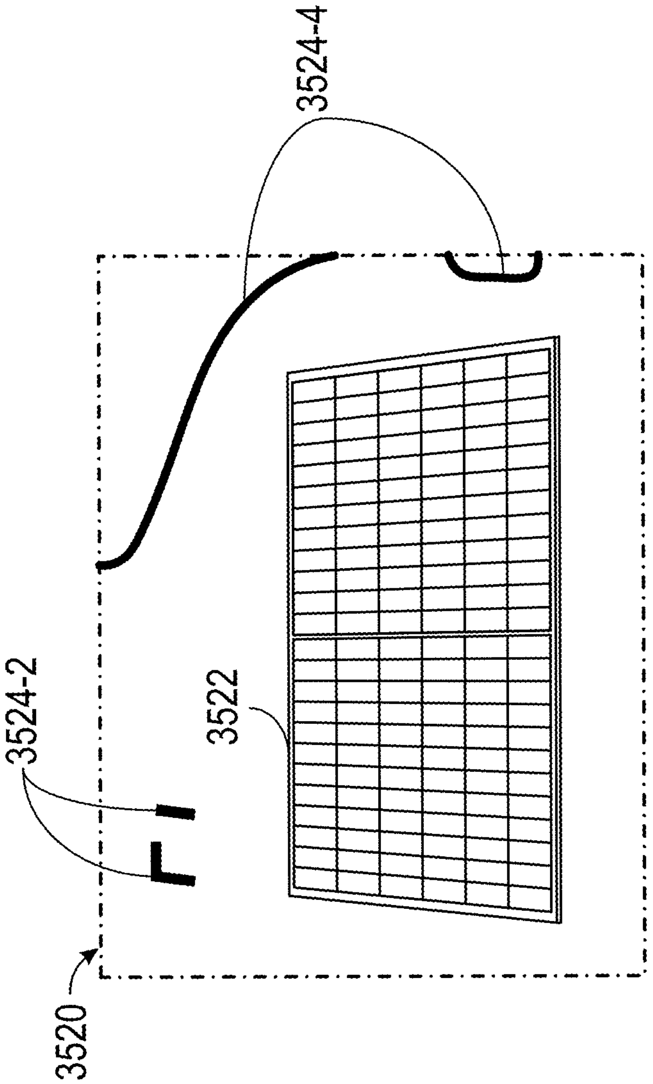
FIG. 35B shows an example rectified acquired image, according to some embodiments.
Figure 35C:
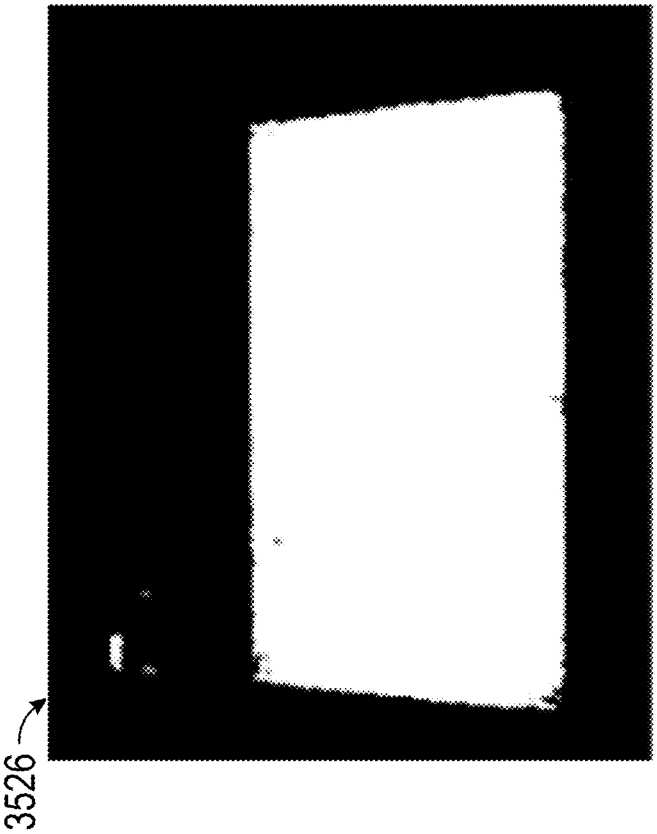
FIG. 35C shows an example output for neural network image segmentation for the acquired rectified image shown in FIG. 35B, according to some embodiments.
Figure 35D:
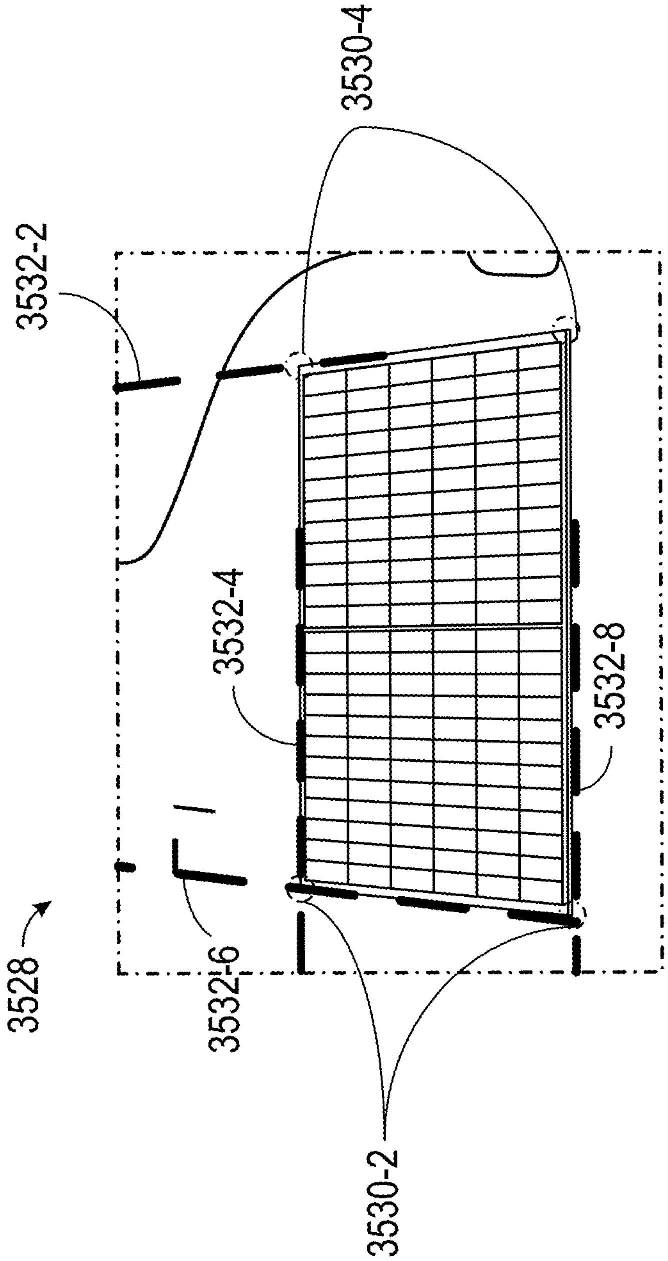
FIG. 35D shows an example panel corner detection, according to some embodiments.

FIG. 35A shows a block diagram of an example image processing pipeline 3500, according to some embodiments. The pipeline 3500 includes a module 3502 for acquiring images, a module 3504 for rectifying the images, a module 3506 for neural network image segmentation of the rectified images, a module 3508 for post-processing the output of the module 3506 using computer vision techniques, a module 3510 for performing Hough transform on the output of the module 3508, a module 3512 for filtering and segmenting Hough lines output by the module 3510, a module 3514 to identify horizontal and vertical Hough line intersections output by the module 3512, a module 3516 to estimate panel poses based on the horizontal and vertical Hough line intersections (e.g., using 3D panel geometry and location of corners in the image), and a module 3518 to publish pose estimates. FIG. 35B shows an example rectified acquired image 3520 (output of the modules 3502 and 3504) that includes an image of a solar panel 3522 and other objects 3524-2 (e.g., tapes) and 3524-4 (e.g., wires). FIG. 35C shows an example output 3526 (output of the module 3506) for neural network image segmentation for the acquired rectified image shown in FIG. 35B, according to some embodiments. FIG. 35D shows an example panel corner detection 3528 (output of the module 3514), according to some embodiments. In this example, corners 3530-2 and 3530-4 are detected based on horizontal lines 32532-4 and 3532-8 and vertical lines 3532-2 and 3532-6.

Figure 36:
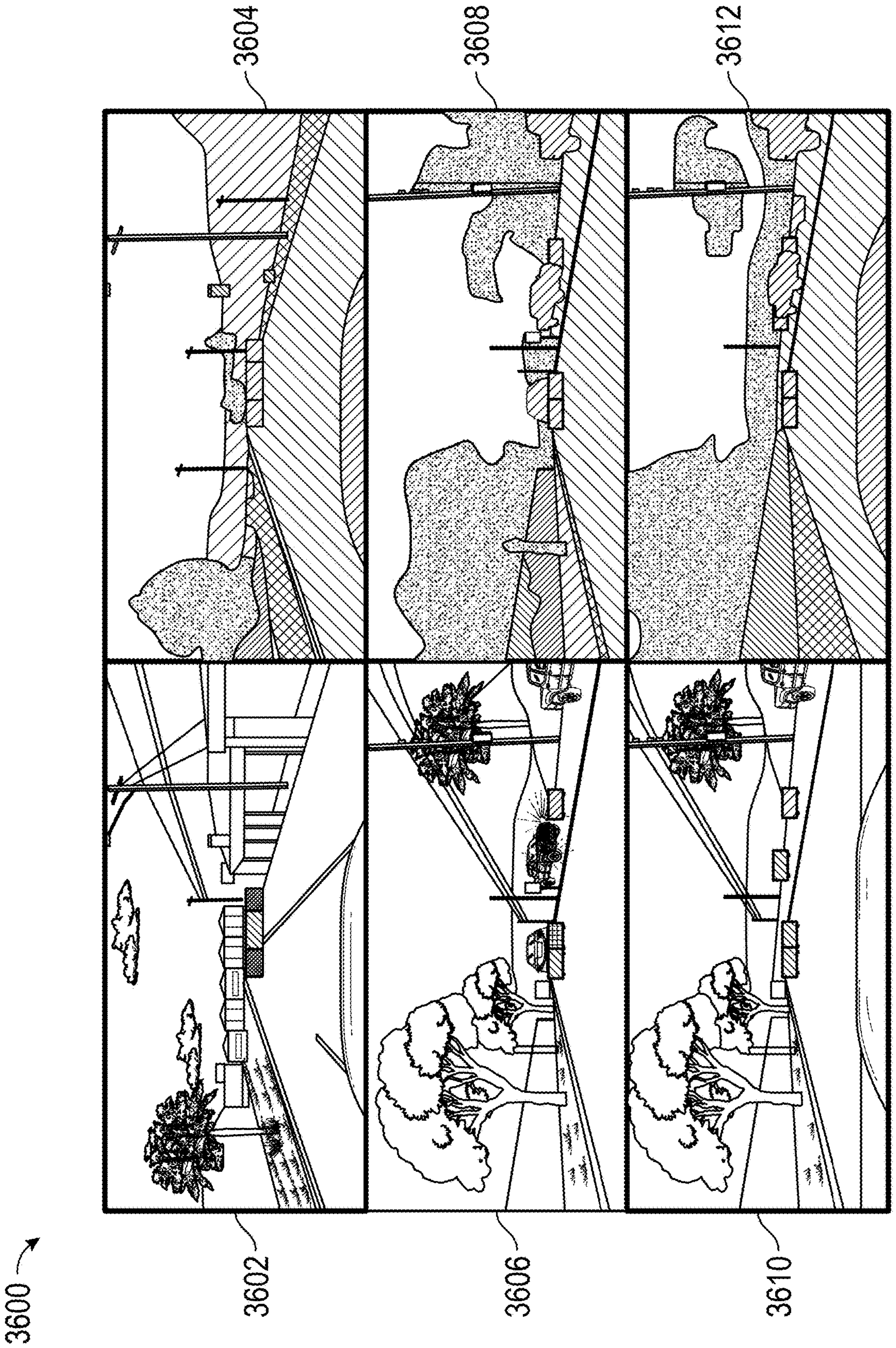
FIG. 36 shows examples for images of a road, under different lighting conditions, and segmentation masks for the images, according to some embodiments.

FIG. 36 shows examples 3600 for images 3602, 3606 and 3610, of a road, under different lighting conditions, and segmentation masks 3604, 3608 and 3612, for the images, according to some embodiments. Conventional computer vision techniques are useful when the environment is ideal. However, glare, over/under exposure can negatively affect object detection algorithms. Machine learning techniques can overcome environmental inconsistencies, learn from examples with glare and illumination issues, and can generalize to new data during inference.

Example Solar Panel Segmentation

Figure 37A:
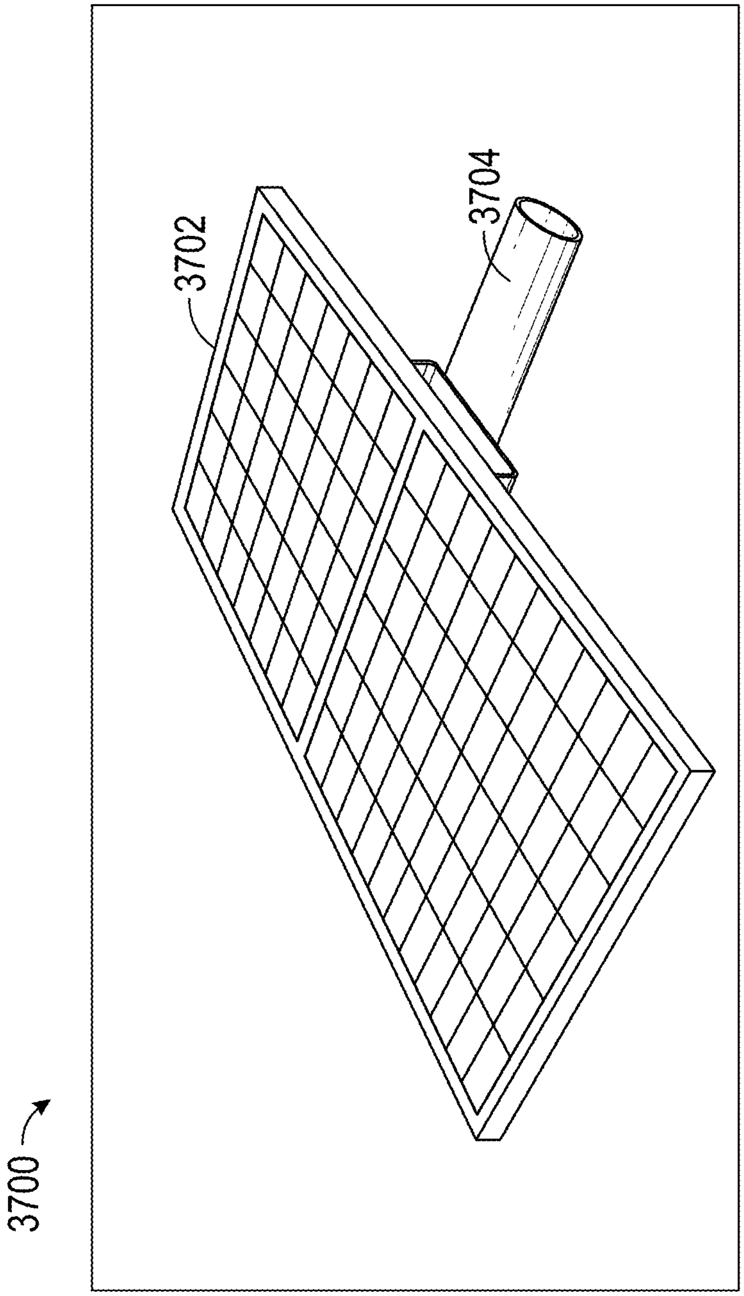
FIG. 37A shows an example of a captured image that includes a solar panel and a torque tube, according to some embodiments.
Figure 37B:
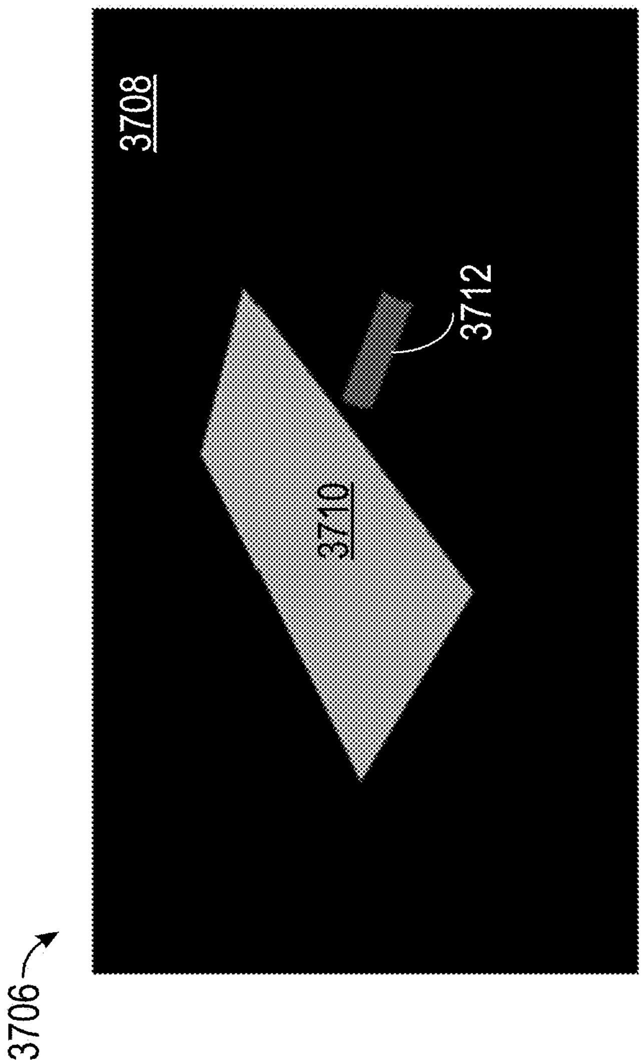
FIG. 37B shows an example of an annotated image for the captured image shown in FIG. 37A, according to some embodiments.
Figure 37C:
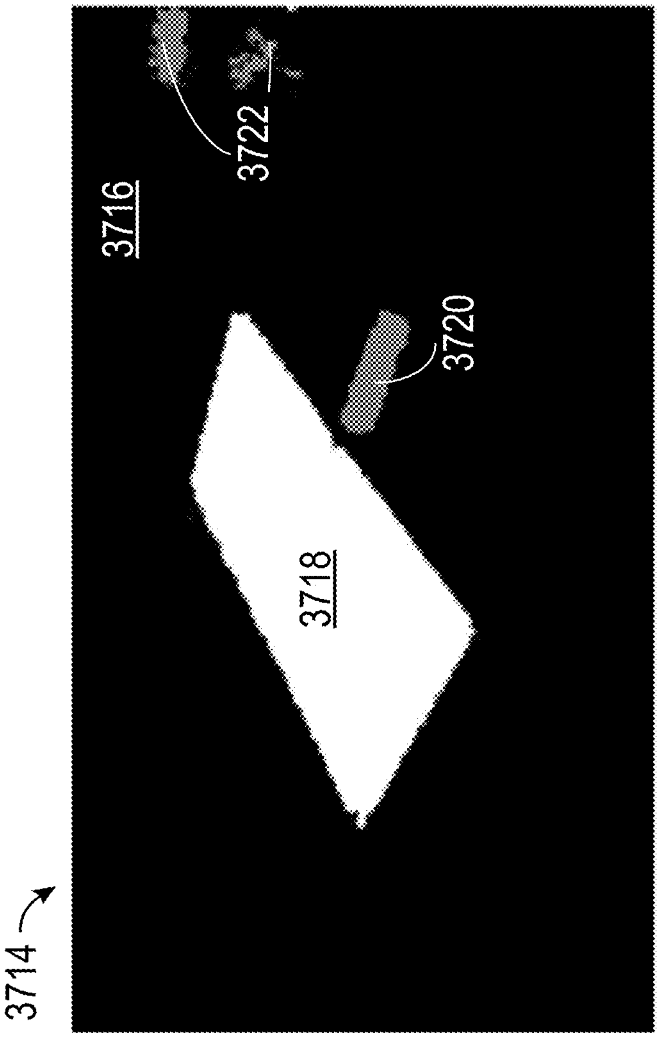
FIG. 37C shows an example prediction by the trained model, according to some embodiments.

Some embodiments perform solar panel segmentation by capturing images of solar panels and torque tubes under varying lighting conditions. FIG. 37A shows an example of a captured image 3700 that includes a solar panel 3702 and a torque tube 3704, according to some embodiments. Some embodiments annotate the captured image of solar panel. FIG. 37B shows an example of an annotated image 3706 (sometimes called an annotated ground truth mask) for the captured image 3700, according to some embodiments. The annotated image includes a black background 3708, contours of a torque tube 3712 shown in dark grey, and contours of a solar panel 3710 shown in light grey. Some embodiments create a dataset based on the annotated images, train an image segmentation model using the dataset, and use the trained model to detect solar panels and torque tubes in poor lighting conditions. FIG. 37C shows an example prediction 3714 by the trained model, according to some embodiments. The trained model predicts the background 3708, the solar panel 3710 and the torque tube 3712, and objects 3716 in the background (not shown in FIGS. 37A and 37B).

Some embodiments continuously collect images (and build datasets) and use the images for improving accuracy of the models. Some embodiments use human annotations to increase accuracy of the models. Some embodiments allow users to tune parameters of the segmentation model.

Figures 38A, 38B, 38C, 38D:
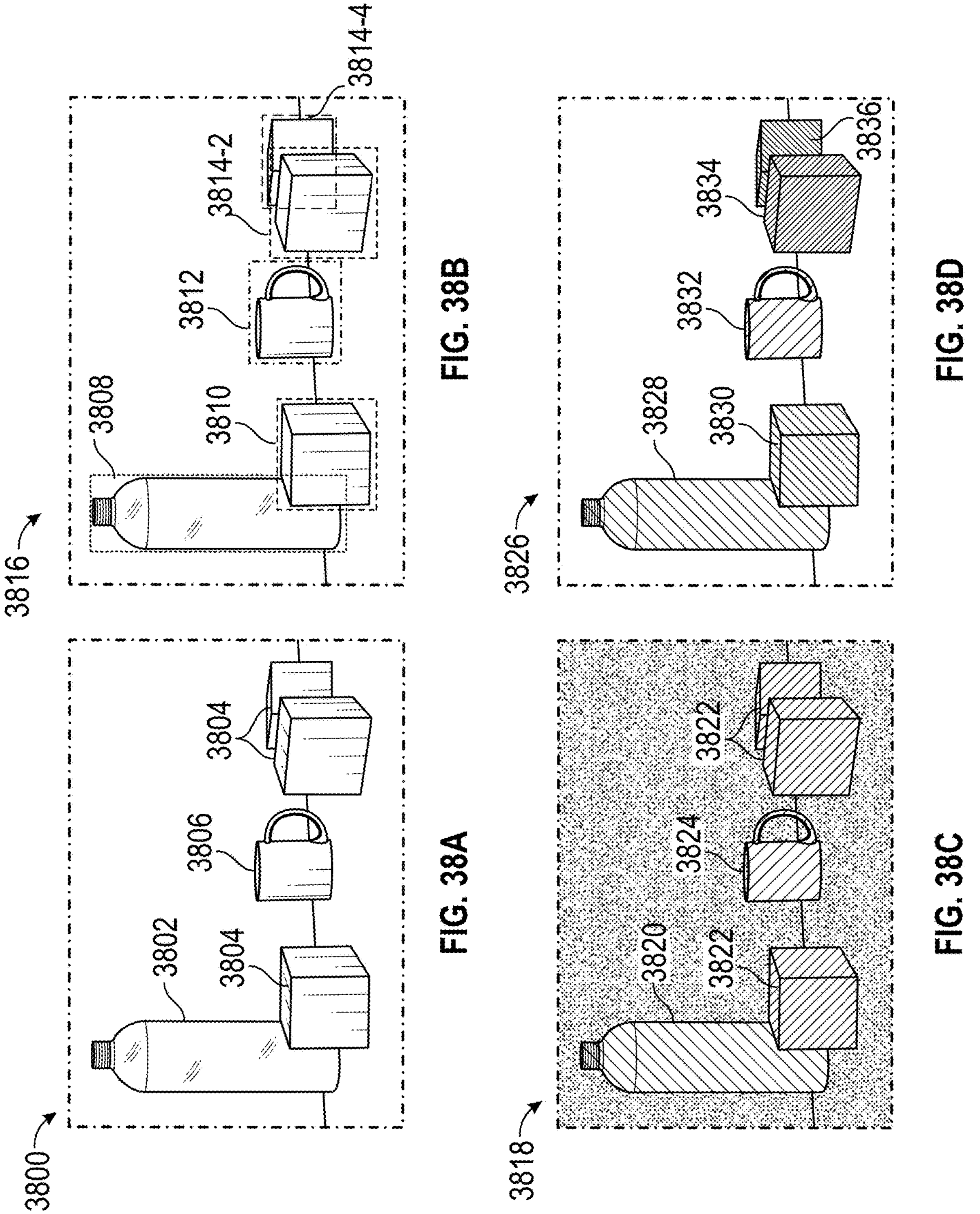
FIG. 38A shows an example of image classification.
FIG. 38B shows an example of object localization for the image shown in FIG. 38A.
FIG. 38C shows an example of semantic segmentation, according to some embodiments.
FIG. 38D shows an example of instance segmentation, according to some embodiments.
Figure 39:
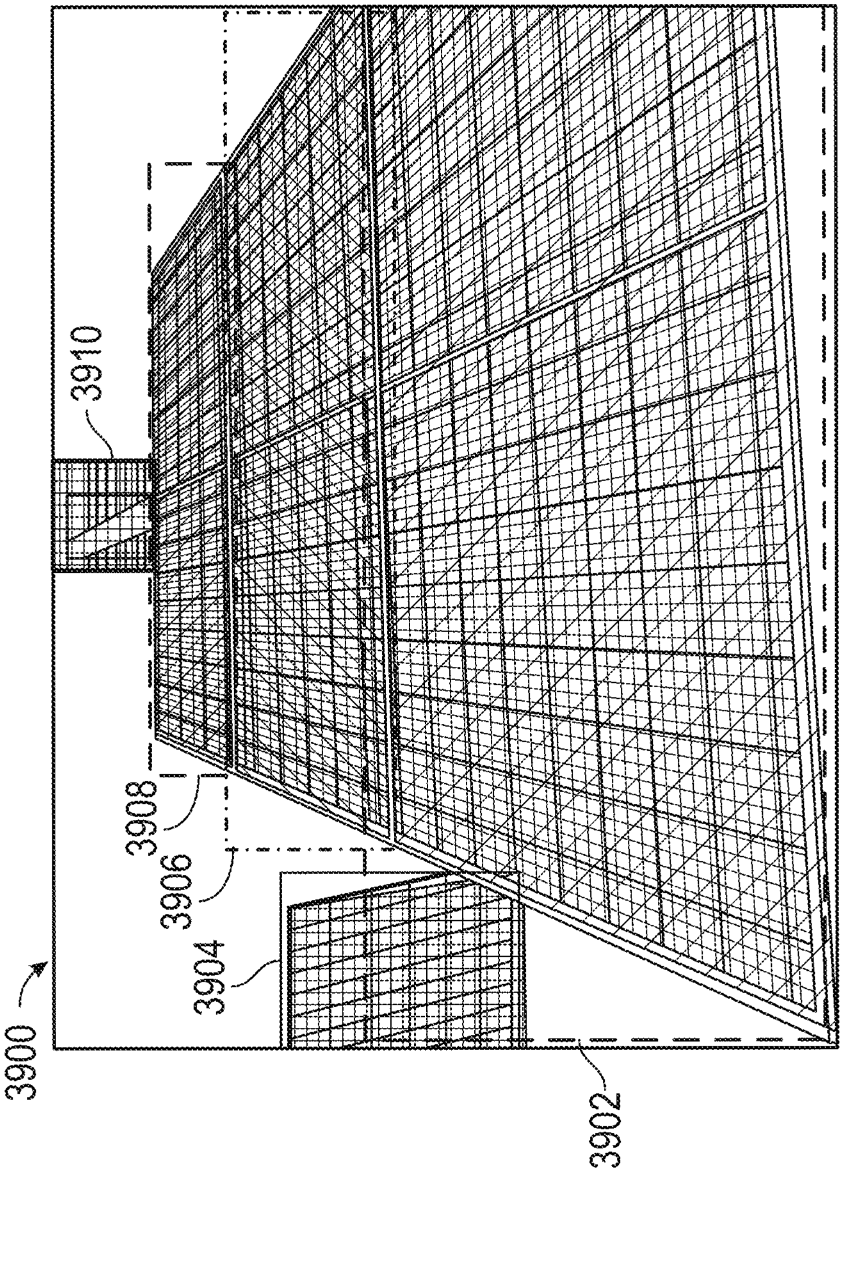
FIG. 39 shows an example of instance segmentation for solar panels, according to some embodiments.

Some embodiments include separate models for semantic segmentation and instance segmentation. FIG. 38A shows an example of image classification. In this example, the image classification detects a presence of a bottle 3802, a cub 2806 and cubes 3804. FIG. 38B shows an example of object localization 3816 for the image shown in FIG. 38A. In this example, a rectangle 3808 localizes the bottle 3802, a rectangle 3810 localizes a first cube, a rectangle 3812 localizes the cup 3806, and rectangles 3814-2 and 3814-4 localize the cubes 3804. FIG. 38C shows an example of semantic segmentation 3818, according to some embodiments. Semantic segmentation helps identify a label 3820 for the bottle 3802, a label 3822 for the cubes 3804, and a label 3824 for the cup 3806. FIG. 38D shows an example of instance segmentation 3826, according to some embodiments. Instance segmentation is able to distinguish between the instances of the cubes 3804, determining labels 3830, 3834, and 3836 for the cubes 3804, apart from identifying labels 3828 and 3832, for the bottle 3802 and 3806, respectively. Instance segmentation can distinguish between multiple solar panel instances in a single image. Instance segmentation generates masks for each class instance in a camera frame, enables individual panel identification and localization, utilizes the same data collected for semantic segmentation, and supports lighting invariance. FIG. 39 shows an example of instance segmentation 3900 for solar panels, according to some embodiments. In this example, panel instances 3902, 3904, 3906, 3908, and 3910 are identified. The example shows instances of the panels (e.g., the instances 3902 and 3904) that have different orientations.

Figure 40:
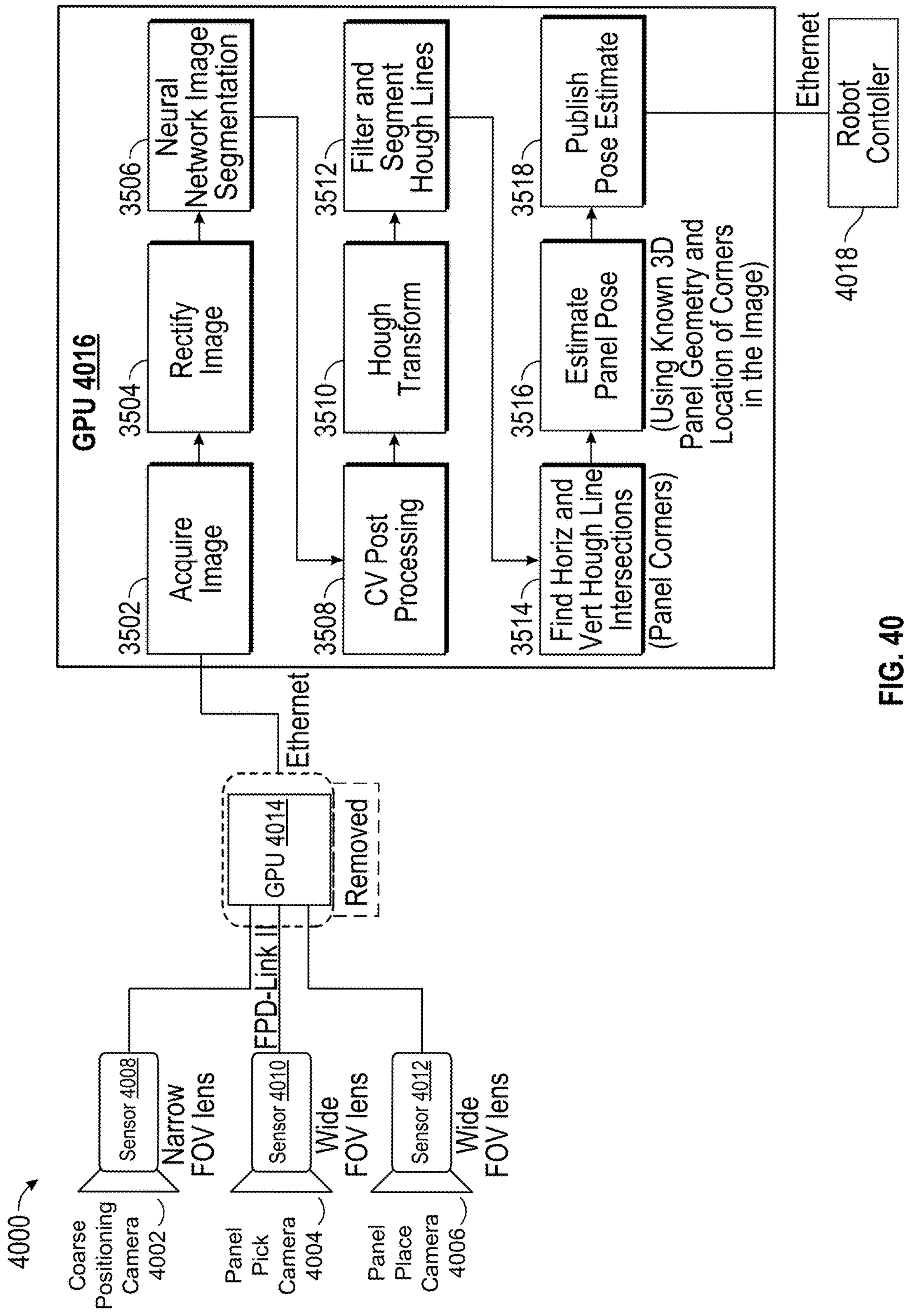
FIG. 40 shows an example image processing system, according to some embodiments.

FIG. 40 shows an example image processing system 4000, according to some embodiments. The system 4000 includes a plurality of cameras including a camera 4002 for coarse positioning, a camera 4004 for capturing images when panels are picked, and a camera 4006 for capturing images when panels are placed. The camera 4002 includes a narrow field of view lens, and the cameras 4004 and 4006 each include a wide field of view lens. The camera 4002 may be used to identify a trailer location and initial robot positions. In some embodiments, the cameras 4004 and 4006 may be the same camera. In some embodiments, the camera 4002 may also be used for locating clamps and center structures, during solar panel installation. The cameras 4002, 4004, and 4006 are coupled to respective image sensors 4008, 4010, and 4012 (e.g., AR0820 sensor). In some embodiments, the image sensors are optimized for both low light and/or high dynamic range performance. In some embodiments, the system 4000 includes a high-speed digital video interface (e.g., FPD-link) and Ethernet for connecting the cameras to one or more GPUs (e.g., a GPU 4014 that is suitable for edge AI processing, such as Nvidia XT, a GPU that is suitable for image processing applications, such as Nvidia AGX Xavier™). The GPU 4016 implements the example image processing pipeline 3500 described above, and is connected to a robot controller 4018 using Ethernet. The GPU 4014 may be removed in some systems, and the output from the sensors may be directly connected to the GPU 4016, according to some embodiments.

Figure 41B:
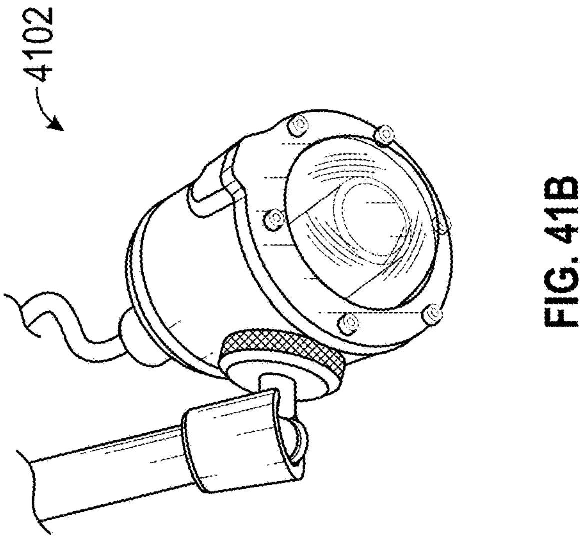
FIGS. 41A and 41B shows a trailer system with a coarse camera, according to some embodiments.
Figure 41A:
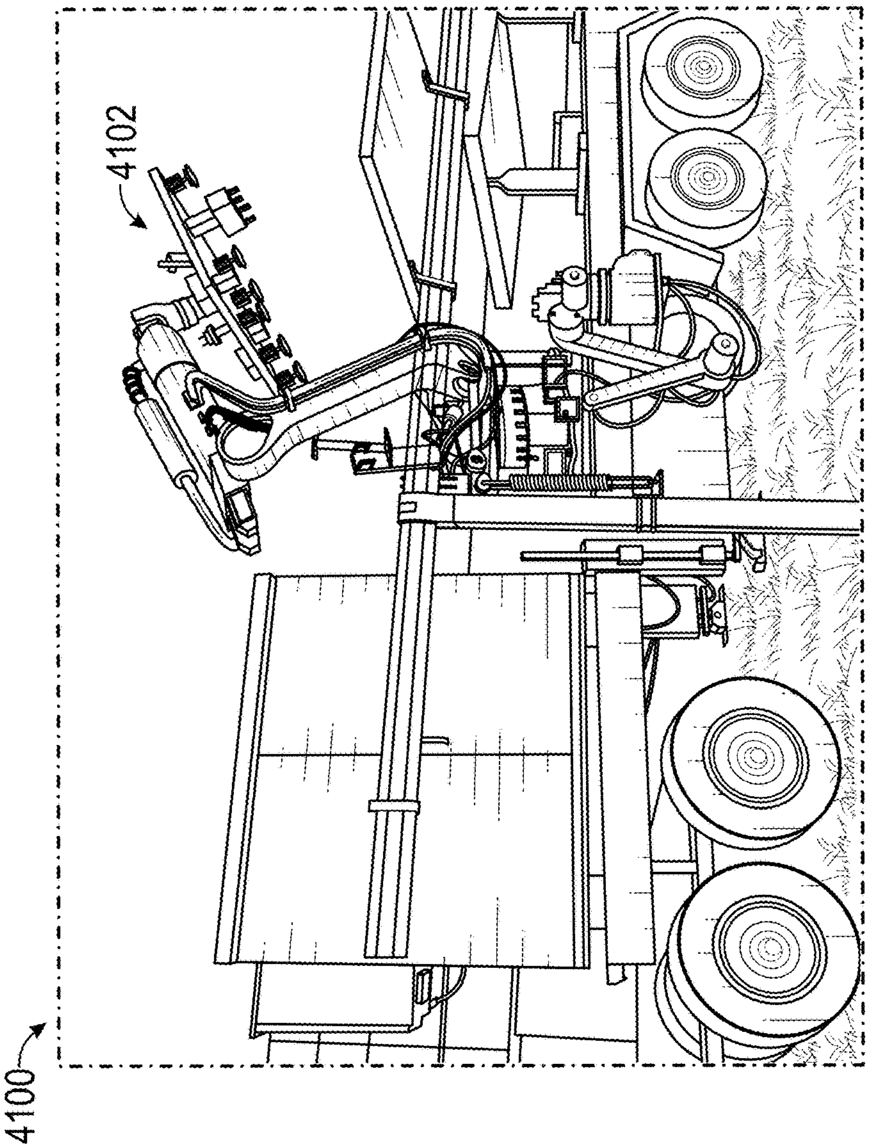

Some embodiments continue to capture training images while installing solar panels. FIG. 41 shows a trailer system 4100 with a coarse camera 4102 that may be used for capturing training images, according to some embodiments. The AI/neural network system takes into account the intrinsic parameters (e.g., camera/lens distortion) as well as the extrinsic parameters (e.g., camera position and angle on the robotic arm and the pose of the robotic arm at the moment of the image capture) to calculate where each of the four corners of the panels are.

Figure 42A:
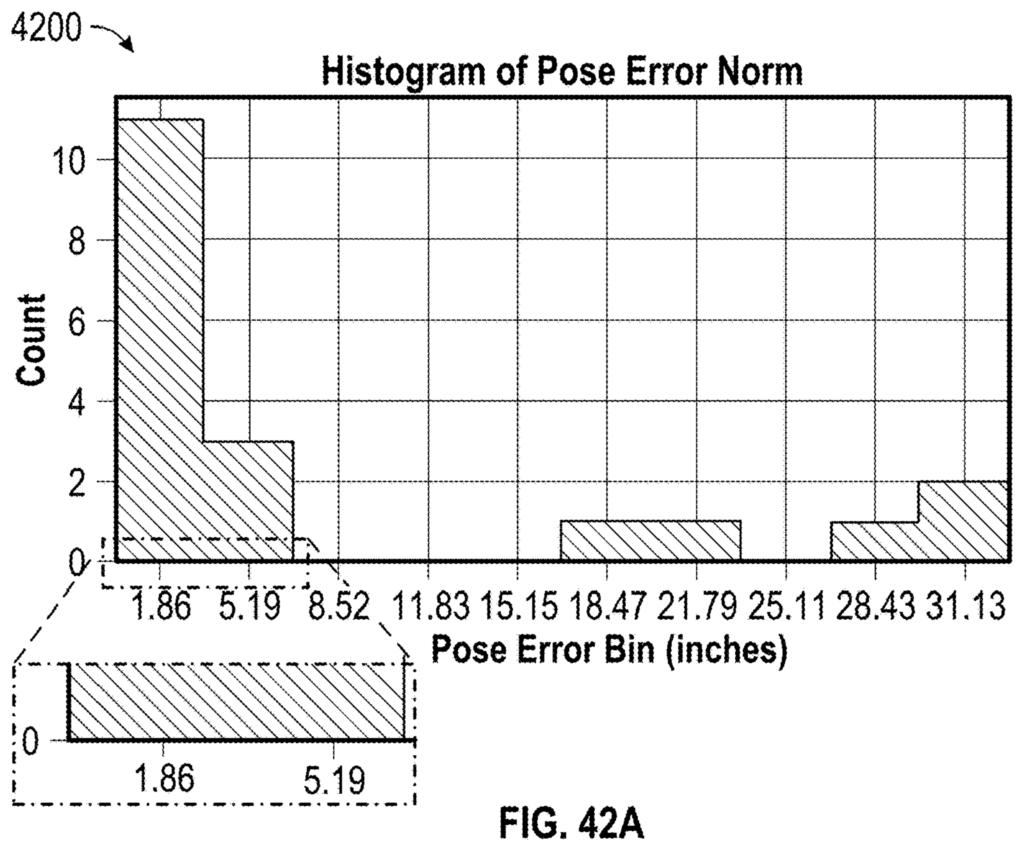
FIGS. 42A and 42B show histograms of pose error norms for the neural network with and without coarse position, according to some implementations.
Figure 42B:
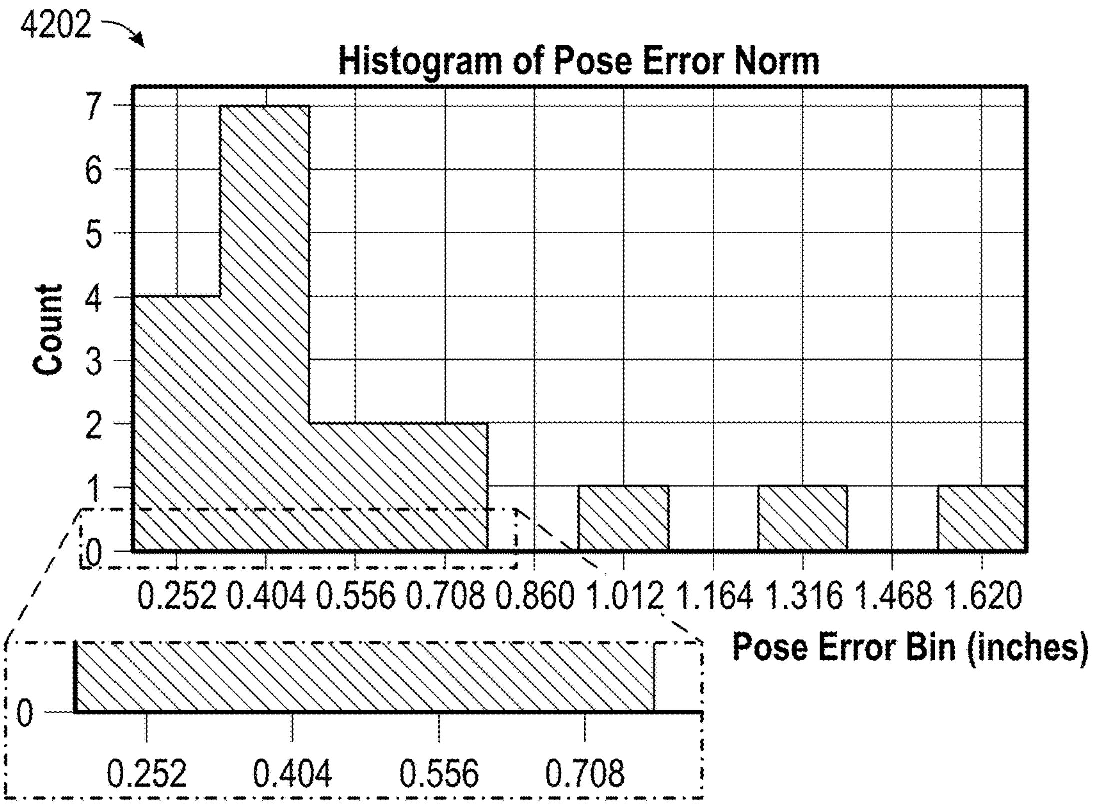

FIGS. 42A and 42B show histograms 4200 and 4202 of pose error norms for the neural network when coarse position is used and when coarse position is not used, respectively, according to some implementations. As shown, with coarse position, neural network error (difference between real position of the corners of a solar panel and estimates from the neural network) is substantially reduced (from close to 5 inches down to 0.7 inches or so, in some instances).

Figure 43A:
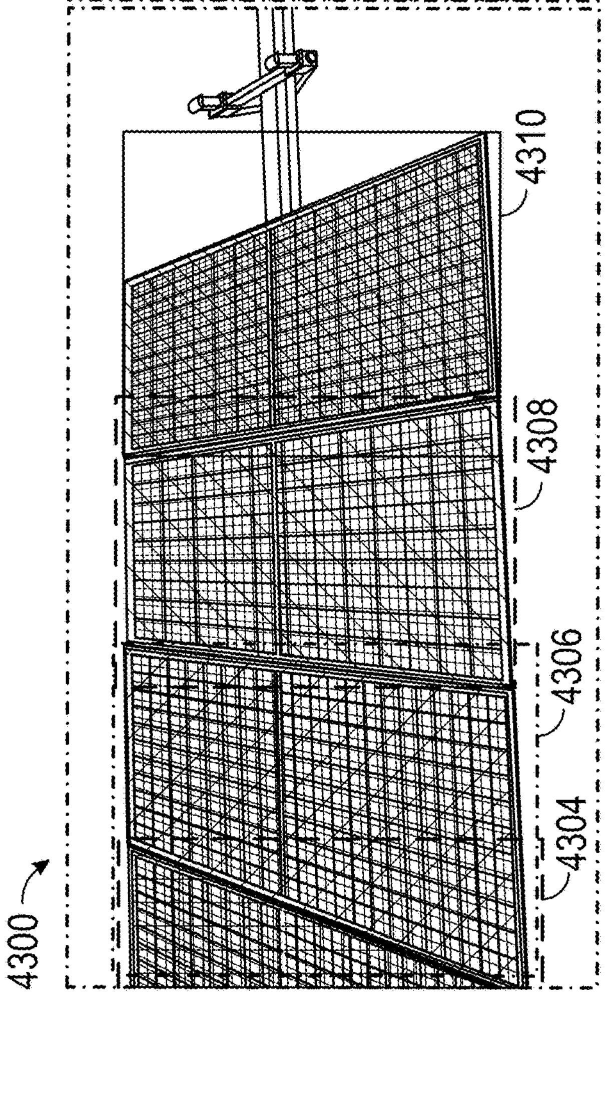
FIGS. 43A and 43B show examples for coarse positions of solar panels using a B Mask R-CNN model, according to some embodiments.
Figure 43B:
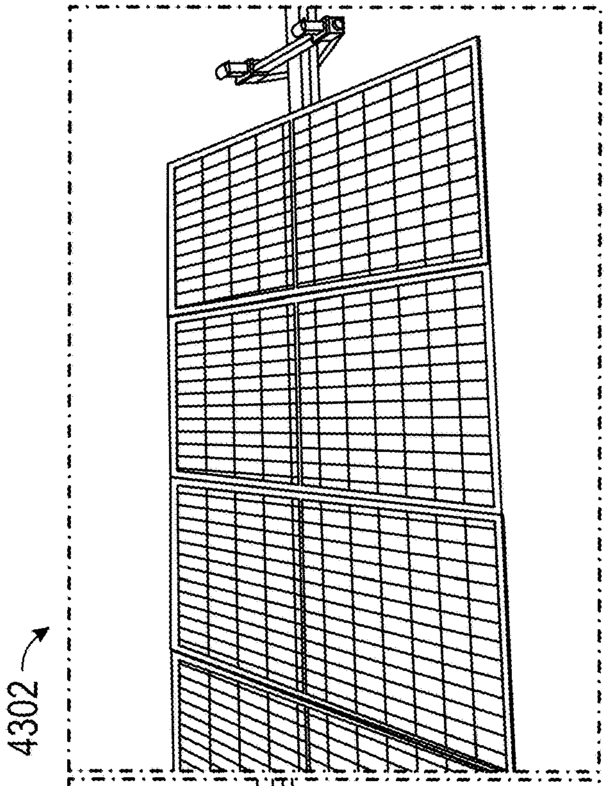

FIGS. 43A and 43B show examples 4300 and 4302 for coarse positions (e.g., positions 4304, 4036, 4308, and 4310) of solar panels using a B Mask R-CNN model, according to some embodiments. Mask R-CNN is a Convolutional Neural Network (CNN) used for image segmentation and instance segmentation. This deep neural network detects objects in an image and generates a high-quality segmentation mask for each instance. Mask R-CNN is based on a region-based Convolutional Neural Network. Image Segmentation is the process of partitioning a digital image into multiple segments or sets of pixels corresponding to image objects. This segmentation is used to locate objects and boundaries (lines, curves, etc.). Mask R-CNN can be used for semantic segmentation and instance segmentation. Semantic segmentation classifies each pixel into a fixed set of categories without differentiating object instances. In other words, semantic segmentation deals with the identification/classification of similar objects as a single class from the pixel level. All objects are classified as a single entity (solar panel). Semantic segmentation is sometimes called background segmentation because it separates the subjects of the image (e.g., solar panels, wires) from the background. On the other hand, instance segmentation (sometimes called instance recognition) deals with the correct detection of all objects in an image while also precisely segmenting each instance. In that sense, instance segmentation combines object detection, object localization, and object classification, and helps distinguish instances of each object in an image. In addition to having two outputs for each candidate object including a class label and a bounding-box offset, in Mask R-CNN, a third branch outputs an object mask. This mask output helps with extraction of a finer spatial layout of an object. Apart from being simpler to train, performant and efficient, when compared to other models, Mask R-CNN is particularly suited for solar panel identification, because of the neural network's ability to perform both semantic segmentation and instance segmentation. Moreover, the mask branch adds only a small computational overhead, enabling fast solar panel detection and rapid experimentation. Mask R-CNN can be used for image segmentation, identifying objects in the image and creating a mask within the boundaries of the object.

Figure 44:
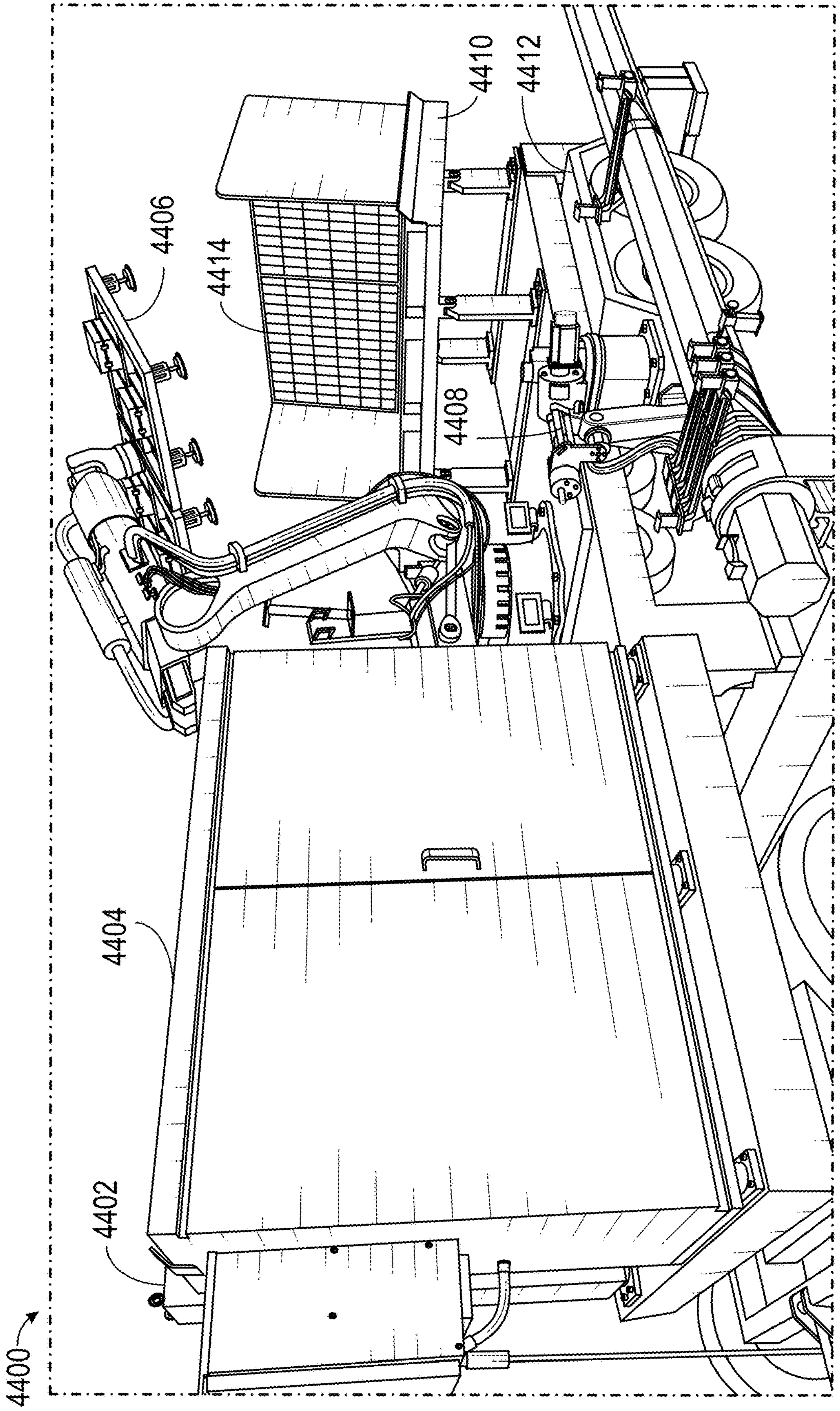
FIG. 44 shows a system for solar panel installation, according to some embodiments.

FIG. 44 shows a system 4400 for solar panel installation, according to some embodiments. The system 4400 includes a main enclosure 4404, a battery enclosure 4402, an upper robot End-of-Arm Tooling (EOAT) 4406, a lower robot EOAT 4408, a cradle 4410 for holding solar panels 4414, on a trailer 4412, according to some embodiments.

Figure 45B:
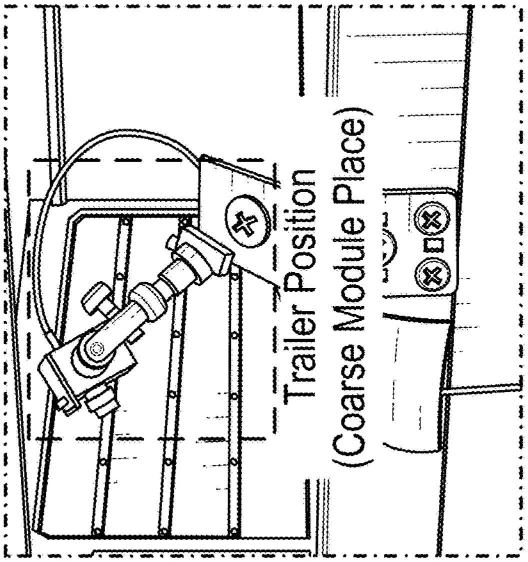
FIG. 45B shows an enlarged view of the vision system, according to some embodiments.
Figure 45A:
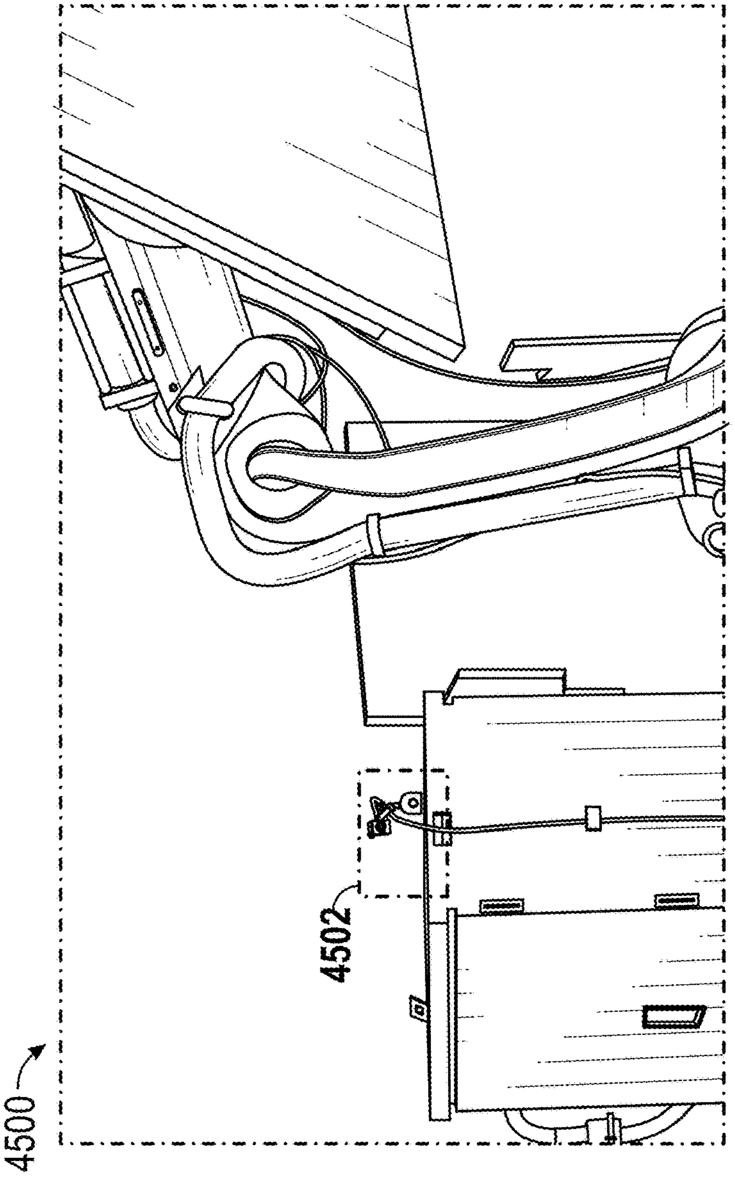
FIG. 45A shows a vision system for tracking trailer position.

FIG. 45A shows a vision system 4502 mounted on the trailer and used to estimate the pose of the structure 4500, and FIG. 45B shows an enlarged view of the vision system 4502, according to some embodiments. Various embodiments may have the vision system mounted on different parts of the ground vehicle, on the robotic arm, or on the end of arm tooling.

Figure 46A:
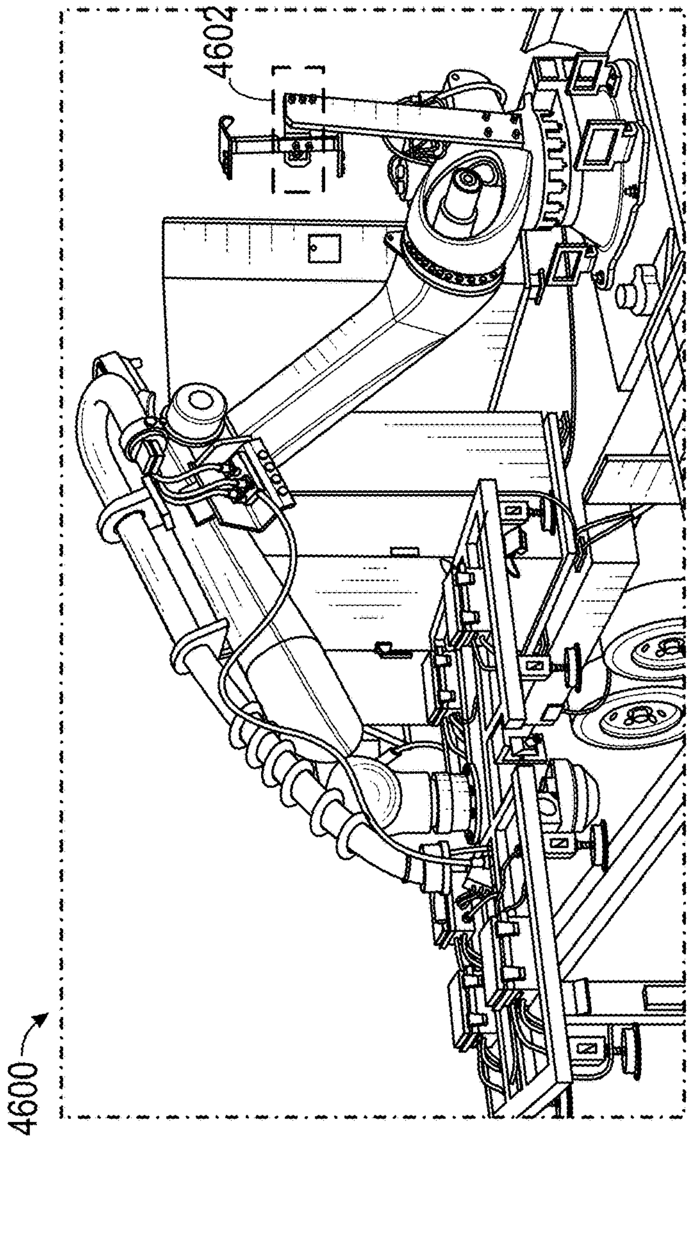
FIG. 46A shows a vision system for module pick.
Figure 46B:
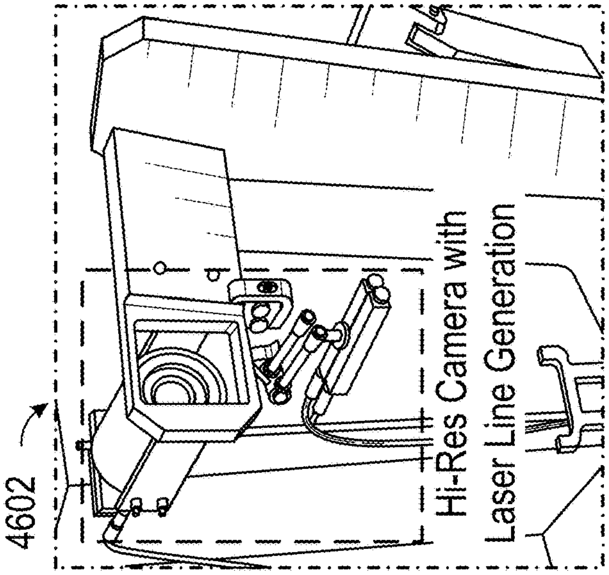
FIG. 46B shows an enlarged view of the vision system, according to some embodiments.

FIG. 46A shows a vision system 4602 for module pick 4600, and FIG. 46B shows an enlarged view of the vision system 4602, which includes a high-resolution camera with laser line generation, according to some embodiments.

Figure 47B:
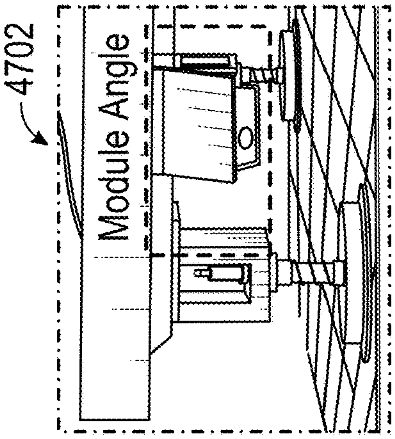
FIGS. 47A, 47B, and 47C show a system for distance measurement at module angle, according to some embodiments.
Figure 47C:
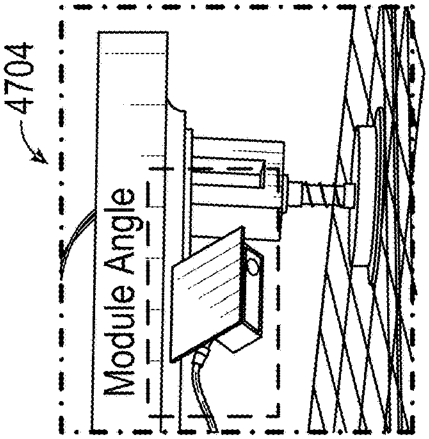
Figure 47A:
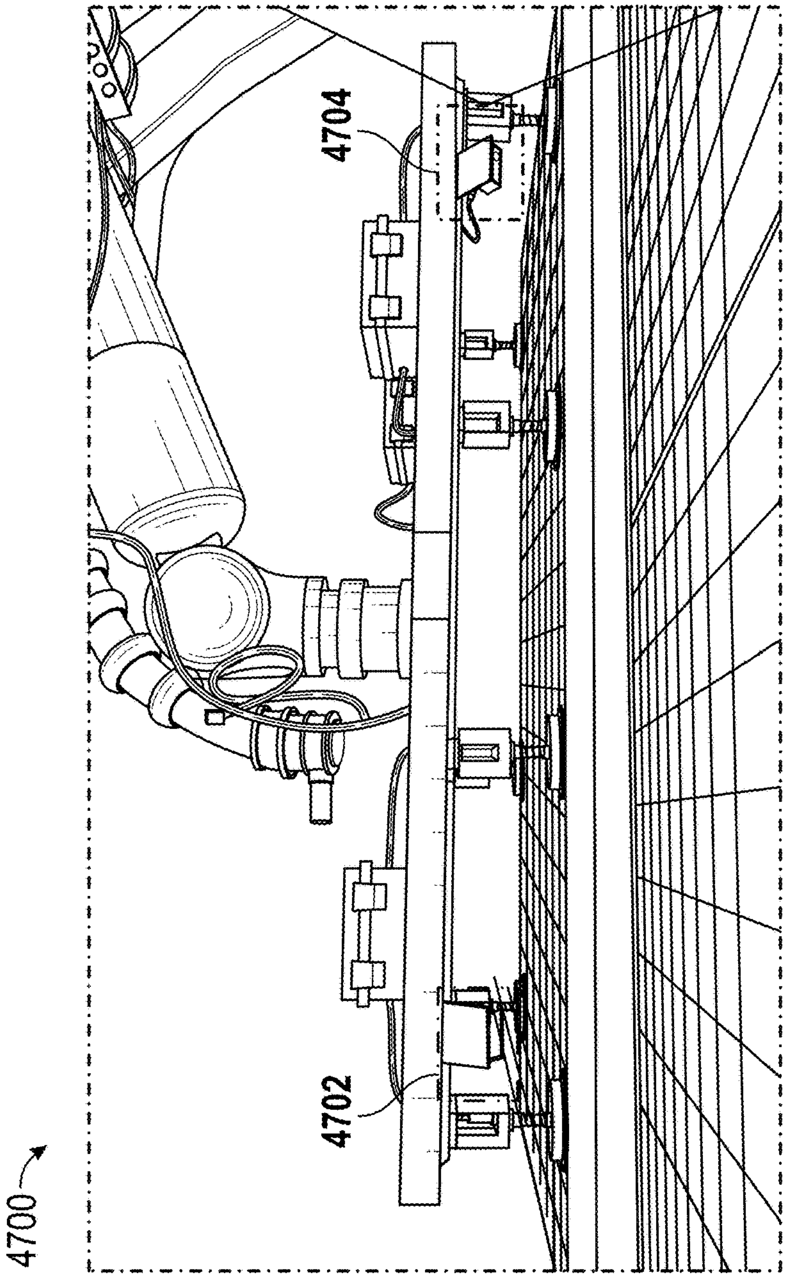

FIG. 47A shows a system 4700 for distance measurement at module angle (i.e., when facing a module) between position 4702 (an enlarged view of which is shown in FIG. 47B) and position 4704 (an enlarged view of which is shown in FIG. 47C), according to some embodiments.

Figure 48A:
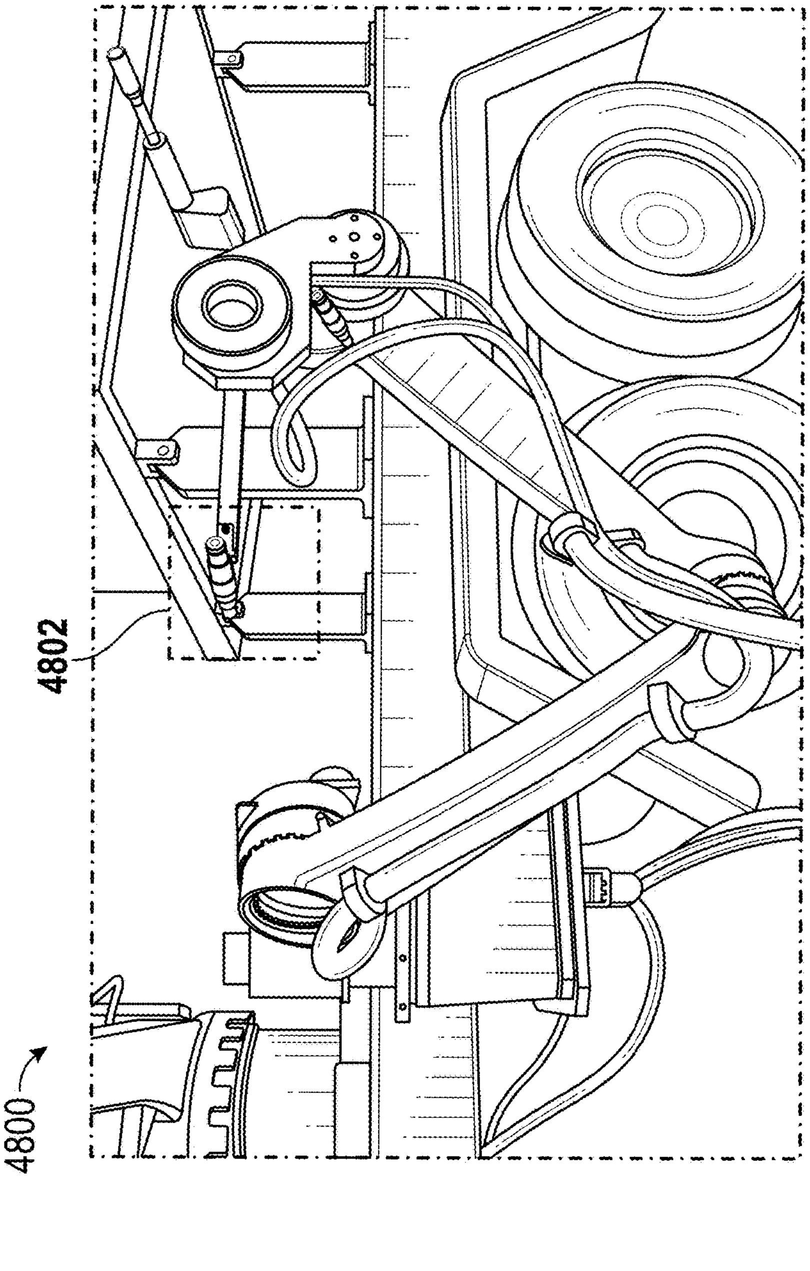
FIG. 48A shows a system for laser line generation for detecting tube and clamp position, according to some embodiments.
Figure 48B:
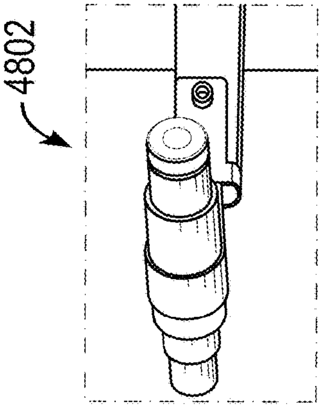
FIG. 48B shows an enlarged view of the laser line generation system shown in FIG. 48A.
Figure 48C:
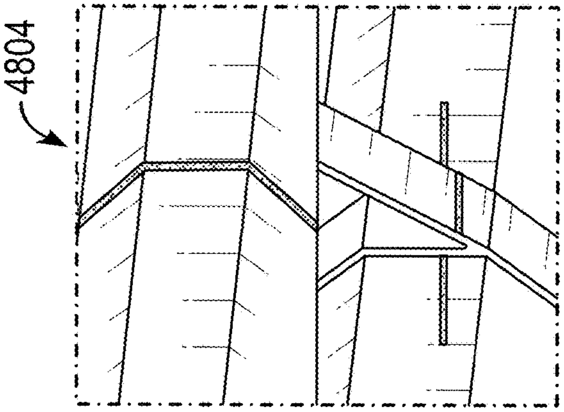
FIG. 48C shows a view of laser line generation (horizontal line detects a clamp, and a vertical line detects a tube), according to some embodiments.

FIG. 48A shows a system 4800 for laser line generation for detecting tube and clamp position, according to some embodiments. FIG. 48B shows an enlarged view of the laser line generation system 4802, and FIG. 48C shows a view 4804 of laser line generation (horizontal line detects a clamp, and a vertical line detects a tube), according to some embodiments.

Figure 49B:
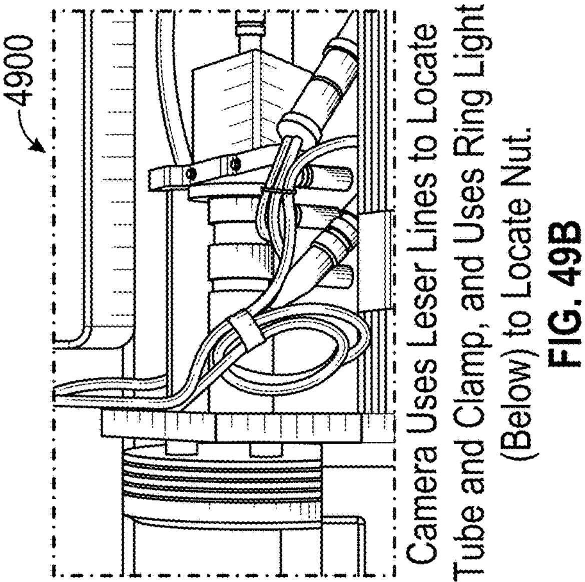
FIG. 49B shows an enlarged view of the vision system.
Figure 49C:
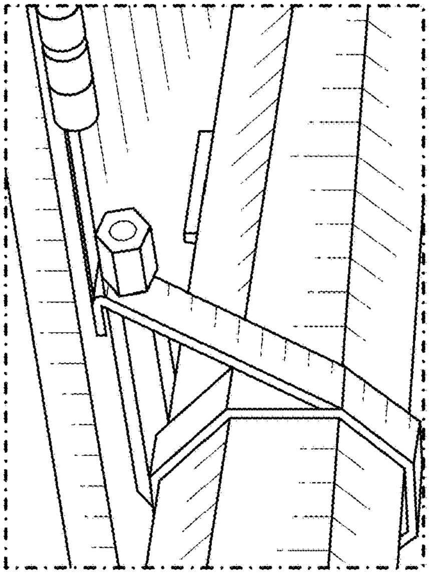
FIG. 49C shows the nut on the clamp that, when tightened, compresses the clamp to keep the panels in place, according to some embodiments.
Figure 49A:
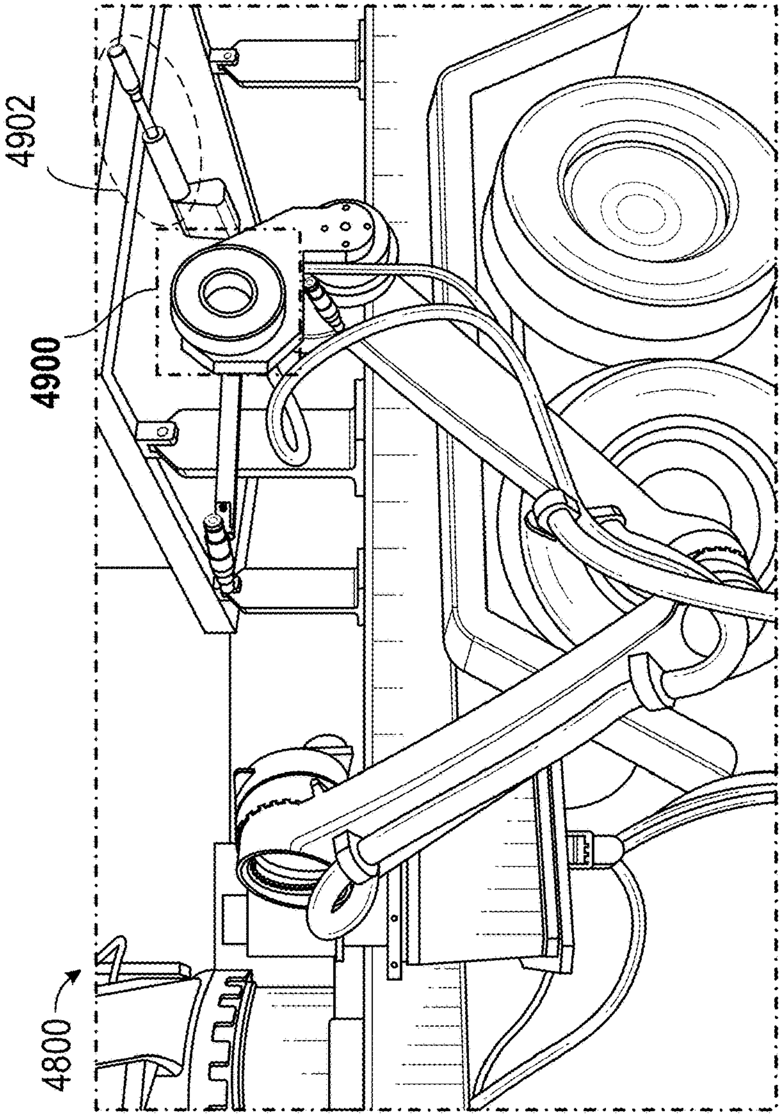
FIG. 49A shows a vision system 4900 for estimating tube and clamp position.

FIG. 49A shows a vision system 4900 for estimating tube and clamp position and locating the nut on the clamp, according to some embodiments. FIG. 49A also shows a socket wrench 4902 used to tighten the nut. FIG. 49B shows an enlarged view of the vision system. As shown in FIG. 49B, the camera uses the laser lines described above to locate tube and clamp, and uses a flash ring light to locate the nut on the clamp. The lasers provide an accurate estimation of tube and clamp position. The flash ring light is used to locate the nut on the clamp shown in FIG. 49C. This nut, when tightened, compresses the clamp to keep the panels in place.

Example Solar Panel Installation Using Artificial Intelligence

Figure 50A:
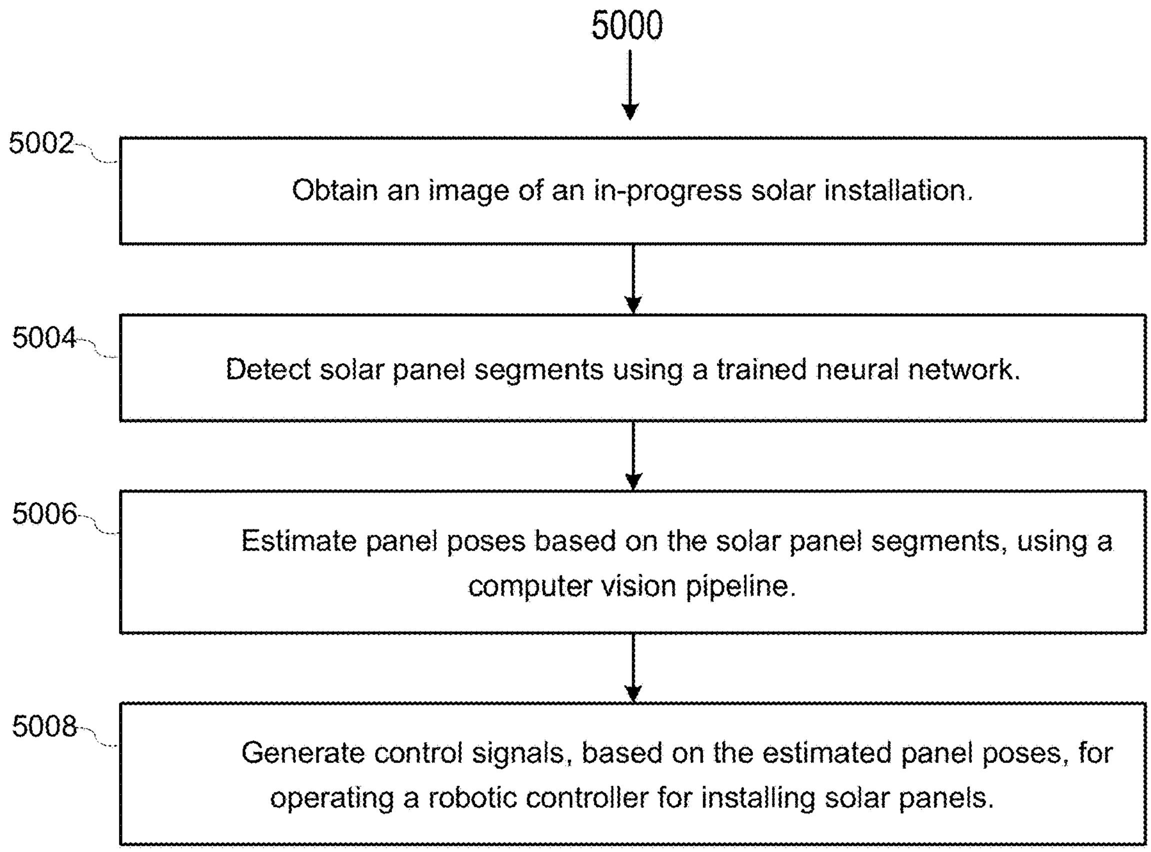
FIG. 50A shows a flowchart of a method for autonomous solar installation, according to some embodiments.

FIG. 50A shows a flowchart of a method 5000 for autonomous solar installation, according to some embodiments. The method includes obtaining (5002) an image of an in-progress solar installation. The image includes an image of one or more solar panels and one or more torque tubes. In some embodiments, obtaining the image includes using one or more filters for avoiding direct sun glare for detecting End-of-Arm Tooling (EOAT). In some embodiments, obtaining the image includes using a high-resolution camera with laser line generation for identifying the one or more torque tubes and/or a clamp position. In some embodiments, the image includes an image of a clamp and/or a center structure for the in-progress solar installation. In some embodiments, the image includes an image of a clamp and/or a center structure for the in-progress solar installation. In some embodiments, a plurality of images is acquired using wide angle fish-eye lens to create a composite HDR (High Dynamic Range) image inside a camera hardware. The images are sent through a Robot Operating System (ROS) which is a high-level software framework for integration of robots and servos, using OpenCV (an image processing framework) modules to rectify the images (e.g., change from fish-eye distortion to flat image). Then a region and a bit depth are selected and used to collapse the HDR image into a standard 8-bit image, thereby effectively cropping the region and bit depth to prepare it as input for a trained neural network. At point of acquisition, a robot pose may be stored (using ROS) to create a transform camera result relative to a trailer (a trailer system used for solar panel installation). This may include a robot location and a camera location to identify where the image is in 3D space.

The method also includes detecting (5004) solar panel segments by inputting the image to a trained neural network that is trained to detect solar panels in poor lighting conditions. Neural networks may be implemented using software and/or hardware (sometimes called neural network hardware) using conventional CPUs, GPUs, ASICs, and/or FPGAs. In some embodiments, the trained neural network comprises (i) a model for semantic segmentation for identifying a solar panel segment, and (ii) a model for instance segmentation for identifying a plurality of solar panel. In some embodiments, the trained neural network uses a Mask R-CNN framework for instance segmentation. The trained neural networks detect solar panel segments based on features extracted from an image of an in-progress solar installation. In some embodiments, the image obtained is input to the neural network through ROS (e.g., the input image goes from the OpenCV module to a neural network module (Detectron)). Example techniques for training the neural network are described below in reference to FIG. 50B, according to some embodiment. In some embodiments, the neural network performs image segmentation to identify a panel (or panels) without identifying location(s) of the panel(s). In some embodiments, there is one model that does both functions (semantic segmentation and instance segmentation). Some embodiments use two instances of the same model to optimize throughput. In such cases, the camera takes two images, and one image goes through each instance. Running two models allows processing twice as many images in the same time.

The method also includes estimating (5006) panel poses for the one or more solar panels, based on the solar panel segments, using a computer vision pipeline. In some embodiments, the computer vision pipeline includes one or more computer vision algorithms for post-processing, Hough transform, filtering and segmentation of Hough lines, finding horizontal and/or vertical Hough line intersections, and panel pose estimation using predetermined 3D panel geometry and corner locations. In some embodiments, the computer vision pipeline locates the clamps and/or the center structures to estimate the panel poses. In some embodiments, the computer vision pipeline locates the one or more torque tubes and/or the clamp position to estimate the panel poses. In some embodiments, the computer vision pipeline locates the nut. After locating the nut, the socket wrench mounted on a smaller robotic arm may engage with the nut and tighten it to secure the panel in place. Before doing this step, the clamps may be loose and panels may fall off due to wind.

In some embodiments, estimating the panel poses is performed using conventional machine vision hardware for locating where panel(s) are in a 3-D space. In some embodiments, this is a rough identification of round edges, and is not intended to be very precise. Hough transform may be used subsequently to determine precise locations of edges, which is followed by extrapolation of edge lines of panels, determination of where panels cross, and identification of a panel corner. The panel corners are published to identify where the panel is with respect to the robot. For example, based on a panel geometry in 3-D, the panel's pose is calculated based on the location of corners of the panel in the image.

In some embodiments, for estimating the panel poses, the computer vision pipeline uses a PnP (Perspective-n-Point) solver with camera intrinsic parameters (it is aware of its own camera distortion and parallax). Then the extrinsic parameters capture the camera's position relative to the robot using the robotic arm and EOAT pose at the moment of image capture. The robot pose may be captured continuously with a time stamp. That time stamp may then be used to match the robot pose to the camera acquisition time stamp. In some embodiments, the computer vision pipeline uses a known pose of the robotic arm and end of arm tool (where the camera sits) at the time of image capture to calculate a position of one or more corners of a panel.

The method also includes generating (5008) control signals, based on the estimated panel poses, for operating a robotic controller for installing the one or more solar panels. In some embodiments, after the panel is found, the location is projected along the tube to seek clamp pixels to identify the clamp location (e.g., how far away the clamp is, how close it is for the clamp puller). Some embodiments use clamp positions to verify that clamps are within an allowable window required by the clamp puller on EOAT. Some embodiments use the center structures to determine sequence on whether to place one or two panels to avoid collisions with the fan gear. Some embodiments use panel position to make sure that the trailer is in a valid position relative to the tube so that robot is within reach of the work needed to perform. Some embodiments use the pose from the leading panel to then guide the lower robot in its fine tube acquisition, which drives the positions of the upper and lower robot for the panel place and the nut drive. In some embodiments, the fine tube acquisition described above uses a horizontal and vertical laser to create a profilometer system that finds the tube and the clamp positions. This refines the working pose from the coarse tube from 10-20 mm and reduces it to less than plus or minus 5 mm. At the first panel, the coarse tube error is within 5 mm, but as this is projected out, the errors grow and the fine tube is used to constrain that to under plus or minus 5 mm.

Figure 50B:
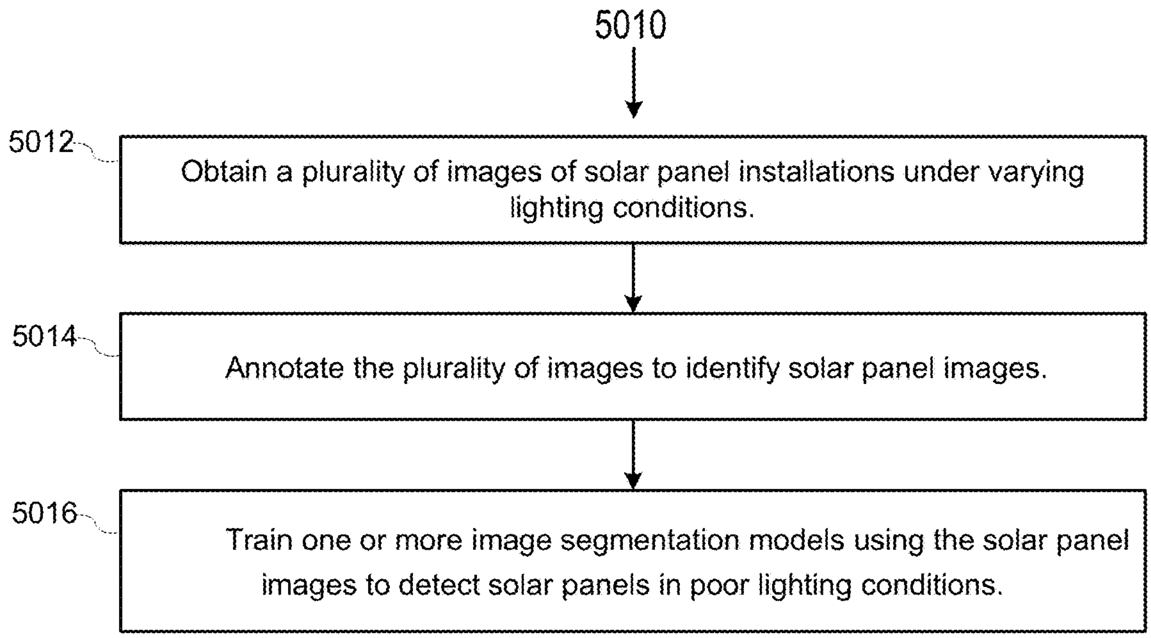
FIG. 50B shows a flowchart of a method of training a neural network for autonomous solar installation, according to some embodiments.

FIG. 50B shows a flowchart of a method 5010 of training a neural network for autonomous solar installation, according to some embodiments. The method includes obtaining (5012) a plurality of images of solar panel installations under varying lighting conditions, annotating (5014) the plurality of images to identify solar panel images (human annotated images may be used instead of or in addition to automatically annotated images), and training (5016) one or more image segmentation models using the solar panel images to detect solar panels in poor lighting conditions. In some embodiments, the neural network is trained manually using various images, such as different backgrounds (e.g., grass, dirt), different quantities of panels, several images of clamps, panels with or without cardboard corners, under various weather conditions (e.g., sunny conditions, rainy conditions). Within the images, a mask (lines) are drawn to indicate which pixels represent a panel, clamps, tubes, and center structures. These images and their masks are used to create a series of pseudo images that the neural network then uses in the training process. The pseudo images are the input images with distortions to angles in order to be able to train several times using a same input image. For example, 300-1000 real (input) images may be used for training, and for each real image, 10-20 pseudo images may be created.

Synthetic images may be used for training machine learning algorithms for solar panel installation. However, synthetic images or other synthetic training data may be cost prohibitive, and may even be impossible to generate in some situations. Producing realistic images could take weeks of training, even on expensive hardware and may need extensive supervision. Generating useful synthetic data is typically a trial-and-error process. There are also risks associated with overtraining using synthetic data. Because artificial data is often used in areas where real-world data is scarce, there is a chance that the data generated might not accurately reflect real world scenarios. Given these constraints, there is a need for systems and methods techniques that do not rely on synthetic data. The techniques described herein are not site limited because images are not used for learning. The techniques are panel centric and the background profile do not affect correctness. Some embodiments use a predictor corrector mechanism whereby a center is predicted, tested for failure, and a failure is used as a feedback to improve a next estimate of the center.

Some embodiments use solar physics, sun's elevation, and/or azimuth to extract sun's relative position in the sky. Some embodiments estimate the glare based on the estimation of the sun's position. Some embodiments use high fidelity noise cancellation and image correction algorithm to false color the glare. Some embodiments identify the center and corners of the panel, detect wear on the torque tube and false color wear lines/scratches in shading (e.g., blue shading), place the panel, and/or detect structures, such as clamps and fan gears.

Some embodiments pick a solar panel by detecting corners and center of a panel to assist a top robot (sometimes referred to as a top robotic arm) to accurately pick the solar panel. Panels may come in different sizes. Some embodiments detect a placed panel, and assist a bottom robot for accurately aligning the panel relative thereto. Some embodiments detect a clamp location, and assist an operator with clamp movement. Panels are protected from impact. For example, some embodiments detect a fan gear location, and assist an operator in safe placement of the solar panel relative thereto. Panels are also guarded against collision. These aspects are described below in detail.

According to some embodiments, a first step for picking a solar panel is to estimate where a panel's center is. An upper robotic arm (e.g., the upper robot End-of-Arm Tooling (EOAT) 4406) may pick the panel using the center estimation. The solar panels may come in different sizes but have a same general shape—they are predominantly rectangular, even if the solar panels are sourced from different manufacturers. The algorithmic techniques described herein exploit the rectangular shape of the solar panel for estimating the center. The size can be different, meaning width and length of the solar panel can change, which affects where the center of the panel is and consequently where the corners of the panel are. Although described herein with respect to rectangular solar panels, the methods and techniques can be applied and or suitable modified to be utilized for other polygon-shaped solar panels.

After the center and the corners are identified, the upper arm may pick the solar panel and enter a place mode. In the place mode, the picked panel needs to be aligned to a torque tube and in relation to an existing (or previously placed) panel, avoiding collision with that panel. Some embodiments also detect other structures in the mounting environment, such as a clamp, to avoid collision with such structures. The placed panel cannot collide with the existing panel and has to be properly aligned with the existing panel so that once the alignment process is complete, a lower robotic arm (e.g., the lower robot EOAT 4408) steps up and tightens a screw on the clamp, according to some embodiments. So the upper robotic arm picks and places the solar panel, and the lower robotic arm ensures alignment, optionally be using a laser. In some embodiments, an image recognition software detects other structures in the mounting environment, such as a fan gear, an operator is notified so that the placement of the panel can be offset so as to avoid collision or impact with the structure.

During picking, placement and/or alignment, the sun's travel may have an impact. The sun's travel may depend on time of a day, and/or season. Some embodiments use sun's elevation and/or sun's azimuth. Azimuth is the angle of sun's impact on ground. Sun's elevation is where sun is located in the sky on a particular day, and may be particularly important for solar panel installation. Solar panels typically have a coating on top that is reflective by nature. Solar physics needs to be taken into account. High transmission is desired so that more photons are converted to electrons but excessive conversion results in underperformance of the solar panel. So to protect it from this unwanted irradiation, some embodiments include a thin film of coating that is applied on the solar panel that is reflective in nature. Due to this sun's travel on a particular day and due to the orientation of these solar panels during the picking, there is a lot of reflectance and glare seen on a panel. Consequently, when the camera captures that image, there are dark white spots in the image which impacts and throws off computer vision algorithms.

Another failure mode is, as the clamps have to be manually adjusted, the clamps have to be moved along the torque tube. This is physical movement of the clamps that involves metal on metal contact. The movement of the clamp on the torque tube may cause a scar or a graze on the torque tube. When the lower robotic arm looks at this, it reflects white on white background. The laser line that was supposed to be an indicator of alignment is focused on a metallic object so it reflects white. From the image perspective, because the background is also white, it is not possible to know where the laser lines are because the two colors merge. In some embodiments, this is circumvented using a colored (e.g., blue) tape so that there is a background that provides contrast. Because of these problems, there is need for non-synthetic data based systems. The techniques described herein provide similar functionality as those described above for picking, placement and alignment, avoiding collision and/or impact by using geometry.

Example Method for Estimating Geometric Center and Corners of a Panel

Figure 51A:
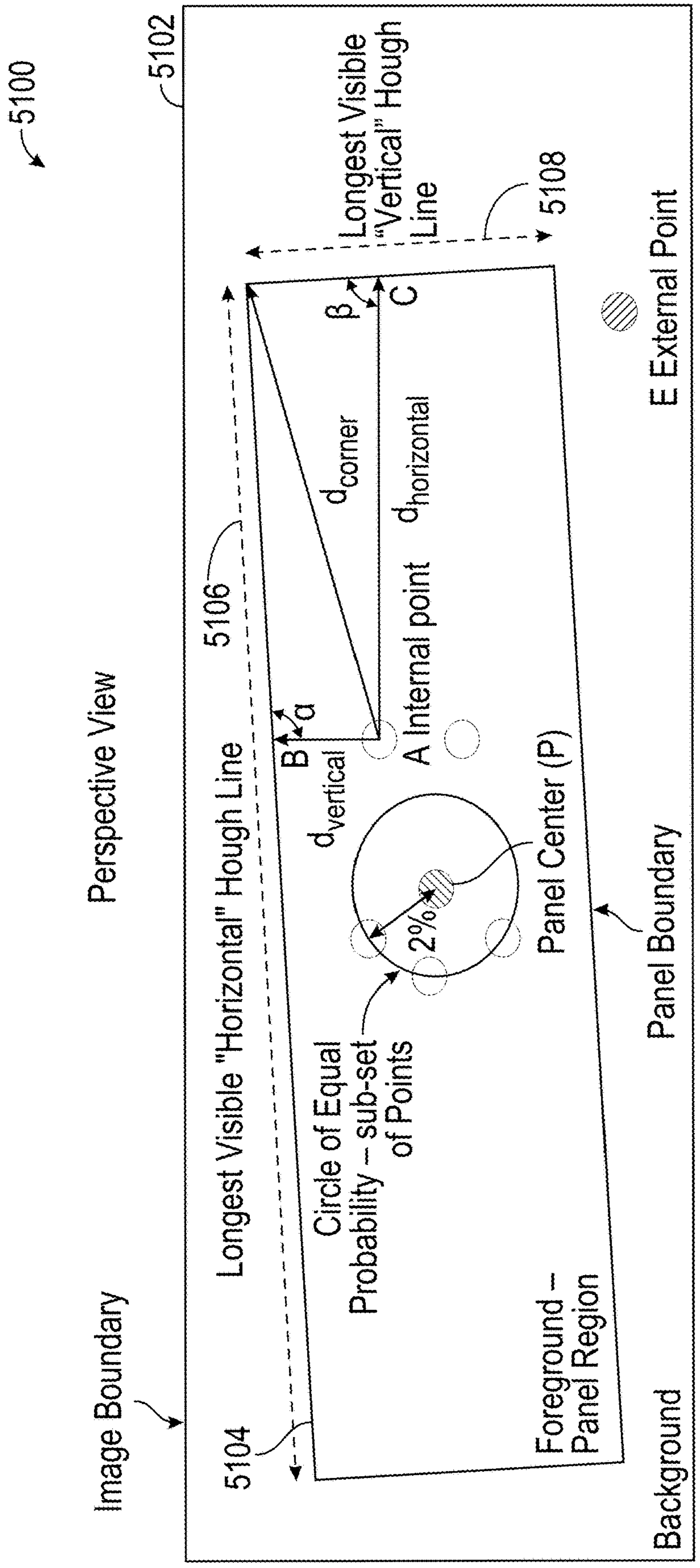
FIG. 51A is a schematic diagram of an example method for estimating center and corners of a solar panel, according to some embodiments.

FIG. 51A is a schematic diagram of an example method 5100 for estimating a center and corners of a solar panel, according to some embodiments. Center P of a panel 5104 and its corners may be estimated by distance simulation, geometric correction and/or angular adjustment. Straight lines within a panel can be identified, for example, by using Hough line or Hough transforms. Some embodiments identify and plot the longest visible horizontal and vertical Hough lines signifying edges of the panel. Longest visible lines are useful because the image 5102 may only be a partial image or the image may only cover a portion of the panel 5104. Some embodiments pick any point (e.g., point A which is an internal point or the external point E) randomly from the image (any point within the boundaries of the image 5102), and determine whether the point is internal or external to the panel. The image is a combination of a foreground and a background which corresponds to an environment of the solar panel, such as the support on which the solar panel sits. The image can be a top view, a ground profile, or a moving object; and any part of the image may be the background. If a ray that originates from the point intersects the longest visible lines in odd number of points, then the point is within the panel. If the ray intersects the longest visible lines in even number of points, then the point is outside the panel. If the point is internal to the panel, some embodiments calculate horizontal and vertical distance to the Hough line.

Referring to Figure MA, suppose point A is determined to be an internal point. Two normal lines AB and AC are dropped to the longest visible horizontal line 5106 and the longest visible vertical line 5108, respectively. The lines are not normal to the panel, meaning that α and β (angles) where the normal lines intersect the longest visible horizontal and vertical lines are where the angles subtended by the rays are not going to be 90 degrees. This is because these angles will be 90 degrees only if the panel was aligned with the image. This can happen if the longest visible horizontal line and the image boundary are parallel to each other. Since that is not the typical case, —a and β will assume values that are either less than or greater than 90 degrees. Some embodiments repeat these steps for all internal points to create a matrix.

Some embodiments identify a subset of points that satisfy the following properties: (a) horizontal distance ($d_{horizontal}$) greater than or equal to 45% (or the highest value) of panel width, which may be user input or width calculated earlier; and (b) vertical distance ($d_{vertical}$) greater than or equal to 45% (or the highest value) of panel height, which may be user input or height calculated earlier. This use of tolerance levels is important because the solar panels may be sourced from different vendors and the panel width is not a fixed number. The 45% value is used for illustration purposes, and other used-defined values can be used. Various embodiments may use different percentage values depending on tolerance for errors or need for accuracy.

Some embodiments calculate both horizontal angle (α) and vertical angle (β) of intersection from each qualifying point with the longest visible Hough lines. Some embodiments correct distances estimated with the calculated angles. Angles α and β may need to be normalized, meaning if the distances are evaluated as vertical or horizontal distance, the distances need a correction based on 90 minus α or 90 plus α and/or 90 minus β and 90 plus β. β equal to 0 would mean α equal to 90 degrees. So the α and β angles are used as guides.

Some embodiments isolate the subset of points that satisfy the following properties: (a) horizontal distance is greater than a predetermined percentage (e.g., 48%) or the highest value of panel width, and (b) vertical distance is greater than a predetermined percentage (e.g., 48%) or the highest value) of panel height. Point A will asymptotically approach panel center P when $d_{vertical}$ is approximately 50% of panel height, $d_{horizontal}$ is 50% of panel width, and/or α and β are each approximately 90 degrees. These are sometimes referred to as representative points. These points are closer to the center of the solar panel, correspond to the bubbles shown on the circle (circle of equal probability or CEP). These points are spread or distributed in a circular format. The points of interest for estimating the geometric center are (i) interior to the solar panel, (ii) proximate to the longest visible horizontal and vertical Hough lines, and (iii) form a near normal orientation with the longest visible horizontal and vertical Hough lines. 50% would mean center, so the points meeting at least 48% have a CEP error or circular error probability less than 2%. As long as the points evaluated satisfy the 48% distance condition, the points are within 2% of the geometric center, but the points are still a set of points. They are not one single point. Some embodiments determine the centroid of the set of points to identify the center of the panel. Some embodiments use Pythagoras' theorem to estimate the corner of the panel in both directions. Some embodiments correct the distance with the angles, to determine corners of the panel. The 48% value is used for illustration purposes, and other used-defined values can be used. Various embodiments may use different percentage values depending on tolerance for errors or need for accuracy.

The center of the panel can be used to control attaching devices, such as suction cups (e.g., 8 suction cups), on an upper robotic arm. The suction cups may be symmetrically distributed on the robotic arm. Centering the robotic arm on the solar panel avoids misalignment in picking the solar panel. If the solar panel does not get picked in the right orientation, meaning if the picking is creating a tilt, placing the panel takes a lot longer and then the panel has to be aligned next to a previously placed panel.

A goal may be to complete the picking process and placing process in under 60 seconds.

Some embodiments use CEP techniques to estimate the center based on proximity and perpendicularity and may not include all the steps described above. CEP is a circle but is not perfect geometry. Since points that form this circle are determined by simulation, they will form a theoretical circle, which can be visualized based on the best fit geometry. Hence, the center of the panel estimated will be the centroid of these points. CEP implies that some embodiments afford a predetermined percentage (e.g., 2%) deviation from the actual center. Perpendicularity is the condition that ensures that every candidate point used to form the CEP is near normal to the longest visible Hough lines, with glare corrected and/or symmetry used or energy line based on pixel created.

Some embodiments use Shi-Tomasi methods, and/or Harris method, for estimating center and/or corners of a solar panel.

Steps described above for center and/or corner estimation may be used for a stationary panel, a picked panel and/or a previously placed panel.

A next step is to place the picked panel. Panel placement energy and proximity balances the picked panel and a previously placed panel. In some embodiments, images are captured in perspective. Some embodiments compare the fixed panel and the moving panel dynamically (e.g., when the picked panel is moving in the air). Different elevations between the picked panel and the placed panel (the reference) creates a potential. In some embodiments, placement is completed when 6 degrees of freedom (3 rotational and 3 translational) are aligned for the two panels.

Figure 52:
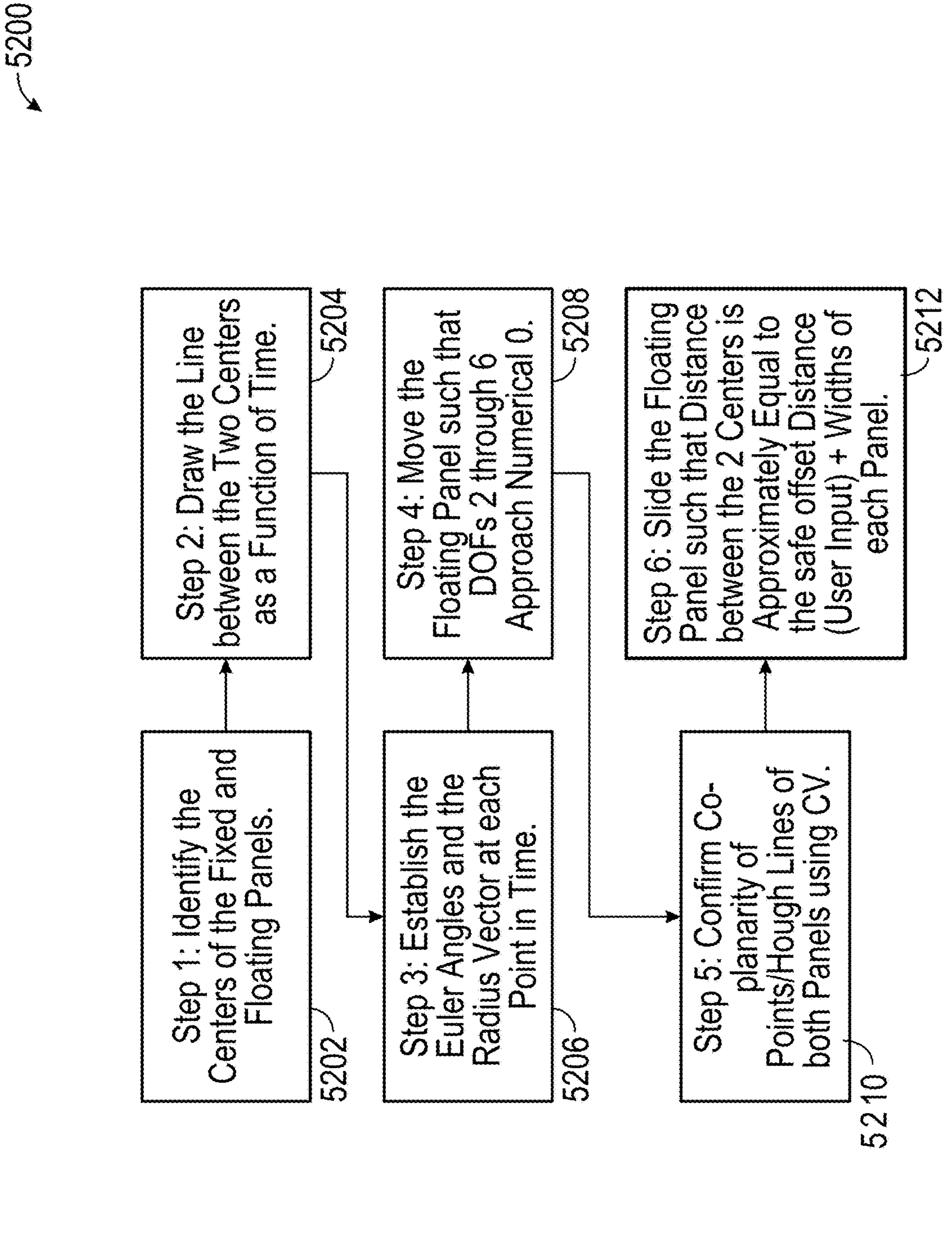
FIG. 52 shows an example process for placement of a solar panel, according to some embodiments.

FIG. 52 shows an example process 5200 for placement of a solar panel, according to some embodiments. Some embodiments calculate (5202) centers of a fixed panel and a floating panel. Some embodiments draw (5204) a line between the two centers as a function of time. Some embodiments establish (5206) Euler angles and radius vector at different points in time. Some embodiments move (5208) (or cause a robotic arm to move) the floating panel such that degrees of freedom two through six approach a numerical value of 0. Some embodiments confirm (5210) co-planarity of points or Hough lines of both panels using computer vision. Some embodiments slide (5212) (or cause the robotic arm to slide) the floating panel such that distance between the two centers is approximately equal to a safe offset distance (which may be a user input or predetermined) plus widths of each panel (which may be precalculated or user input).

Figure 53:
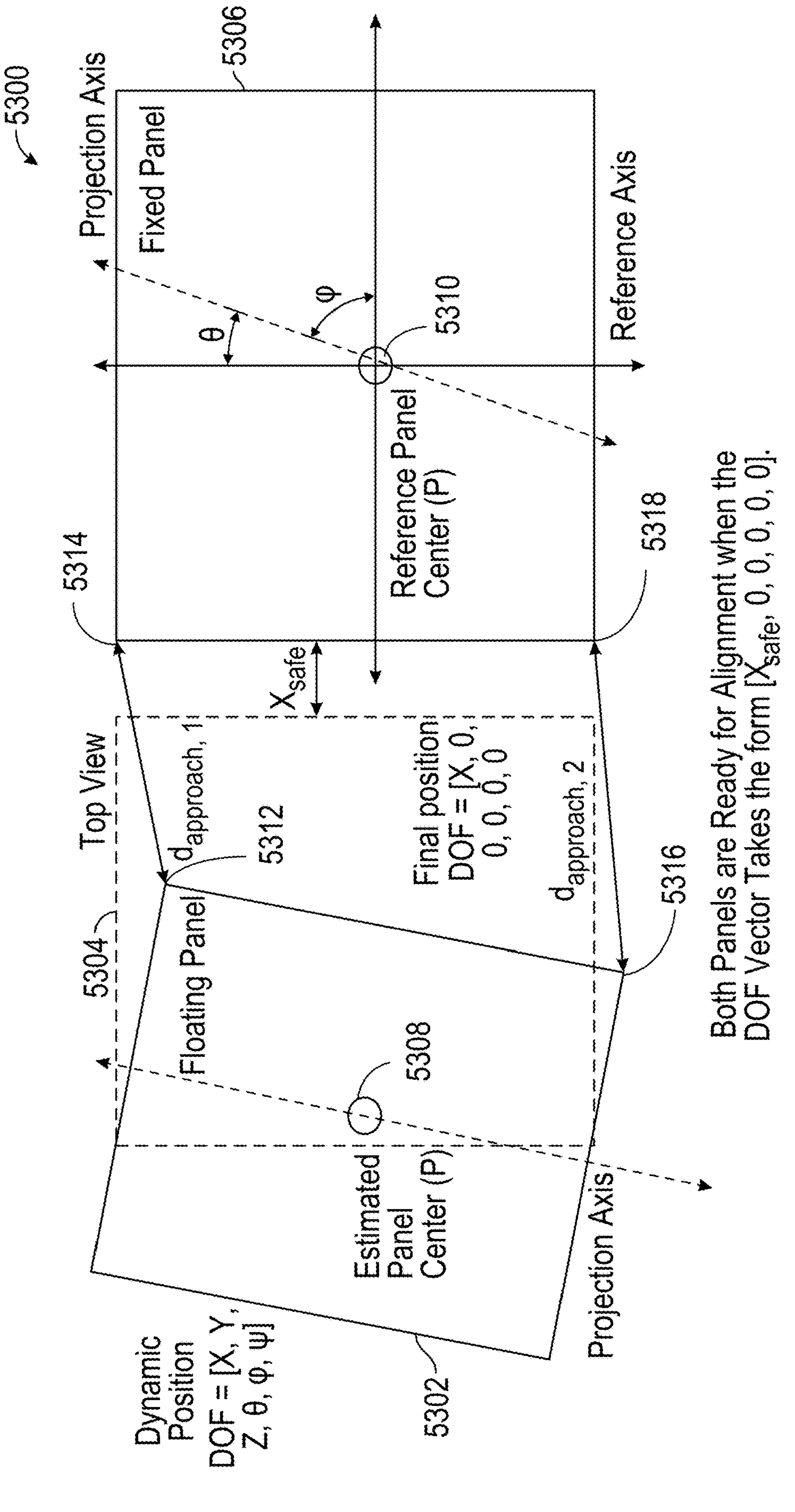
FIG. 53 is a schematic diagram of an example placement of a solar panel, according to some embodiments.

FIG. 53 is a schematic diagram of an example placement 53 of a solar panel, according to some embodiments. When a panel 5302 is picked, the panel is floating in air in six degrees of freedom (three rotational and three translational). The panel may be tilted, angled, and/or skewed with respect to a placed panel 5306 (sometimes referred to as a fixed panel). Whatever may be the position and/or orientation of the picked panel in relation to the placed panel, the picked panel has six degrees of separation, meaning three distances and/or three angles may be different. A goal is to align the panels, so the upper robotic arm needs to place the picked panel in such a way that its longest edge and the longest edge of the placed panel are aligned or flush with each other. Based on the placement orientation, the upper robotic arm may place the picked panel such that its shortest edge and the shortest edge of the placed panel are aligned or flush with each other. So a robotic arm may initially place the floating panel at an angle (e.g., angled relative to a plane in which it will be finally installed). After the edges are aligned, the robotic arm may tilt the floating panel to make it parallel to the ground and/or the placed panel. Some embodiments may use the algorithm described above in reference to FIG. 52.

Referring to FIG. 53, a panel center 5308 is estimated for the picked panel 5320. A panel center 5310 for the placed panel 5306 may be predetermined or estimated similarly (e.g., similar to how the center is estimated for the floating panel, for pick and place). FIG. 53 corresponds to a top view of the two panels. The dynamic position degrees of freedom (DOF) for the picked panel with respect to the placed panel is indicated by [X, Y, Z, θ, φ, ψ]. Θ and φ are shown with respect to a reference axes for the fixed panel 5306. Ψ is not shown because this is the top view. "Distance dapproach,1" corresponds to the distance from the top right corner 5312 of the picked panel 5302 to the top left corner 5314 of the fixed panel 5306. "Distance dapproach,2" corresponds to the distance from the bottom right corner 5316 of the picked panel 5302 to the bottom left corner 5318 of the fixed panel 5306. A goal is to move the floating panel to the dashed position 5304 (referred to as a final position with DOF [X, 0, 0, 0, 0, 0]. The panels are ready for alignment when the DOF vector takes the form [Xsafe, 0, 0, 0, 0, 0]. This happens when dapproach, 1 and dapproach, 2 reach Xsafe. The Xsafe distance may account for clamp thickness. The other degrees of freedom are 0. The projection axis and the reference axis are aligned. The example is shown for illustration purposes. Other initial configurations and procedures for placement and/or alignment are possible. For example, vectors but for the Y or Z axis may be caused to go towards zero, and/or the solar panel may be moved in other directions, with a goal of aligning all vectors except for one of the degrees of freedom when it becomes safe to align the panels.

Figure 54:
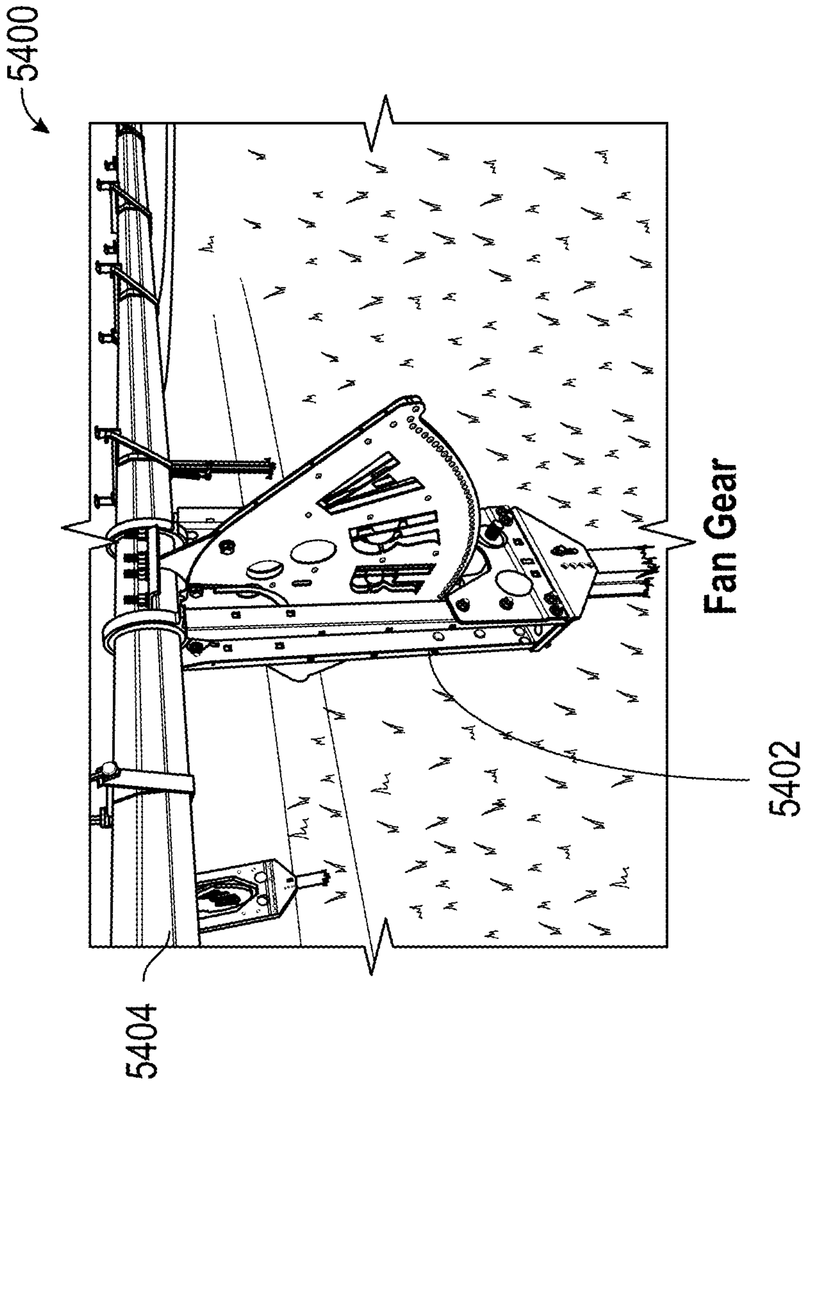
FIG. 54 shows an example solar panel installation infrastructure with a fan gear attached to a torque tube 5404, according to some embodiments.
Figure 55A:
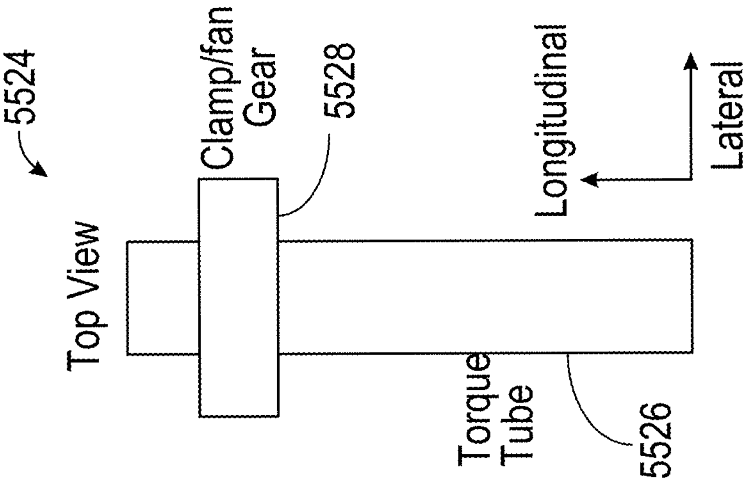
FIG. 55A shows a top view of an example solar panel installation infrastructure with a torque tube and a clamp or fan gear, according to some embodiments.

Some embodiments detect structures, e.g., clamp location and/or fan gear location, to assist an operator with clamp movement and/or in safe placement of a solar panel. FIG. 54 shows an example solar panel installation infrastructure 5400 with a fan gear 5402 attached to a torque tube 5404, according to some embodiments. FIG. 55A shows a top view of an example solar panel installation infrastructure 5524 with a torque tube 5526 and a clamp or fan gear 5528, according to some embodiments.

Figure 55B:
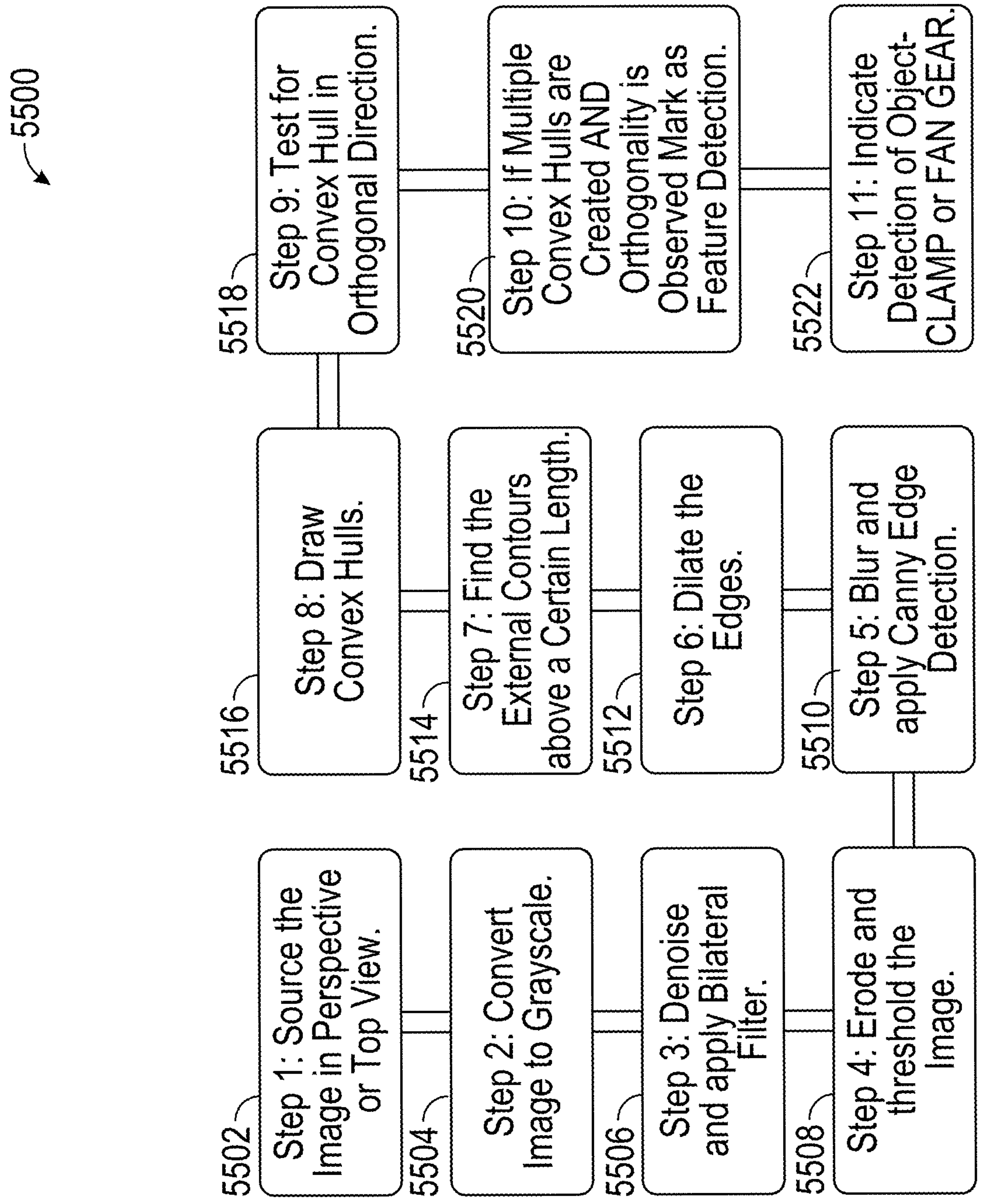
FIG. 55B shows an example process for clamp and fan fear detection, according to some embodiments.

FIG. 55B shows an example process 5500 for clamp and fan fear detection, according to some embodiments. Some embodiments obtain (5502) an image in perspective view or top view (an example of which is shown in FIG. 55A), convert (5504) the image to grayscale, denoise and apply (5506) bilateral filter to the grayscale image, erode and threshold (5508) the image, blur and apply (5516) canny edge detection, dilate (5514) the edges, find (5514) external contours above a certain length (e.g., a length based on the geometry of the panel with at least 50% of width and length as a reference), and/or draw (5516) convex hulls. Some embodiments test (5518) for convex hull in an orthogonal direction. If multiple convex hulls are created and orthogonality is observed, some embodiments mark (5520) feature detection. Some embodiments indicate (5522) detection of objects, such as, e.g., clamp or fan gear.

Figure 56:
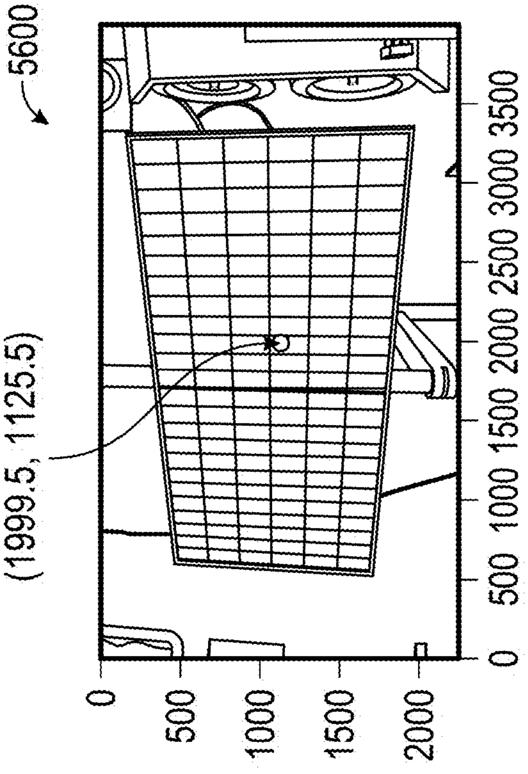
FIG. 56 shows an example application of a center of mass method to estimate center of a solar panel, according to some embodiments.

FIG. 56 shows an example application 500 of a center of mass method to estimate a center of a solar panel, according to some embodiments. An image of a panel is obtained, converted to pixel coordinates, and density of pixels is calculated from X and Y perspectives. Given the density of those pixels, the center or the relative center may be estimated. Because the center of mass always points to the center of the image, the method picks up a point that is clearly the center of the image, but may not be the center of the panel. This is because the image capture may not be symmetric, for example, the panel is skewed. In some instances, there is a different pose and the system may see a perspective like the one shown in FIG. 56, meaning that the nearer edge of the panel seems longer while a farther edge of the panel seems shorter. This is indicative of a perspective view (so the image may be skewed on the torque tube). In such a case, an estimated center (the coordinate (1999.5, 1125.5) in this example) has an offset from true geometric center. This provides an incorrect estimate but the offset created is known. Once the system detects perspective, the system knows the angle is skewed meaning the estimate of the center cannot be the true center. Or the geometric center of the panel and the image center are not aligned. However, for accurate picking and placement, the system needs to know the geometric center of the panel. Therefore, when the panel angle is skewed, straightening and pose correction are applied. Also, background is suppressed. These images and poses can be in multiple directions in six degrees of freedom (three rotation and three translation), and either the background has to be suppressed so that the background does not contribute towards the center of mass, or the system has to compensate for the background and make an adjustment independent of the background.

The algorithms described above for picking, placement, and detection of structures, e.g., the clamp and fan gear, are independent of each other. Various embodiments use one or more of the algorithms or combinations thereof for solar panel installations. Some embodiments combine one or more of these methods with conventional methods for solar panel installation.

The techniques described herein have several advantages over conventional techniques. For example, systems and methods according to the techniques described herein obtain a recommendation for pick and place using non-synthetic imaging schema and hence provide scalability to any terrain and conditions. Closed-loop feedback helps auto-correct and improve the estimation process. The simulation procedure is condition independent. Some embodiments take into account optical and geometric properties to accommodate variations in environment and manufacturer specifications. Some embodiments use pixel energy and pixel color density components during the estimation process.

Example Methods for Autonomous Solar Installation

Figure 57:
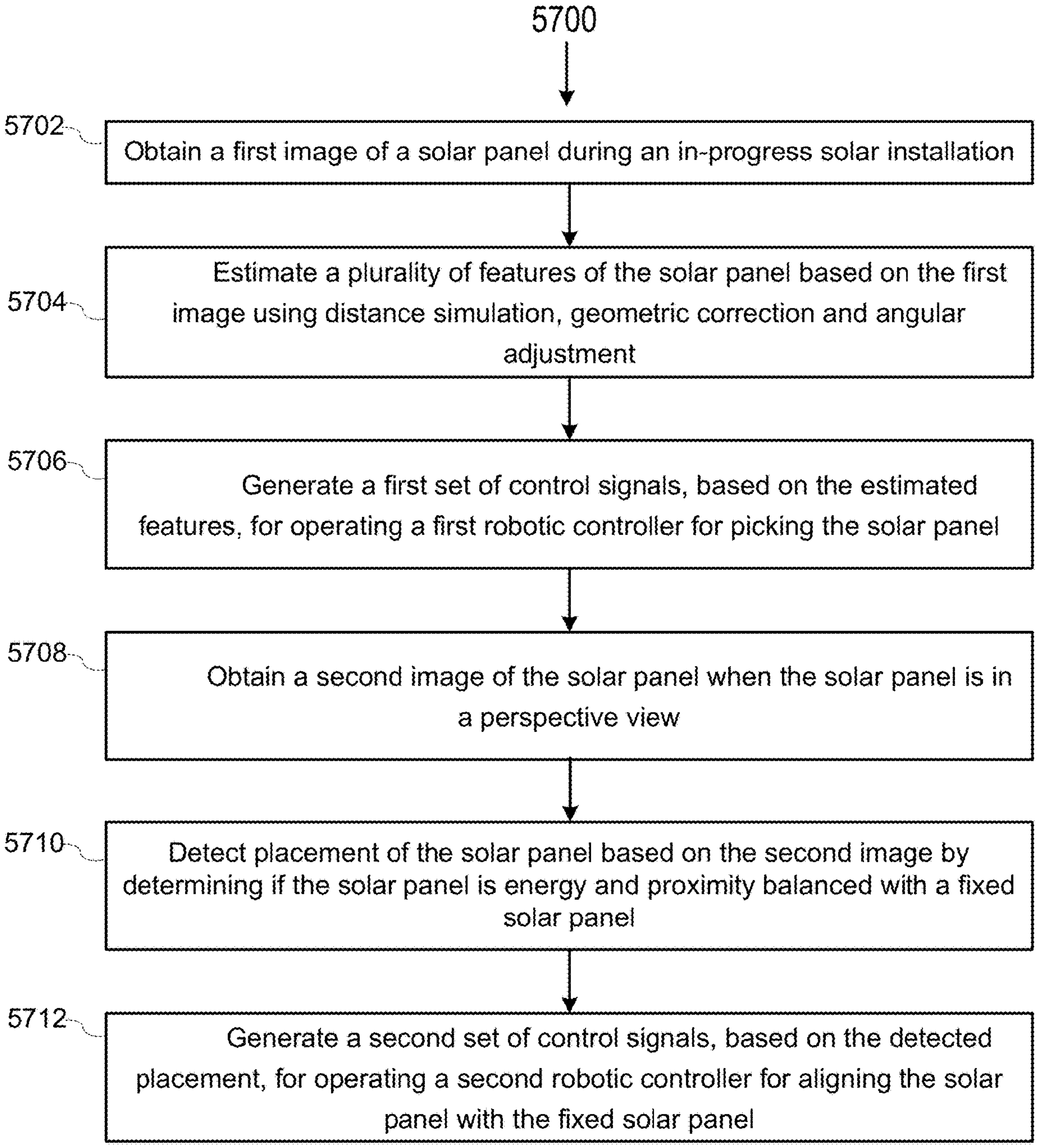
FIG. 57 is a flowchart of an example method for autonomous solar installation, according to some embodiments.

FIG. 57 is a flowchart of an example method 5700 for autonomous solar installation, according to some embodiments. The method includes obtaining (5702) a first image of a solar panel (e.g., a solar panel 4414 held in the cradle 4410) during an in-progress solar installation. Example systems and methods for obtaining images and/or image processing are described above in reference to FIG. 40, according to some embodiments. In some embodiments, the solar panel includes a reflective material that causes the solar panel to reflect sunlight, and images of the solar panel may include dark white spots due to such reflection. In some embodiments, the first image includes a view of the solar panel and background, an example of which is described above in reference to FIG. 51A. The center of mass method described above in reference to FIG. 56 may not be used to calculate the center of the solar panel in such cases, because the center of mass method assumes equal importance to all pixels and thus causes distortion. A simulation approach, such as the method 5700, may be used.

The method also includes estimating (5704) a plurality of features of the solar panel based on the first image using distance simulation, geometric correction and angular adjustment. In some embodiments, the plurality of features include interior points, center, corners and/or edges of the solar panel. In some embodiments, an initial set of features may be estimated, and the other features may be calculated based on the estimation.

In some embodiments, estimating the plurality of features of the solar panel further includes, in accordance with a determination that a panel identifier, such as a bar code label, is visible in the first image, detecting a location of the panel identifier; and using the location to estimate the plurality of features of the solar panel. For example, the panel identifier may be placed on the rim of the solar panel at one of the edges. In some instances, a panel identifier like a bar code can be detected based on cluster of Hough lines. If the density of vertical Hough lines in an area is high, it represents existence of the bar code.

In some embodiments, estimating the plurality of features of the solar panel includes: identifying and plotting (e.g., drawing of the Hough line on the detected edge boundary), based on the first image, a longest visible horizontal line and a longest visible vertical line signifying edges of the solar panel; for each point in the first image that is internal to the solar panel in the first image, calculating horizontal and vertical distance from the respective point to the longest visible horizontal line and the longest visible vertical line, respectively; and identifying, based on the calculated horizontal and vertical distances, a subset of points for which: (i) horizontal distance is greater than a first predetermined percentage (e.g., 45%, or the highest value) of width of the solar panel, and (ii) vertical distance is greater than a second predetermined percentage (e.g., 45% or the highest value) of height of the solar panel; calculating horizontal angles of intersection and vertical angles of intersection from each point in the subset of points with the longest visible horizontal line and the longest visible vertical line, respectively; correcting the calculated horizontal and vertical distances based on the calculated horizontal angles of intersection and vertical angles of intersection, to obtain corrected horizontal and vertical distances (range is the difference between orthogonality and the calculated angle); identifying, based on the corrected horizontal and vertical distances, a candidate set of points for which: (i) horizontal distance is greater than a first predetermined percentage (e.g., 48%, or the highest value) of width of the solar panel, and (ii) vertical distance is greater than a second predetermined percentage (e.g., 48% or the highest value) of height of the solar panel; computing a centroid of the candidate set of points to obtain a center of the solar panel; estimating candidate corners of the solar panel using Pythagorean theorem based on the centroid and the candidate set of points; and correcting a distance for the candidate corners based on the calculated horizontal and vertical angles of intersection to obtain final corners of the solar panel. Examples of these steps are described above in reference to FIG. 51A.

In some embodiments, the identifying and plotting are performed using Hough transform. Longest visible horizontal line and a longest visible vertical line are Hough lines. Hough lines are good indicators for geometric feature detection. Both standard and probabilistic Hough procedures may be used in estimation. Parameters for these methods can be modified for the particular application. Hough lines are used to detect straight lines in an image. Straight lines can be defined mathematically via (i) a slope and offset, (ii) angle and radius, and (iii) extreme points (e.g., beginning and end coordinates of the line segment). In the standard formulation of Hough transform, angle and radius vector are estimated as parameters in the polar coordinate system; this generates two degrees of freedom that are modifiable. In the probabilistic formulation of Hough transform, coordinates of the end points are estimated as parameters in the cartesian coordinate system; this generates four degrees of freedom that are modifiable. Other techniques to detect straight lines can be used in place of Hough transform techniques.

In some embodiments, the method further includes determining if a point is internal to the solar panel by determining if a ray that originates from the point intersects the longest visible horizontal line and the longest visible vertical line in odd number of points.

Figure 51B:
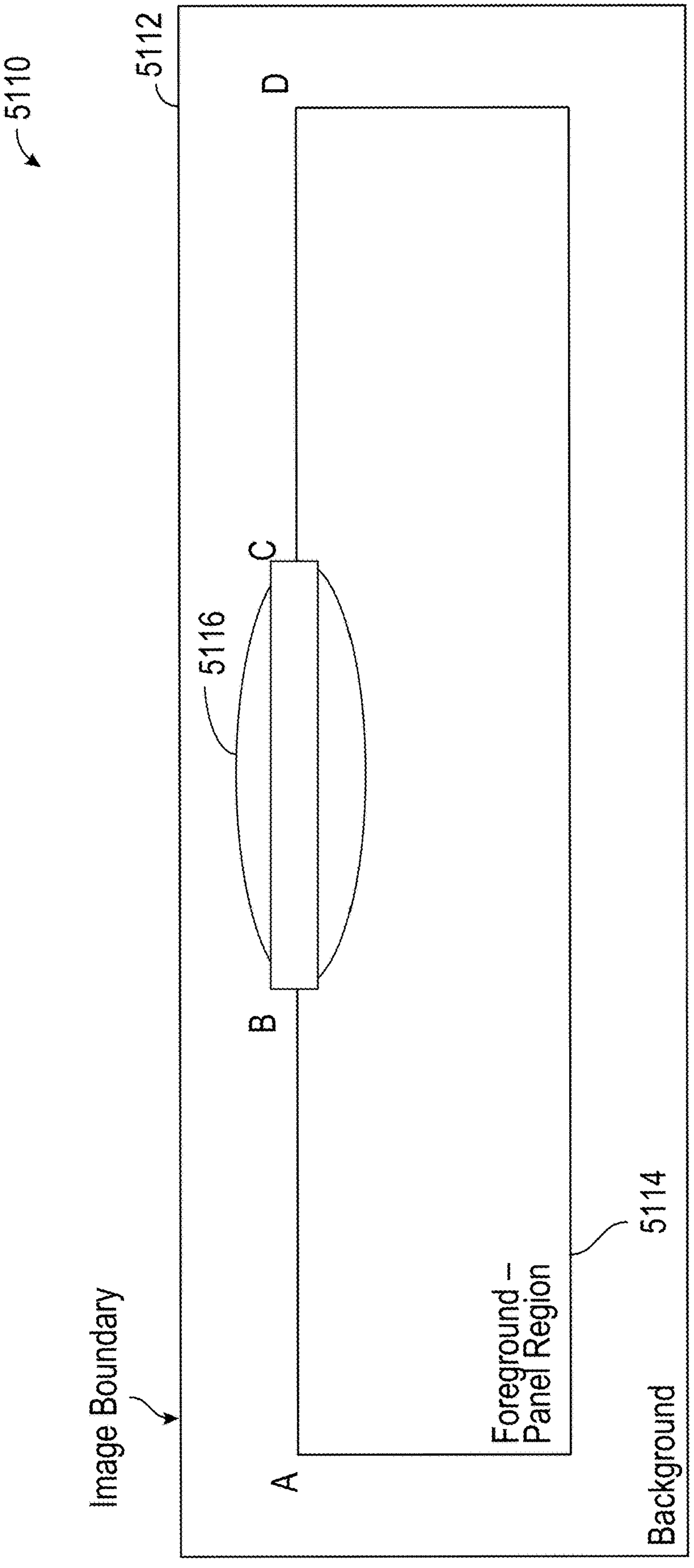
FIG. 51B is a schematic diagram of an example method for Hough line estimation when glare (or other optical phenomena) are present, according to some embodiments.

In some embodiments, the method further includes: prior to estimating the plurality of areas/features of the solar panel: extracting the sun's relative position in the sky using, for example, solar physics, the sun's elevation and/or azimuth; estimating a glare based on the estimation of the sun's position; and using noise cancellation and image correction algorithm to false color the glare. Glare is characterized by existence of high density white pixels in the image, which would be the noise in this particular application. Noise cancellation would thus mean, removing this cluster of white pixels with the color of the panel. Some embodiments use filtering techniques, such as Gaussian or wavelet or Kalman or false coloring for this purpose. FIG. 51B is a schematic diagram of an example method 5110 for Hough line estimation with glare, according to some embodiments. The image boundary is indicated by label 5112 and the panel boundary is indicated by label 5114. The edge between the corners A and D (line AD) shows a glare 5116. If Hough line detection is not possible or incorrect, as is the case in this example, an energy balance line BC is drawn as a representation of the Hough line. The energy balance line is the locus of all pixels in a particular direction that share roughly the same energy value. If the sun's elevation and azimuth on a particular day signifies glare formation, then these steps are performed. The energy balance line (sometimes referred to as the energy line) is the locus of points along the direction of the Hough line or panel width/length where pixels share near identical energy value. Some embodiments monitor two conditions: (i) energy values of pixels must be relatively close to each other (e.g., within 2%); and (ii) pixel centers must be directionally colinear. The start and end of the energy line are critical. Some embodiments monitor the drop (e.g., a step change, such as greater than a 10% change) in energy levels between neighboring pixels. When such a drop occurs and the pixels are colinear, then it is safe to conclude that glare is no longer present. In complementing visible Hough line with the energy line, pixel intensity captured via the energy, drop in such energy and/or collinearity, may be used to establish the line.

In some embodiments, the method further includes: prior to estimating the plurality of areas/features of the solar panel: using image masking and segmentation or filtering or image correction techniques to remove sun's glare on the solar panel. Example methods for masking and/or segmentation are described above in reference to FIGS. 36, 38, 43, and 50.

Referring back to FIG. 57, the method also includes generating (5706) a first set of control signals, based on the estimated features, for operating a first robotic controller for picking the solar panel. In some embodiments, the first set of control signals further causes the first robotic controller to move the picked solar panel towards the fixed solar panel.

The method also includes obtaining (5708) a second image of the solar panel when the solar panel is in a perspective view. An example of a perspective view is described above in reference to FIG. 56.

The method also includes detecting placement (5710) of the solar panel based on the second image by determining if the solar panel is co-planar with and at a predetermined offset from a fixed solar panel. In some embodiments, the solar panel and the fixed solar panel are substantially rectangular in shape. In some embodiments, the solar panel and the fixed solar panel are substantially similar in shape. In some embodiments, the picked solar panel and the fixed solar panel are substantially similar in shape along only one side, and the system may use symmetry for the calculations and/or estimations described herein. For example, when glare is not present along the longest visible Hough line, symmetry allows to scale because of the panel geometry being regular. The solar panel is rectangular and hence distance and angle measurements are always known for the non-visible side. However, when glare partially or totally covers the longest "visible" Hough line, then an energy line is drawn to complement the geometry line to estimate the length of the longest Hough line.

In some embodiments, detecting the placement of the solar panel includes obtaining a third image of the fixed solar panel when the fixed solar panel is in a perspective view. For example, when the near edge appears longer than the farther edge, the image is in perspective view. Some embodiments record images continuously. In some embodiments, detecting the placement of the solar panel also includes identifying two centers including (i) a center of the solar panel when the solar panel is floating based on the second image and (ii) a center of the fixed solar panel based on the third image. In some embodiments, detecting the placement of the solar panel also includes drawing a line between the two centers as a function of time; establishing Euler angles and radius vector at different points in time (e.g., at each point in time). In some embodiments, detecting the placement of the solar panel also includes generating one or more control signals, for operating the first robotic controller, to move the solar panel such that 5 degrees of freedom (in relation to the fixed solar panel) approach a numerical value of 0. In some embodiments, detecting the placement of the solar panel also includes confirming coplanarity of points and Hough lines of the solar panel and the fixed solar panel, using computer vision (e.g., using edge detection, interest point detection, contour mapping, bounding-box method). Examples of these steps are described above in reference to FIGS. 52 and 53.

The method also includes generating (5712) a second set of control signals, based on the detected placement, for operating a second robotic controller for aligning the solar panel with the fixed solar panel. In some embodiments, generating the second set of control signals includes generating control signals to slide the solar panel when the solar panel is floating such that distance between the two centers is approximately equal to a predetermined safe offset distance plus widths of each panel. The second robotic controller and the first robotic controller may be different controllers or same controllers. The controllers may control the upper robotic arm and/or the lower robotic arm, in various embodiments. In some embodiments, generating the second set of control signals includes generating control signals for securing the solar panel (e.g., by positioning and tightening the clamp).

In some embodiments, the method further includes detecting a supporting mechanical equipment. This may include obtaining a fourth image of the solar panel in a second perspective view or in a top view. This could be a different perspective view from the other perspective view described earlier in reference to step 5708. In some embodiments, detecting the supporting mechanical equipment includes converting the fourth image to grayscale to obtain a grayscale image; denoising and applying a bilateral filter to the grayscale image to obtain a processed image. In some embodiments, detecting the supporting mechanical equipment includes eroding and thresholding the processed image to obtain a candidate image; drawing convex hulls for the candidate image. In some embodiments, detecting the supporting mechanical equipment includes determining external contours above a predetermined length based on the convex hulls; dilating edges for the candidate image. In some embodiments, detecting the supporting mechanical equipment includes blurring and applying Canny edge detection for the candidate image; testing for convex hull in orthogonal direction. In some embodiments, detecting the supporting mechanical equipment includes, in accordance with a determination that multiple convex hulls are created and orthogonality is observed, detecting a supporting mechanical equipment. These steps may generally include image processing, image preparation, and/or image conditioning. Examples of these steps are described above in reference to FIGS. 54 and 55.

In some embodiments, the supporting mechanical equipment includes a clamp (sometimes referred to as a clamp assembly, e.g., the clamp assembly 602, FIGS. 6A, 6B) or a fan gear (e.g., the fan gear 5402), although other supporting mechanical equipment is contemplated, such as ground posts, electrical boxes and electrical connections. In some embodiments, the supporting mechanical equipment is a clamp, and the method further includes detecting a location of a clamp, and assisting an operator with movement of the clamp, based on the detected placement of the solar panel, in order to protect the solar panel from impact with the clamp. For example, a notification/alert is provided to the operator (e.g., via an alarm). Operation is suspended when clamp is detected. In some embodiments, the supporting equipment is a fan gear, and the method further includes detecting a location of a fan gear; and assisting an operator with safe placement of the solar panel, based on the detected placement of the solar panel, in order to guard the solar panel from collision. Examples of these steps are described above in reference to FIGS. 54 and 55.

In some embodiments, determining if the solar panel is co-planar with and at a predetermined offset from the fixed solar panel includes determining if (i) the solar panel is on a same plane as a fixed solar panel and (ii) the solar panel and the fixed panel are near flush in a lateral direction.

Figure 58:
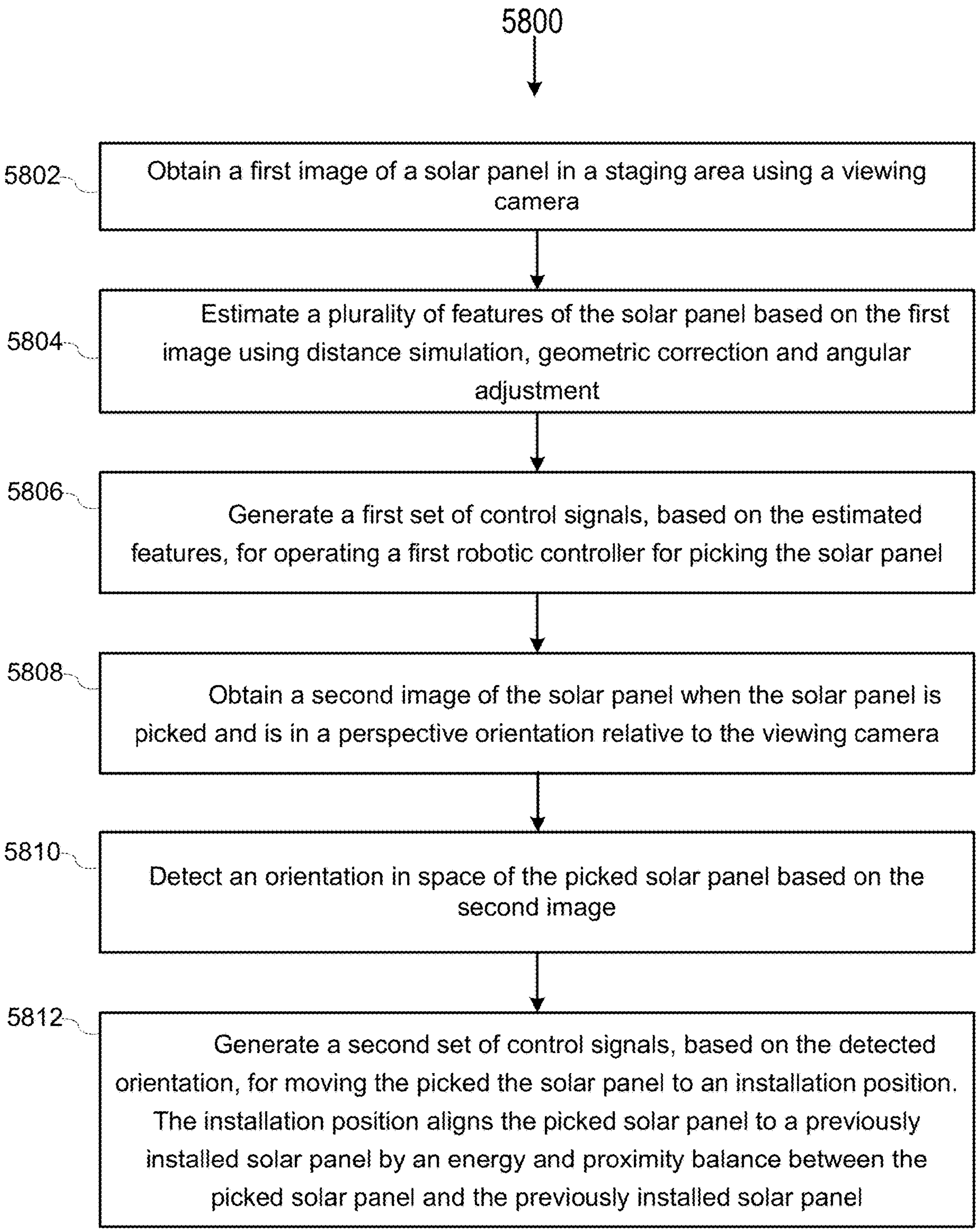
FIG. 58 is a flowchart of another example method for autonomous solar installation, according to some embodiments.

FIG. 58 is a flowchart of another example method 5800 for autonomous solar installation, according to some embodiments. The method includes obtaining (5802) a first image of a solar panel (e.g., the solar panel 4414) in a staging area (e.g., the cradle 4410) using a viewing camera (e.g., a camera positioned in an upper robot). The solar panel may be approximately perpendicular or normal to the viewing camera, the ground, and/or the staging area. The viewing camera can be visual and/or IR camera. Example systems and methods for obtaining images and/or image processing are described above in reference to FIG. 40, according to some embodiments. The method also includes estimating (5804) a plurality of areas/features of the solar panel based on the first image using at least one or distance simulation, geometric correction and angular adjustment. Examples of these steps are described above in reference to FIG. 51A, according to some embodiments. The method also includes generating (5806) a first set of control signals for operating a first robotic controller for picking the solar panel. The first set of control signals are based on one or more of the estimated plurality of areas/features. The method also includes obtaining (5808) a second image of the solar panel when the solar panel is picked and is in a perspective orientation relative to the viewing camera. The method also includes detecting (5810) an orientation in space of the picked solar panel based on the second image. The method also includes generating (5812) a second set of control signals, based on the detected orientation, for moving the picked the solar panel to an installation position. The installation position aligns the picked solar panel to a previously installed solar panel by determining if the picked solar panel is co-planar with and at a predetermined offset from the previously installed solar panel. Examples of these steps are described above in reference to FIGS. 52 53, and 57.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It will be apparent to those skilled in the art that various modifications and variations can be made in the system for installing a solar panel of the present invention without departing from the spirit or scope of the invention. Thus, it is intended that the present invention cover the modifications and variations of this invention provided they come within the scope of the appended claims and their equivalents. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for an at least partly autonomous solar panel installation, the method comprising:
- obtaining a first image of a solar panel for the solar panel installation;
- estimating a plurality of features or areas of the solar panel based on the first image;
- generating a first set of control signals, based on the plurality of features or areas that are estimated, for operating at least one robotic controller for picking the solar panel;
- iteratively performing the following in order to place or position the solar panel at a predetermined offset to a fixed solar panel:
  - obtaining a respective image of the solar panel relative to the fixed solar panel;
  - determining, based on the respective image, respective control signals for moving the solar panel closer toward the fixed solar panel;
  - operating, using the respective control signals, the at least one robotic controller to move the solar panel closer toward the fixed solar panel; and
  - responsive to determining the solar panel is not at the predetermined offset to the fixed solar panel, iterating again.

2. The method of claim 1, wherein estimating the plurality of features or areas of the solar panel comprises:
- identifying and plotting, based on the first image, a longest visible horizontal line and a longest visible vertical line signifying edges of the solar panel;
- for each point in the first image that is internal to the solar panel in the first image, calculating horizontal and vertical distance from a respective point to the longest visible horizontal line and the longest visible vertical line, respectively; and
- identifying, based on the calculated horizontal and vertical distances, a subset of points for which: (i) horizontal distance is greater than a first predetermined percentage of width of the solar panel, and (ii) vertical distance is greater than a second predetermined percentage of height of the solar panel;
- calculating horizontal angles of intersection and vertical angles of intersection from each point in the subset of points with the longest visible horizontal line and the longest visible vertical line, respectively;
- correcting the calculated horizontal and vertical distances based on the calculated horizontal angles of intersection and vertical angles of intersection, to obtain corrected horizontal and vertical distances;
- identifying, based on the corrected horizontal and vertical distances, a candidate set of points for which: (i) horizontal distance is greater than a first predetermined percentage of width of the solar panel, and (ii) vertical distance is greater than a second predetermined percentage of height of the solar panel;
- computing a centroid of the candidate set of points to obtain a center of the solar panel;
- estimating candidate corners of the solar panel using Pythagorean theorem based on the centroid and the candidate set of points; and
- correcting a distance for the candidate corners based on the calculated horizontal and vertical angles of intersection to obtain final corners of the solar panel.

3. The method of claim 2, wherein the identifying and plotting are performed using Hough transform.

4. The method of claim 2, further comprising:
- determining if a point is internal to the solar panel by determining if a ray that originates from the point intersects the longest visible horizontal line and the longest visible vertical line in odd number of points.

5. The method of claim 1, wherein the respective image comprises a second image;
- further comprising detecting placement of the solar panel onto installation hardware by:
- obtaining a third image of the fixed solar panel on the installation hardware when the fixed solar panel is in a perspective view;
- identifying two centers including (i) a center of the solar panel when the solar panel is floating based on the second image and (ii) a center of the fixed solar panel based on the third image;
- drawing a line between the two centers as a function of time;
- establishing Euler angles and radius vector at each point in time;
- generating one or more control signals, for operating the at least one robotic controller, to move the solar panel such that 5 degrees of freedom approach a numerical value of 0; and
- confirming coplanarity of points and Hough lines of the solar panel and the fixed solar panel, using computer vision.

6. The method of claim 1, further comprising detecting supporting mechanical equipment by:
- obtaining at least one image of the solar panel in a second perspective view or in a top view;
- converting the at least one image to grayscale to obtain a grayscale image;
- denoising and applying a bilateral filter to the grayscale image to obtain a processed image;
- eroding and thresholding the processed image to obtain a candidate image;
- drawing convex hulls for the candidate image;
- determining external contours above a predetermined length based on the convex hulls;
- dilating edges for the candidate image;
- blurring and applying Canny edge detection for the candidate image;
- testing for convex hull in orthogonal direction; and
- in accordance with a determination that multiple convex hulls are created and orthogonality is observed, detecting the supporting mechanical equipment.

7. The method of claim 6, wherein the supporting mechanical equipment is a clamp, and wherein the method further comprises:

detecting a location of a clamp; and assisting an operator with movement of the clamp, based on a detected placement of the solar panel, in order to protect the solar panel from impact with the clamp.

8. The method of claim 1, further comprising:

prior to estimating the plurality of features or areas of the solar panel:

extracting sun's relative position in a sky using solar physics, sun's elevation, and azimuth;

estimating a glare based on the estimation of the sun's relative position; and using high fidelity noise cancellation and image correction algorithm to false color the glare.

9. A method for an at least partly autonomous solar panel installation, the method comprising:

obtaining at least one image of a solar panel for the solar panel installation;

prior to estimating a plurality of areas or features of the solar panel and for at least partial correction of the at least one image due to environment interference on the solar panel, using image masking and segmentation or filtering or image correction techniques for the at least partial correction due to the environment interference on the solar panel;

estimating the plurality of areas or features of the solar panel based on the at least one image;

generating control signals, based on the plurality of areas or features, for operating at least one robotic controller for performing one or both of:

automatically picking the solar panel; or automatically placing the solar panel relative to a fixed solar panel that is fixed to installation hardware.

10. The method of claim 4, wherein the respective image comprises a second image;

further comprising detecting placement of the solar panel onto installation hardware by:

obtaining a third image of the fixed solar panel when the fixed solar panel is in a perspective view;

identifying two centers including (i) a center of the solar panel when the solar panel is floating based on the second image and (ii) a center of the fixed solar panel based on the third image;

drawing a line between the two centers as a function of time;

establishing Euler angles and radius vector at each point in time;

generating one or more control signals, for operating the at least one robotic controller, to move the solar panel such that 5 degrees of freedom approach a numerical value of 0; and confirming coplanarity of points and Hough lines of the solar panel and the fixed solar panel, using computer vision, wherein generating the one or more control signals comprises:

generating control signals to slide the solar panel when the solar panel is floating such that distance between the two centers is approximately equal to a predetermined safe offset distance plus widths of each panel, wherein the method further comprises:

obtaining a fourth image of the solar panel in a second perspective view or in a top view;

converting the fourth image to grayscale to obtain a grayscale image;

denoising and applying a bilateral filter to the grayscale image to obtain a processed image;

eroding and thresholding the processed image to obtain a candidate image;

drawing convex hulls for the candidate image;

determining external contours above a predetermined length based on the convex hulls;

dilating edges for the candidate image;

blurring and applying Canny edge detection for the candidate image;

testing for convex hull in orthogonal direction; and in accordance with a determination that multiple convex hulls are created and orthogonality is observed, detecting a supporting mechanical equipment, and wherein the method further comprises:

prior to estimating the plurality of features or areas of the solar panel:

extracting sun's relative position in a sky using solar physics, sun's elevation, and azimuth;

estimating a glare based on the estimation of the sun's relative position; and using high fidelity noise cancellation and image correction algorithm to false color the glare.

11. The method of claim 1, wherein the iteratively performing is iteratively performed as the solar panel is moving in air toward to the fixed solar panel.

12. The method of claim 11, wherein the fixed solar panel is placed on installation hardware; and wherein the iteratively performing is further iteratively performed after the solar panel is placed on the installation hardware.

13. The method of claim 12, wherein the solar panel is first placed on the installation hardware at an angle with the fixed solar panel so that at least two edges of the solar panel are aligned with the fixed solar panel; and wherein after first placing the solar panel on the installation hardware, tilting the solar panel so that the solar panel and the fixed solar panel are in a same plane.

14. The method of claim 11, further comprising determining a center of the solar panel; and picking or placing the solar panel based on the center of the solar panel.

15. The method of claim 14, wherein the fixed solar panel is placed on installation hardware; and wherein the solar panel is both picked and placed onto the installation hardware based on the center of the solar panel.

16. The method of claim 9, wherein the environment interference comprises glare.

17. The method of claim 16, wherein using the image masking and segmentation or the filtering or the image correction techniques comprises using noise cancellation and image correction to false color the glare.

18. The method of claim 9, further comprising analyzing environment in order to determine whether to use image masking and segmentation or filtering or image correction techniques for the at least partial correction due to the environment interference on the solar panel.

19. The method of claim 18, wherein analyzing the environment comprises analyzing a relative position of sun.

20. The method of claim 9, further comprising analyzing the at least one image in order to determine whether to use image masking and segmentation or filtering or image correction techniques for the at least partial correction due to the environment interference on the solar panel.

21. A method for an at least partly autonomous solar panel installation, the method comprising:

automatically obtaining at least one image of a solar panel;

automatically determining, based on the at least one image, a center of the solar panel; and automatically placing the solar panel relative to a fixed solar panel that is fixed to installation hardware by calculating a distance based on the center of the solar panel relative to at least a part of the fixed solar panel.

22. The method of claim 21, wherein the solar panel is automatically picked based on the center of the solar panel and automatically placed relative to the fixed solar panel based on the center of the solar panel.

23. The method of claim 21, wherein at least one robotic arm automatically picks the solar panel, the at least one robotic arm comprising a plurality of attaching devices; and wherein the at least one robotic arm automatically controls placement of the plurality of attaching devices based on the center of the solar panel.

24. The method of claim 21, wherein the solar panel is placed relative to the fixed solar panel based on the center of the solar panel and based on a center of the fixed solar panel so that the solar panel is placed based on a distance between the center of the solar panel and the center of the fixed solar panel.

25. The method of claim 21, wherein the center of the solar panel comprises one of a geometric center of the solar panel or a center of mass of the solar panel.

26. The method of claim 25, wherein determining the center of the solar panel comprises estimating the center of the solar panel.

27. A method for an at least partly autonomous solar panel installation, the method comprising:

obtaining a first image of a solar panel for the solar panel installation;

estimating a plurality of features or areas of the solar panel based on the first image;

generating a first set of control signals, based on the plurality of features or areas that are estimated, for operating at least one robotic controller for picking the solar panel;

iteratively performing the following in order to align the solar panel with at least a part of installation hardware:

obtaining a respective image of the solar panel as the solar panel is moving toward the at least a part of installation hardware;

determining, based on the respective image, respective control signals for moving the solar panel closer toward the at least a part of installation hardware;

operating, using the respective control signals, the at least one robotic controller to move the solar panel closer toward the at least a part of installation hardware; and responsive to determining the solar panel is not aligned with the at least a part of installation hardware, iterating again.

28. The method of claim 27, wherein the at least a part of installation hardware comprises a torque tube or a clamp.

29. The method of claim 27, wherein the respective image is of both the solar panel and the at least a part of installation hardware.

30. The method of claim 27, wherein the respective image is used to determine a position of the at least a part of installation hardware in order to estimate a panel pose.

31. The method of claim 27, further comprising: after automatically placing the solar panel onto the at least a part of installation hardware, using at least one fastener in order to secure the solar panel to the at least a part of installation hardware.

32. The method of claim 27, wherein aligning the solar panel with the at least a part of installation hardware and in relation to a fixed solar panel is iteratively performed.

* * * * *